US008858102B2

(12) United States Patent
Jiang

(10) Patent No.: US 8,858,102 B2
(45) Date of Patent: Oct. 14, 2014

(54) REDUCED WIDTH KEYBOARD WITH ADDED ROWS

(75) Inventor: Hongming Jiang, Zhejiang (CN)

(73) Assignee: Hangzhou Kind-Tao Technologies Co., Ltd, Zhejiang (CN)

( * ) Notice: Subject to any disclaimer, the term of this patent is extended or adjusted under 35 U.S.C. 154(b) by 214 days.

(21) Appl. No.: 13/129,777

(22) PCT Filed: Nov. 23, 2009

(86) PCT No.: PCT/CN2009/075094
§ 371 (c)(1),
(2), (4) Date: Aug. 5, 2011

(87) PCT Pub. No.: WO2010/057445
PCT Pub. Date: May 27, 2010

(65) Prior Publication Data
US 2011/0280641 A1    Nov. 17, 2011

(30) Foreign Application Priority Data

Nov. 21, 2008  (CN) .......................... 2008 1 0182347
Nov. 21, 2008  (CN) ....................... 2008 2 0210190 U
Aug. 26, 2009  (CN) ....................... 2009 2 0177516 U

(51) Int. Cl.
*G06F 3/02* (2006.01)
(52) U.S. Cl.
CPC ............ *G06F 3/0219* (2013.01); *G06F 3/0213* (2013.01); *G06F 3/0216* (2013.01)
USPC .......................................... 400/486; 400/472

(58) Field of Classification Search
CPC ..... G06F 3/0219; G06F 3/018; G06F 3/0216; G06F 3/0202
USPC .......................................... 400/472, 489, 486
See application file for complete search history.

(56) References Cited

U.S. PATENT DOCUMENTS

| 5,458,425 | A  | * | 10/1995 | Torok ............................ 400/489 |
| 6,445,380 | B1 | * | 9/2002  | Klein ............................ 345/168 |
| 6,851,877 | B1 |   | 2/2005  | Liebhold |
| 6,995,975 | B2 | * | 2/2006  | Hamada et al. .......... 361/679.08 |
| 8,339,294 | B2 | * | 12/2012 | Frazier ............................ 341/34 |
| 2001/0013859 | A1 | * | 8/2001 | Roylance ...................... 345/168 |
| 2004/0158364 | A1 | * | 8/2004 | Lafon et al. ....................... 701/3 |

(Continued)

FOREIGN PATENT DOCUMENTS

| CN | 1369071 A | 9/2002 |
| CN | 1437093 A | 8/2003 |

(Continued)

OTHER PUBLICATIONS

International Search Report, dated Mar. 4, 2010, corresponding to PCT/CN2009/075094, 8 pages.

*Primary Examiner* — Daniel J Colilla
(74) *Attorney, Agent, or Firm* — Christie, Parker & Hale, LLP

(57) ABSTRACT

A small size electron equipment keyboard, comprises a character area (101), a center key-press area (200), a left key-press area (103), a right key-press area (104) and a bottom key-press area (105), the letters in the center key-press area (200) which are arranged in regular trapezoidal shape according to the alphabet order, first from left to right, then from top to bottom.

11 Claims, 41 Drawing Sheets

(56) References Cited

U.S. PATENT DOCUMENTS

2005/0219209 A1* 10/2005 Fleck et al. .................. 345/157
2006/0029451 A1*  2/2006 McLoone ..................... 400/472
2008/0246732 A1* 10/2008 Conzola et al. .............. 345/168
2009/0138637 A1*  5/2009 Hargreaves et al. ........... 710/67
2009/0248908 A1* 10/2009 Ahn ............................. 710/14
2010/0247213 A1*  9/2010 Stewart et al. ................ 400/489

FOREIGN PATENT DOCUMENTS

| CN | 1707407 A | | 12/2005 | |
|---|---|---|---|---|
| CN | 101216734 A | * | 7/2008 | .............. G06F 3/023 |
| CN | 101477406 A | | 7/2009 | |
| JP | 09204274 A | * | 8/1997 | .............. G06F 3/033 |
| JP | 2000172372 A | * | 6/2000 | ................ G06F 1/16 |
| WO | WO 0122697 A1 | * | 3/2001 | .............. H04M 1/21 |

* cited by examiner

Fig. 22　　　　　　Fig. 31
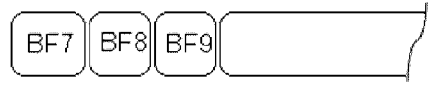
Fig. 23　　　　　　Fig. 32
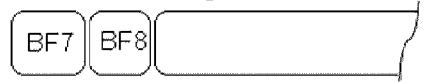
Fig. 24　　　　　　Fig. 33
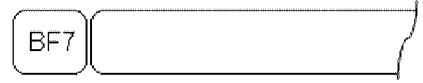
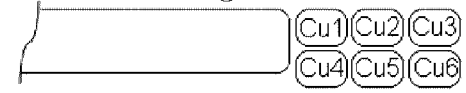
Fig. 25　　　　　　Fig. 34
Fig. 26　　　　　　Fig. 35
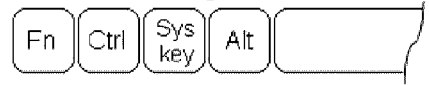
Fig. 27　　　　　　Fig. 36
Fig. 28　　　　　　Fig. 37
  　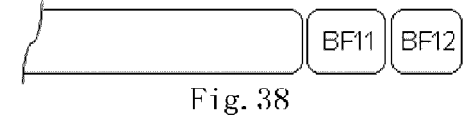
Fig. 29　Fig. 30　　Fig. 38
Fig. 39　　　　　　Fig. 40
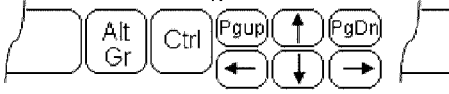
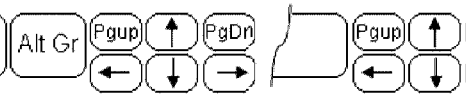
Fig. 41　　Fig. 42　　Fig. 43
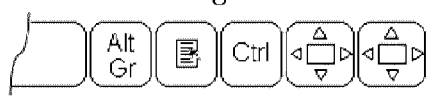
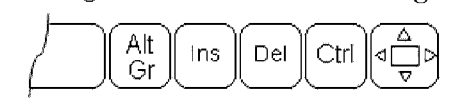
Fig. 44　　　　　　Fig. 45
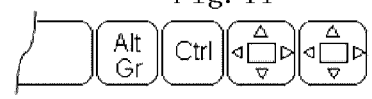
Fig. 46　　　　　　Fig. 47
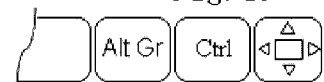
Fig. 48　　Fig. 49　　Fig. 50
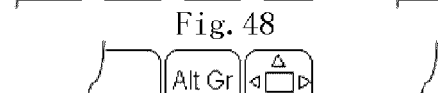
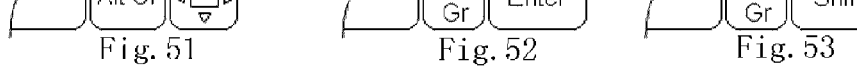
Fig. 51　　Fig. 52　　Fig. 53

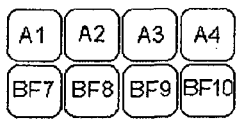
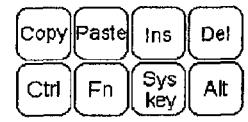
Fig.81  Fig.82  Fig.83  Fig.84
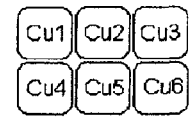
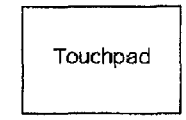
Fig.85  Fig.86  Fig.87
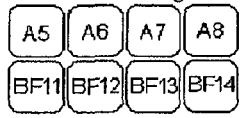
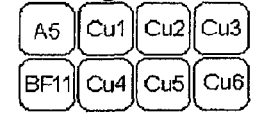
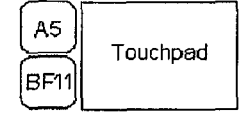
Fig.88  Fig.89  Fig.90
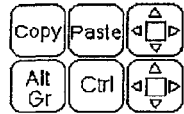
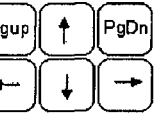
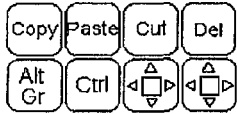
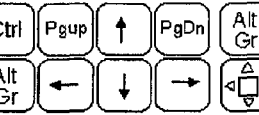
Fig.91  Fig.92  Fig.93  Fig.94  Fig.95
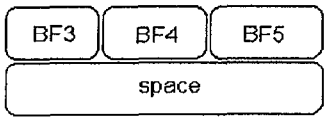
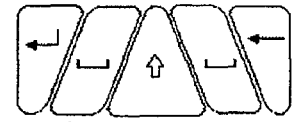
Fig.96  Fig.97  Fig.98
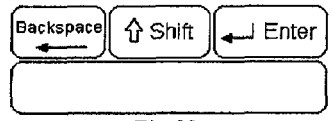
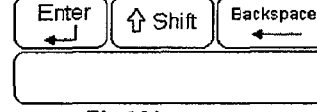
Fig.99  Fig.100
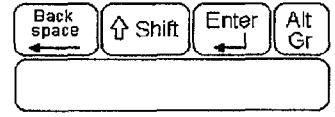
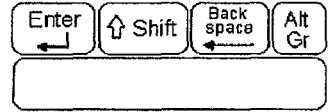
Fig.101  Fig.102
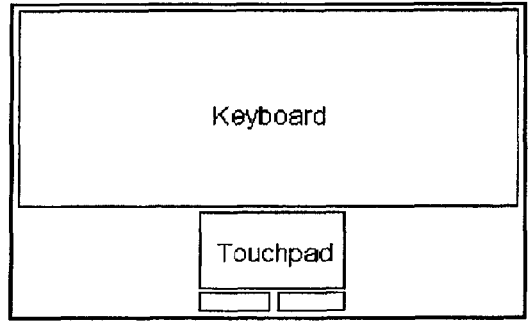
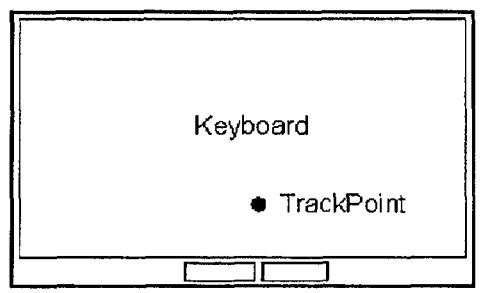
Fig.103 (PRIOR ART)  Fig.104

Fig.148-1
Fig.148-2
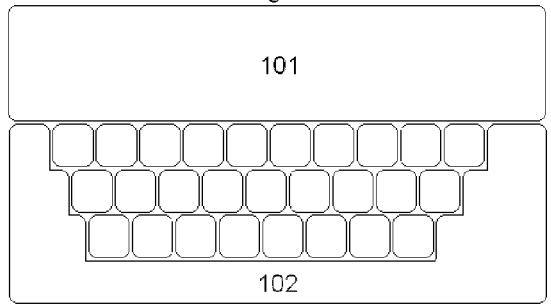
Fig.149
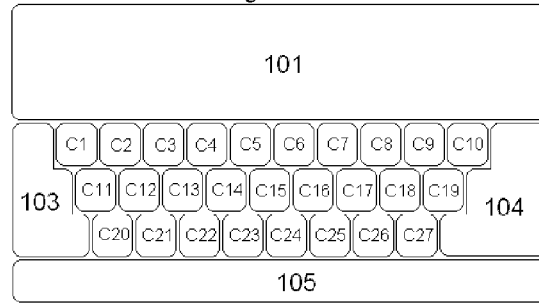
Fig.150
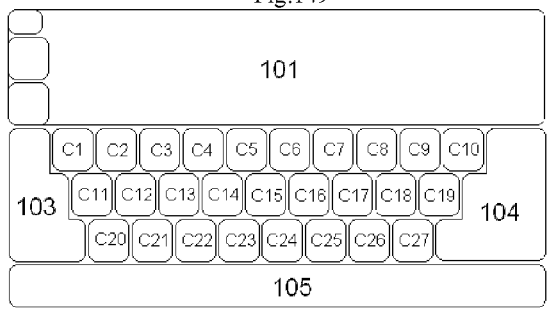
Fig.151
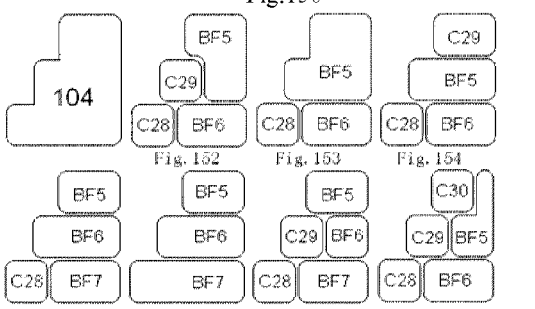
Fig.152  Fig.153  Fig.154
Fig.155  Fig.156  Fig.157  Fig.158
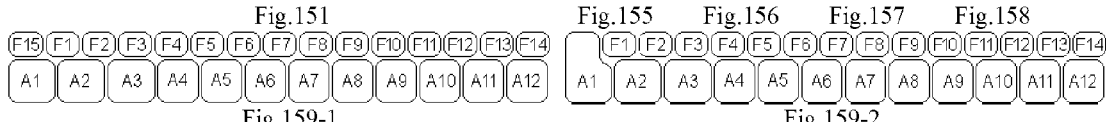
Fig.159-1  Fig.159-2
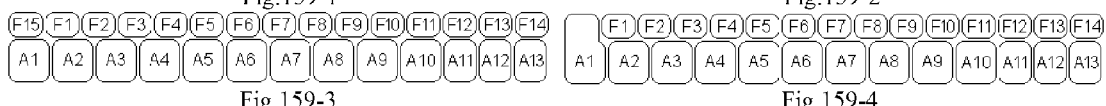
Fig.159-3  Fig.159-4
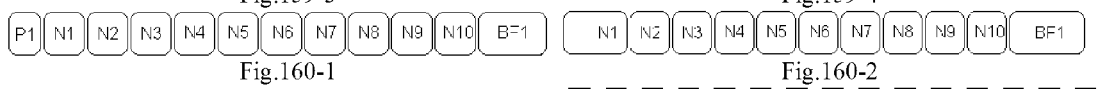
Fig.160-1  Fig.160-2
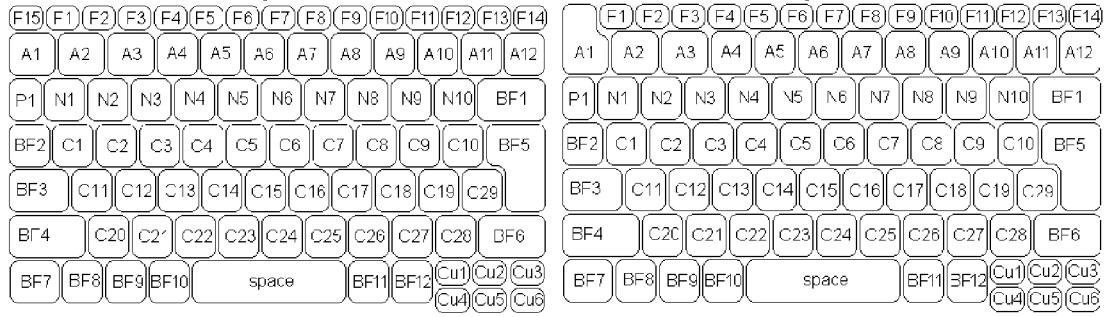
Fig.161-1  Fig.161-2

Fig.162-19
Fig.162-20
Fig.162-21
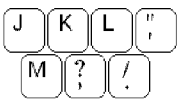
Fig.162-22a   Fig.162-22b
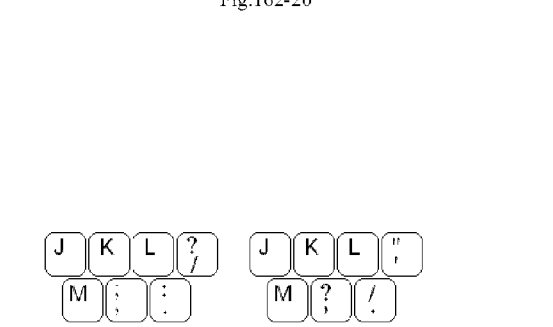
Fig.162-23
Fig.162-24
Fig.162-25
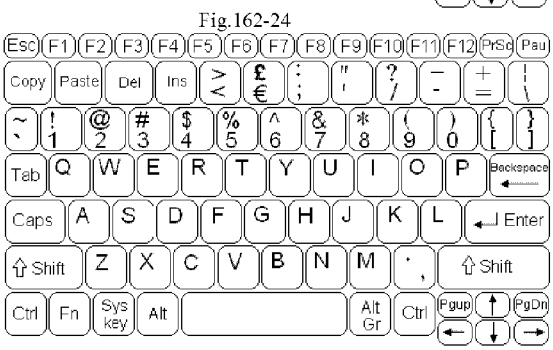
Fig.162-26

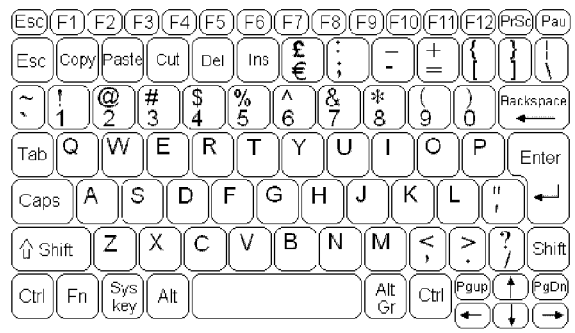
Fig.162-51         Fig.162-52
Fig.162-53         Fig.162-54
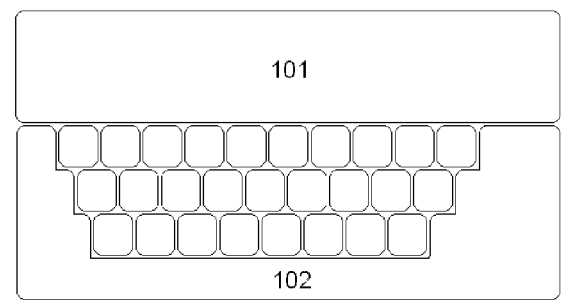
Fig.162-55         Fig.163
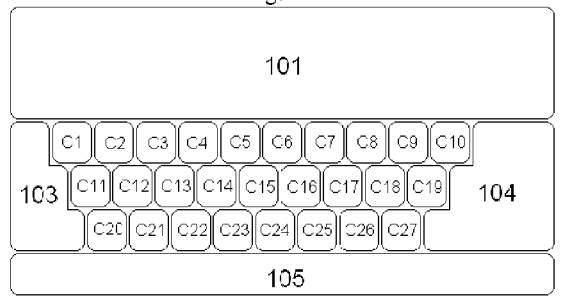
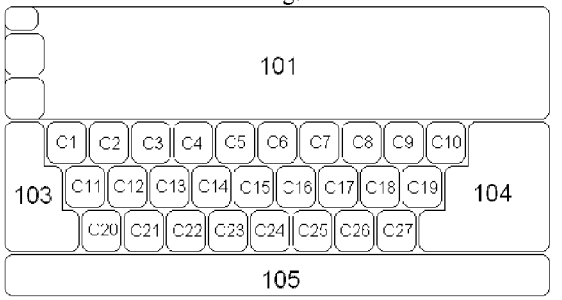
Fig.164         Fig.165
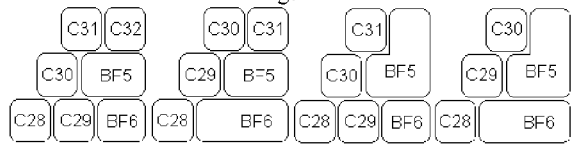
Fig.166  Fig.167  Fig.168  Fig.169         Fig.170-1
Fig.170-2         Fig.170-3

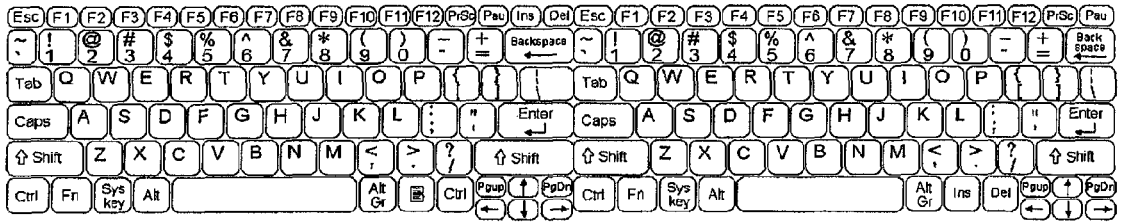
Fig.173-1 (PRIOR ART)   Fig.173-2
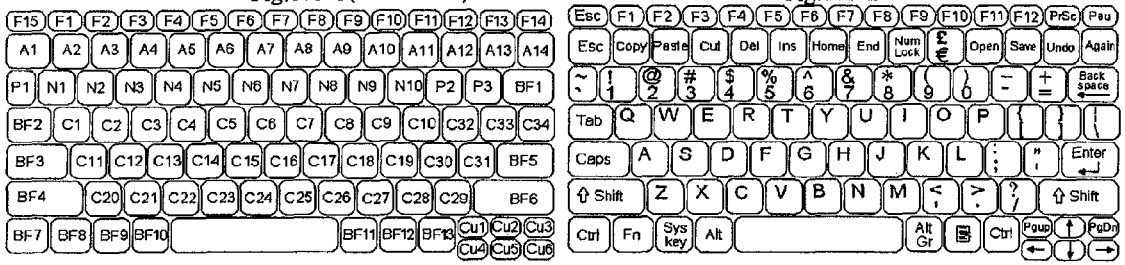
Fig.173-3   Fig.173-4
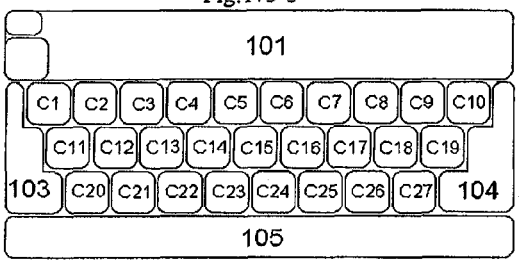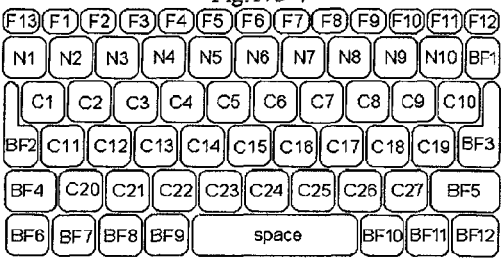
Fig.174   Fig.175-1
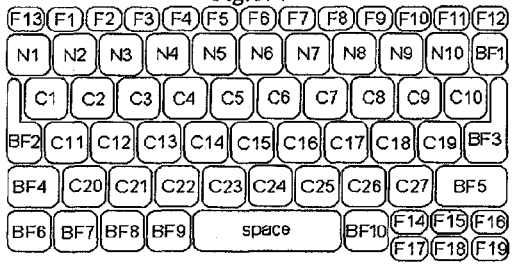
Fig.175-2   Fig.176-1

Fig.176-2   Fig.176-3
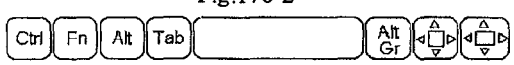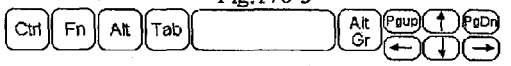
Fig.176-4   Fig.176-5

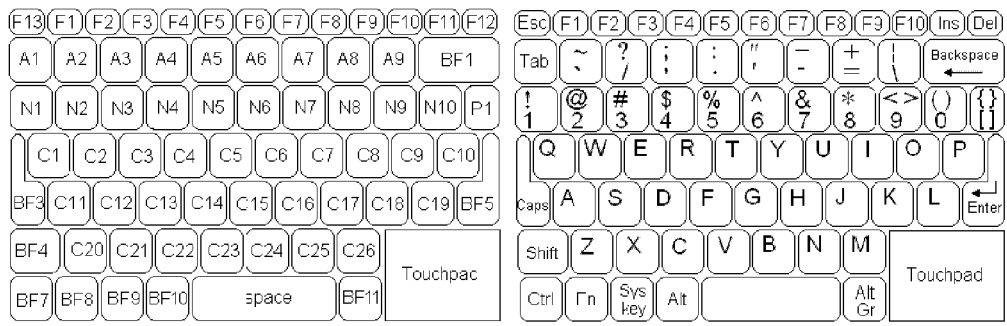
Fig.197-1  Fig.197-2
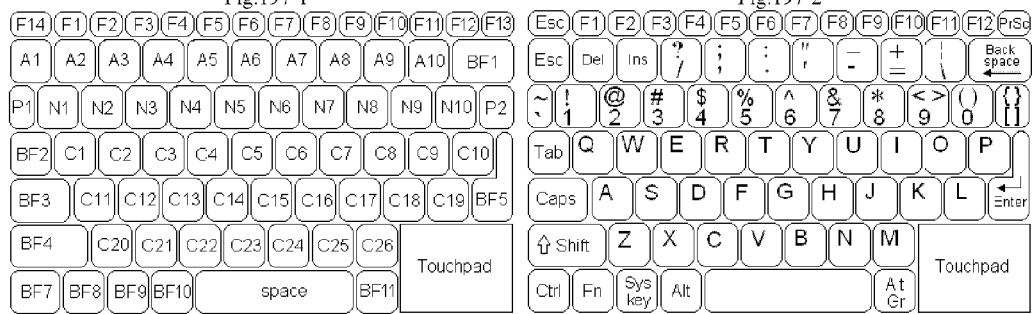
Fig.198-1  Fig.198-2
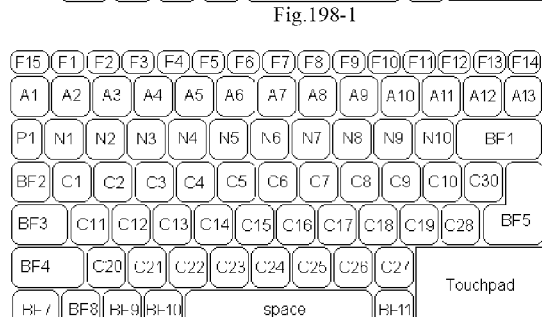 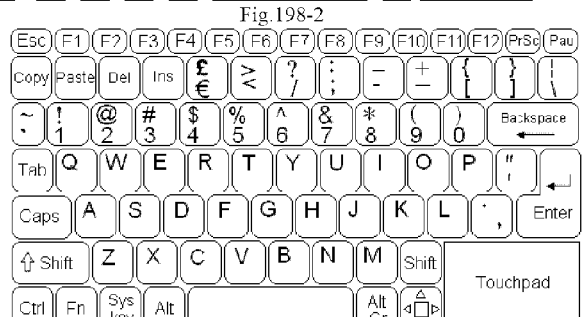
Fig.199-1  Fig.199-2
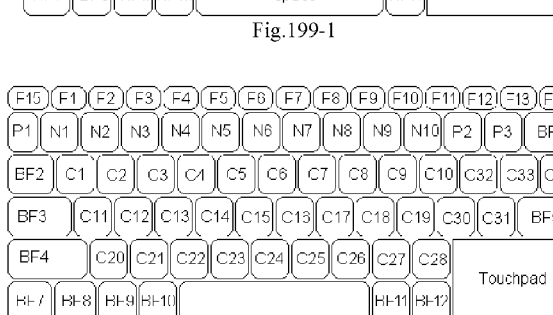 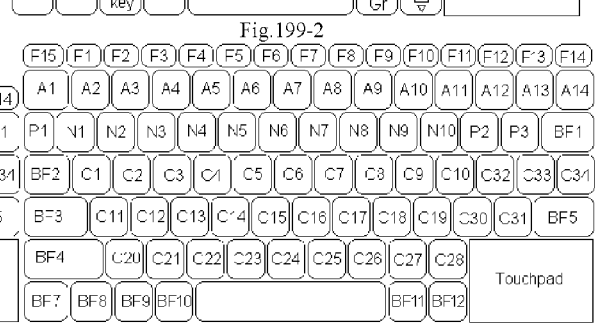
Fig.200-1  Fig.200-2
 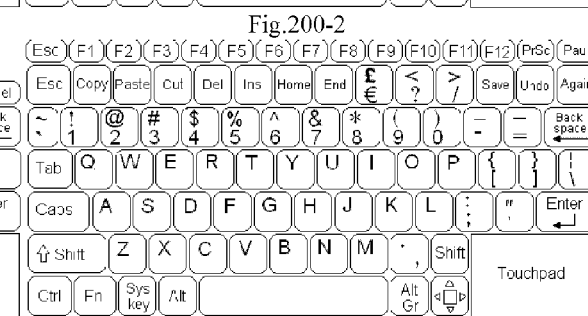
Fig.200-3  Fig.200-4

REDUCED WIDTH KEYBOARD WITH ADDED ROWS

CROSS-REFERENCE TO RELATED APPLICATION(S)

This application is a National Phase Patent Application and claims the priority of International Application Number PCT/CN2009/075094, filed on Nov. 23, 2009, which claims priority of Chinese Patent Application Number 200810182347.7, filed on Nov. 21, 2008, Chinese Patent Application Number 200820210190.X, filed on Nov. 21, 2008, and Chinese Patent Application Number 200920177516.8, filed on Aug. 26, 2009.

FIELD OF THE INVENTION

The present invention relates to the technical field of small size electronic devices, and particularly relates to a keyboard of a small size electronic device.

BACKGROUND OF THE INVENTION

The continuous development of technology enables electronic devices to realize the original functions in a smaller and smaller size. For example, the earliest computer was as large as a room. Later on, desktop computer was developed and then notebook computer was invented. The size is becoming smaller and smaller. As the requirement for the portability of electronic products are becoming higher, various kinds of portable electronic devices with a screen less than 12 inches emerged after notebook in the recent years, for example, Netbook, Mini-notebook, SmartBook, Booklet, UMPC, MID, etc. However, on the device with a screen less than 12 inches, according to the original keyboard layout, a full size keyboard can't be realized. At present, the solution applied by the manufacturers is to downsize each key in order to arrange the keyboard on the device. In this solution, the keys typically are only 90%~95% the size of the keys on a full size keyboard, but it is not convenient for a user to input information through the keys in about 90% of the original size.

At present, another existing method for realizing full size keys on a small size device is to adopt a folding keyboard. The keyboard is physically folded in half or three. After the keyboard is unfolded, it becomes a full size keyboard. Anyway, this method features complex mechanical design and high cost, so it is difficult for popularization. Further, this method is applicable to external keyboards and is hardly applicable to built-in keyboards.

Users need to use 100% full size keyboard keys on various kinds of portable electronic devices less than 12 inches.

QWERTY keyboards were mostly used by writers and typers in the typing age more than one century ago. In the age of DOS command line, they were mostly used by scientists and programmers. In the current era of WINDOWS, computer keyboard becomes a tool of most ordinary users. The unreasonable keyboard layouts adopted in the typing age and the DOS age are still used at present and not developed with times. Christopher Latham Sholes filed a patent application for QWERTY keyboard in 1868. The keyboard was commercialized on typewriters in 1873.

QWERTY keyboard has four major defects. Firstly, the pressing direction of the keys in the left key area tilts towards top left. As a result, the left wrist is abnormally distorted towards the left in reverse direction during typing. Long time usage will cause serious harm to the left wrist. Secondly, the letters are not arranged in an alphabetic order, thus the learning curve is high and it is difficult to remember. Thirdly, the arrangement and positions of letters do not conform to the statistical law of letter use frequency, so it is difficult to achieve a higher typing speed. Fourthly, the corresponding relationship between letters and fingers does not meet ergonomic requirements, and the two weakest little fingers undertake the most keys.

Dvorak invented a new keyboard arrangement method in 1934. This keyboard optimizes letter arrangement based on letter use frequency, but it only improves the third defect of QWERTY keyboard and still has the three remaining defects of QWERTY keyboard.

Lillian Malt designed a MALT keyboard, which is more reasonable and effective than DVORAK keyboard. It solves the third defect of QWERTY keyboard as DVORAK keyboard does, and partially alleviates the first and fourth defects, but it does not fundamentally solve the first and fourth defects. Moreover, the letter keys on the two sides of MALT keyboard are spaced too far away, as increased the requirement for the coordination of two hands. The high cost, particularly resulting from the concavity on the two sides, the high demand on tow hands coordination and the defect of not easy for learning prevented MALT keyboard from being applied widely.

Another keyboard design adopts the layout of a QWERTY keyboard except that letter keys are arranged in an alphabetic order of the 26 English letters. This design solves the second defect (difficult to learn) of a QWERTY keyboard, whereas it inherits the three remaining defects of a QWERTY keyboard. It is also not applied widelye.

John Parkinson designed New Standard Keyboards, which model is NSK 535. This design solves the first and second defects of QWERTY keyboard and makes the learning more easier and the moving directions of left and right hands conform to the movement direction of human wrists. The learning of the keyboard is much more easier and the user of such keyboard becomes more healthier. As NSK 535 keyboard has fewer keys, it basically solves the fourth defect of QWERTY keyboard. Nevertheless, in the design, the left little finger is responsible for high-frequency letters "A, E and I", so it is much inferior to a QWERTY keyboard in terms of efficiency and speed. Moreover, as it has fewer keys, some numbers, punctuation marks and function keys are realized by many combination keys, which are unfamiliar to users. Further, NSK 535 adds cursor keys: Up, Down, Left and Right, among letters, causing difficulty to the coordination of the left and right hands. Therefore, although the learning of NSK 535 is much more easier and the user of such keyboard becomes more healthie, it has low efficiency and speed, so it is not popularized, either.

In the market, there are also some self-proclaimed ergonomic keyboards. They only separate the left section and right section of the keyboards, but the keys on the left hand still tilt leftward. They are as harmful to the left wrist as a QWERTY keyboard.

Thus it can be seen the keyboards under the existing keyboard design solutions are either inefficient and slow though friendly and healthy to users, or not friendly and healthy to users though efficient and fast, or neither friendly and healthy to users nor efficient though cheap. Following are two extreme examples: the learning of the keyboard of a stenograph takes one year and the cost is high, but it is most efficient and fastest; the ABCD keyboard of a mobile phone can be learned more easily and is friendliest to user, but it is most inefficient and slowest.

Users need a keyboard which can solve the problems of usability, health, efficiency, speed and cost in the same time.

In the past one century, countless inventors and companies tried to invent an ABCD keyboard which is much easier to use than the current QWERTY keyboard, but none of them succeeded, so the ABCD keyboard of the present invention is non-obvious in this field. Since Eee PC came out in 2007, all computer companies, as well as Nokia and other large companies in other fields in the world have started the research and development of such keyboards for netbooks. Hewlett Packard, Sony, Toshiba, Dell, Nokia and other global large companies have put into huge human and financial resources. Although they have lots of excellent engineers, none of them succeeded in developing a 100% full size QWERTY keyboard. Therefore, the QWERTY keyboard of the present invention is non-obvious in this field.

SUMMARY OF THE INVENTION

In order to solve the defects of the prior art, the present invention provides a small size device keyboard, the operation of which is easier and which is healthier and faster.

In order to realize the foregoing objects, the small size device keyboard according to the present invention comprises a character area, a center key area, a left key area, a right key area and a bottom key area, wherein the letters in the center key area are arranged in a regular trapezoidal shape according to an alphabetic order, first from left to right, then from top to bottom.

Further, the bottom key area also comprises: a bottom left key area, a bottom right key area and a bottom center area;

Further, the keys in the center key area are arranged in the following way: the letters on the first row are ABCDEFG from left to right, the letters on the second row are HIJKLMNOPQ from left to right, and the letters on the third row are RSTUVWXYZ from left to right;

Further, the keys in the center key area are arranged in the following way: the letters on the first row are ABCDEFG from left to right, the letters on the second row are HIJKLMN from left to right, the letters on the third row are OPQRSTUVW from left to right, and the letters on the fourth row are XYZ from left to right;

Further, the keys in the center key area are arranged in the following way: the letters on the first row are ABCDEFG from left to right, the letters on the second row are HIJKLMN from left to right, the letters on the third row are OPQRST from left to right, and the letters on the fourth row are UVWXYZ from left to right;

Further, one key position is reserved between HIJK and LMN on the second row of the center key area;

Further, a numeric keypad is arranged in the right key area;

A keyboard which realizes full size keys on a small size device according to the present invention retains the center key area of a conventional QWERTY keyboard, shortens its length in the horizontal direction, increases its height in the vertical direction, adds one row or a plurality of rows of keys in its vertical direction, and transfers the low-frequency keys on the two sides to the added rows in the vertical direction.

A keyboard which realizes full size keys on a small size device according to the present invention retains the center key area of a conventional QWERTY keyboard, shortens its length in the horizontal direction, remains its height in the vertical direction unchanged and reduces, transfers or merges the low-frequency keys on the two sides to other keys.

Further, the center key area of a conventional QWERTY keyboard is retained. The size, position, length, width and distance of the keys in the center key area are not changed.

Further, the keyboard of the present invention also has a single direction key, which substitutes four direction keys to control the cursor or substitutes Page Up, Page Down, Home and End keys;

Further, the keyboard of the present invention also has five keys of Chinese writing strokes: ─, |, ), ﹅, and ─,;

Further, the keyboard of the present invention also has a Copy key, a Paste key, a currency symbol key and a large ESC key.

Further, the keyboard of the present invention merges the keys appearing and used in pair into merger keys. When a merger key is stricken, two paired keys and the left cursor key will be input and the cursor will stay in the middle of the paired keys.

Further, the keyboard of the present invention has a built-in touchpad.

The present invention adopts the foregoing technical solution and makes a small size electronic device keyboard have the following technical features:

1. 100% full size keyboard keys are realized on a small size device. Users strike keys in a more comfortable manner. Moreover, the screen frame of the device is narrowed, so the screen looks nicer and bigger and the overall size of the device may be even smaller.

2. It is easy to learn and use the new-type ABCD keyboard of the present invention. The letter keys are all arranged in an alphabetic order. The letters are interrupted in the same positions as adopted in the alphabet, thus it is easy to remember.

3. A new-type ABCD keyboard of the present invention avoids distortion of user's left wrist and right wrist; and the small QWERTY keys of the present invention avoid distortion of user's right wrist.

4. A new-type ABCD keyboard of the present invention adopts more ergonomic design and more reasonable positions of keys. In the layout of a conventional QWERTY keyboard, the frequency ratio between the letters input by left hand and the letters input by right hand is 59:41, while the frequency ratio in the new-type ABCD keyboard of the present invention between the letters input by left hand and the letters input by right hand is 46:54, indicating the layout of the present invention is more balanced and the right hand does more work. In the layout of a conventional QWERTY keyboard, the frequency of the letters input by little finger is 10%, while the frequency in the new-type ABCD keyboard of the present invention is 0%. In the layout of a conventional QWERTY keyboard, the frequency of the letters on the top row is 51%, while the frequency in the new-type ABCD keyboard of the present invention is 33.6%.

5. A new-type ABCD keyboard of the present invention has a higher input speed. Little fingers are not responsible for any letter, while on the conventional QWERTY keyboard, little fingers are responsible for 4 letters, wherein "A" is a high-frequency letter. On a new-type ABCD keyboard of the present invention, punctuation marks may be directly input through high-frequency punctuation keys without pressing Shift key.

6. A new-type ABCD keyboard of the present invention may have a complete numeric keypad within the length of 235 mm. It may also have a 2.5-inch touchpad in the middle.

7. On a small QWERTY keyboard of the present invention, the Backspace key is 39 mm closer to the right hand, compared to a conventional keyboard. When the right hand is outstretched, the key may be stricken directly with the ring finger. The Enter key is 19 mm closer to the right hand. Likewise, there is no need to distort the right hand. When the little finger is outstretched, it may directly strike the Enter key. The Right Shift key is 19 mm closer to the right hand. When the right little finger moves down, the user may strike the Shift key directly with the right little finger without distorting the wrist. At C29 position, single quotation marks and double quotation marks are one key closer and also 19 mm closer to the right hand, so the user may input in a healthier and faster manner.

8. Copy, Paste, Cut, Open, Find, Undo, Redo and other common editing keys are added to facilitate user's edition. Currency symbols are added to facilitate user's input.

9. The merger of pair keys reduces user's input times and saves one key position, which may be provided for another key. This is really a way to kill two birds with one stone.

10. A direction key is added at the bottom right corner of the keyboard so that the user may operate the cursor in a more intuitionistic and natural manner and save space. A direction key plays a role of eight cursor keys, or two direction keys play a role of eight cursor keys.

11. In some designs of the present invention, Backspace key, Shift key and Enter key are stricken with index fingers or thumbs. The distance is short, so it is convenient, efficient, healthy and comfortable.

12. In some designs of the present invention, five keys of Chinese writing strokes: 一, 丨, 丿, 丶, and 乛 are added on the keyboard, for easier input of Chinese characters.

BRIEF DESCRIPTION OF THE DRAWINGS

The drawings are intended to provide further understanding on the present invention and constitute a part of the Description. They are intended to illustrate the present invention along with the embodiment of the present invention and not intended to limit the present invention. In the drawings.

FIG. 5-1 is a schematic view of a Japanese 89-key keyboard;

FIG. 5-2 is a schematic view of a European 85-key keyboard;

FIG. 12-1 is a schematic view of the inverted-trapezoid area in a sequence of ABCD;

FIG. 12-2 is a schematic view of the inverted-trapezoid area in a sequence of AZER;

FIG. 15-1 is a schematic view of a row added above numeric keys according to the present invention;

FIG. 15-2 is a schematic view of a row added below numeric keys according to the present invention;

FIG. 26 to FIG. 28 are design examples when area 106 is as high as one key according to the present invention;

FIG. 29 shows the system keys of Microsoft operating system;

FIG. 30 shows the system keys of Apple operating system;

FIG. 31 to FIG. 38 are design templates when area 107 is as high as one key according to the present invention;

FIG. 39 to FIG. 53 are design examples when area 107 is as high as one key according to the present invention;

FIG. 81 to FIG. 82 are design templates when area 106 is as high as two keys according to the present invention;

FIG. 83 to FIG. 84 are design examples when area 106 is as high as two keys according to the present invention;

FIG. 85 to FIG. 90 are design templates when area 107 is as high as two keys according to the present invention;

FIG. 91 to FIG. 95 are design examples when area 107 is as high as two keys according to the present invention;

FIG. 96 to FIG. 98 are design templates when area 108 is as high as two keys according to the present invention;

FIG. 99 to FIG. 102 are design examples when area 108 is as high as two keys according to the present invention;

FIG. 103 is a schematic view for the plane layout of a keyboard on a conventional portable device;

FIG. 104 is a schematic view for the layout of a keyboard with track point according to the present invention;

FIG. 121-1 to FIG. 121-4 are design templates of an 8-inch keyboard according to the present invention;

FIG. 122-1 to FIG. 122-6 are design examples of an 8-inch QWERTY keyboard according to the present invention;

FIG. 129-1 to FIG. 129-4 are design templates of an 8-inch keyboard according to the present invention;

FIG. 130-1 to FIG. 130-4 are design examples of an 8-inch QWERTY keyboard according to the present invention;

FIG. 138-1 to FIG. 138-2 are design templates of a 9-inch keyboard according to the present invention;

FIG. 139-1 to FIG. 139-2 are design examples of a 9-inch QWERTY keyboard according to the present invention;

FIG. 147-1 to FIG. 147-2 are design templates of a 9-inch keyboard according to the present invention;

FIG. 148-1 to FIG. 148-2 are design examples of a 9-inch QWERTY keyboard according to the present invention;

FIG. 149 is a schematic view of a 10-inch QWERTY keyboard according to the present invention;

FIG. 150 is a schematic view for zoning of a 10-inch QWERTY keyboard according to the present invention;

FIG. 151 is a schematic view for zoning of a 10-inch QWERTY keyboard according to the present invention;

FIG. 152 to FIG. 158 are design templates of area 104 of a 10-inch keyboard according to the present invention;

FIG. 159-1 to FIG. 159-4 are design templates of the added row in area 101 of a 10-inch keyboard according to the present invention;

FIG. 160-1 to FIG. 160-2 are design templates of the numeric row in area 101 of a 10-inch keyboard according to the present invention;

FIG. 161-1 to FIG. 161-12 are design templates of a 10-inch keyboard according to the present invention;

FIG. 162-1 to FIG. 162-55 are design examples of a 10-inch QWERTY keyboard according to the present invention;

FIG. 163 is a schematic view of an 11-inch keyboard according to the present invention;

FIG. 164 is a schematic view for zoning of an 11-inch keyboard according to the present invention;

FIG. 165 is a schematic view for zoning of an 11-inch keyboard according to the present invention;

FIG. 166 to FIG. 169 are design templates of area 104 of an 11-inch keyboard according to the present invention;

FIG. 170-1 to FIG. 170-3 are design templates of area 101 of an 11-inch keyboard according to the present invention;

FIG. 171-1 to FIG. 171-4 are design templates of an 11-inch keyboard according to the present invention;

FIG. 172-1 to FIG. 172-6 are design examples of an 11-inch QWERTY keyboard according to the present invention;

FIG. 173-1 to FIG. 173-2 are design examples of a 12-inch keyboard with unchanged height according to the present invention;

FIG. 173-3 is a design template of the added row on a 12-inch keyboard according to the present invention;

FIG. 173-4 is a design example of the added row on a 12-inch keyboard according to the present invention;

FIG. 174 is a schematic for zoning of an 8-inch keyboard with unchanged height according to the present invention;

FIG. 175-1 to FIG. 175-2 are design templates of an 8-inch keyboard with unchanged height according to the present invention;

FIG. 176-1 to FIG. 176-5 are design examples of an 8-inch keyboard with unchanged height according to the present invention;

FIG. 178-1 to FIG. 178-2 are design templates of a 9-inch keyboard with unchanged height according to the present invention;

FIG. 179-1 to FIG. 179-3 are design examples of a 9-inch keyboard with unchanged height according to the present invention;

FIG. 181-1 to FIG. 181-3 are design templates of a 10-inch keyboard with unchanged height according to the present invention;

FIG. 182-1 to FIG. 182-4 are design examples of a 10-inch keyboard with unchanged height according to the present invention;

FIG. 188-1 to FIG. 188-3 is a design example of the three rows of keys in the regular trapezoidal area 200 of an ABCD keyboard according to the present invention;

FIG. 190-1 to FIG. 190-2 are design examples of the three rows of keys on the left and four rows of keys on the right of the regular trapezoidal area 200 of an ABCD keyboard according to the present invention;

FIG. 192-1 to FIG. 192-2 are design examples of the four rows of keys on both left and right of the regular trapezoidal area 200 of an ABCD keyboard according to the present invention;

FIG. 193-1 to FIG. 193-14 are design templates of a new-type ABCD keyboard according to the present invention;

FIG. 194-1 to FIG. 194-30 are design examples of a new-type ABCD keyboard according to the present invention;

FIG. 195-1 to FIG. 195-10 are design templates of a 10-inch QWERTY keyboard with a touchpad according to the present invention;

FIG. 196-1 to FIG. 196-14 are design examples of a 10-inch QWERTY keyboard with a touchpad according to the present invention;

FIG. 197-1 is a design template of an 8-inch QWERTY keyboard with a touchpad according to the present invention;

FIG. 197-2 is a design example of an 8-inch QWERTY keyboard with a touchpad according to the present invention;

FIG. 198-1 is a design template of a 9-inch QWERTY keyboard with a touchpad according to the present invention;

FIG. 198-2 is a design example of a 9-inch QWERTY keyboard with a touchpad according to the present invention;

FIG. 199-1 is a design template of an 11-inch QWERTY keyboard with a touchpad according to the present invention;

FIG. 199-2 is a design example of an 11-inch QWERTY keyboard with a touchpad according to the present invention;

FIG. 200-1 to FIG. 200-2 are design templates of a 12-inch QWERTY keyboard with a touchpad according to the present invention;

FIG. 200-3 to FIG. 200-4 are design examples of a 12-inch QWERTY keyboard with a touchpad according to the present invention;

FIG. 201-1 to FIG. 201-10 are design templates of a 10-inch new-type ABCD keyboard with a touchpad according to the present invention;

FIG. 202-1 to FIG. 202-14 are design examples of a new-type ABCD keyboard with a touchpad according to the present invention;

Figure 1:
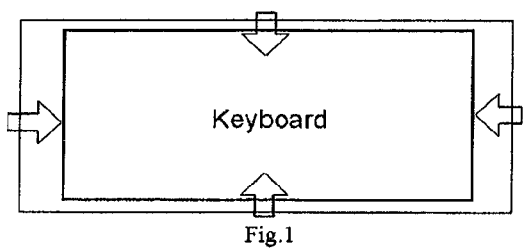
FIG. 1 is a schematic view of an existing small size electronic device keyboard with reduced height and length.
Figure 2:
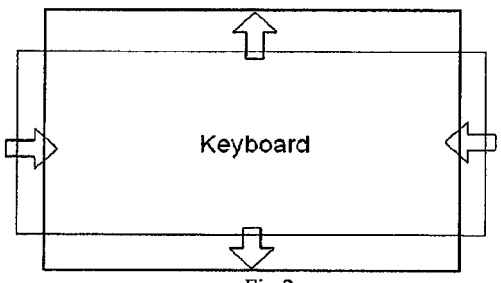
FIG. 2 is a schematic view of a small size electronic device keyboard with reduced length and increased height according to the present invention.
Figure 3:
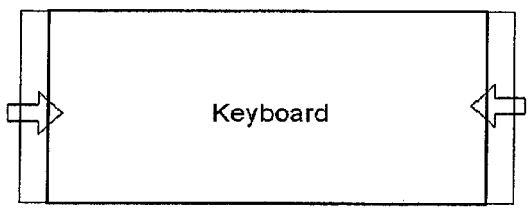
FIG. 3 is a schematic view of a small size electronic device keyboard with reduced length and unchanged height according to the present invention.
Figure 6:
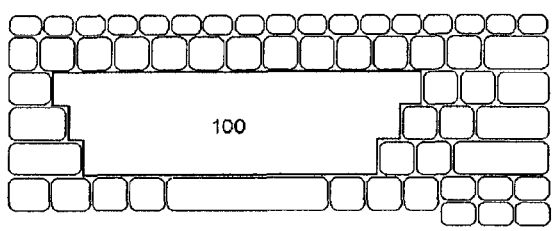
FIG. 6 is a schematic view of the area reserved in the middle of a conventional keyboard.
Figure 7:
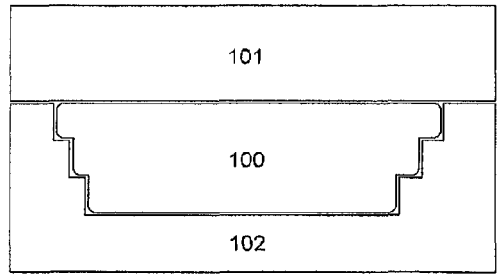
FIG. 7 is a schematic view for zoning of a small QWERTY keyboard according to the present invention.
Figure 8:
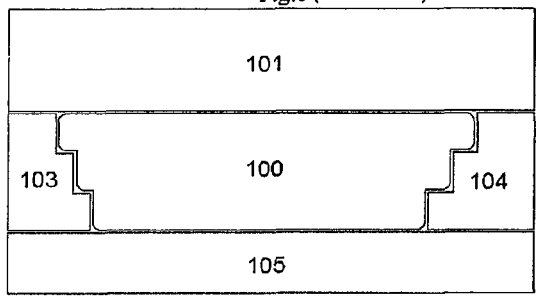
FIG. 8 is a schematic view for zoning of a small QWERTY keyboard according to the present invention.
Figure 10:
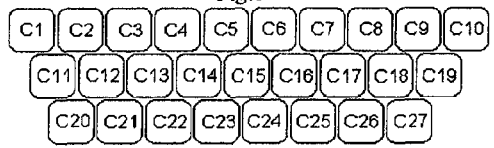
FIG. 10 is a schematic view of the inverted-trapezoid area reserved in the middle of a conventional keyboard.
Figures 1, 194:
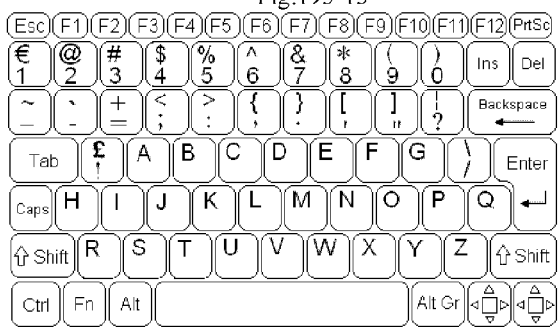
Figures 2, 194:
Figures 3, 194:
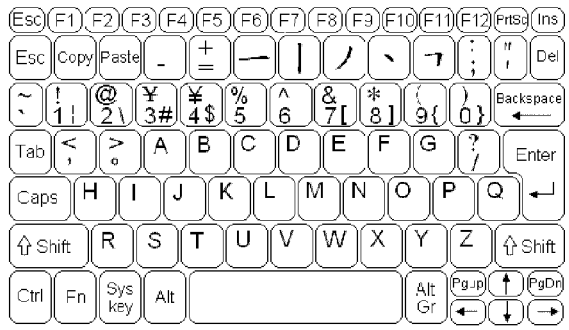
Figures 4, 194:
Figures 5, 194:
Figures 6, 194:
Figures 7, 194:
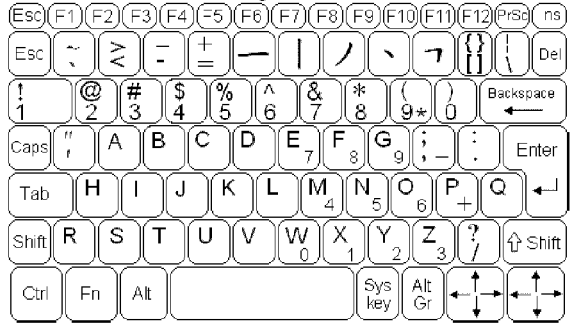
Figures 8, 194:
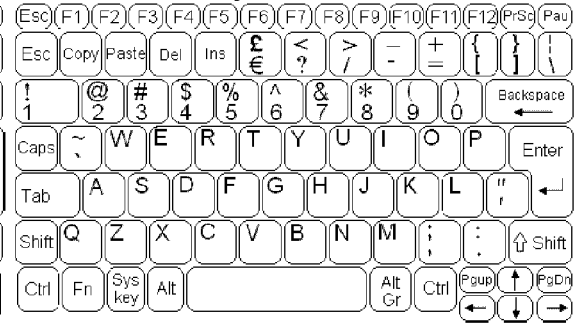
Figures 9, 194:
Figures 10, 194:
Figures 11, 194:
Figures 12, 194:
Figures 13, 194:
Figures 14, 194:
Figures 15, 194:
Figures 16, 194:
Figures 17, 194:
Figures 18, 194:
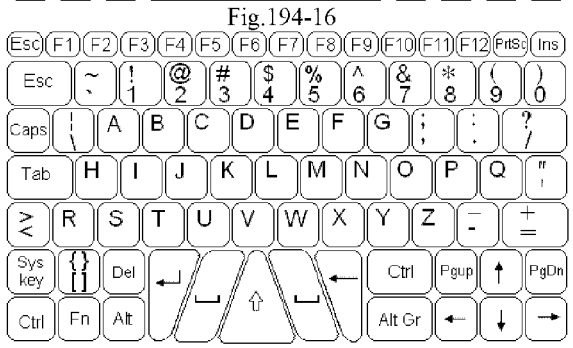
Figures 19, 20, 194:
Figures 21, 22, 194:
Figures 23, 24, 194:
Figures 25, 26, 194:
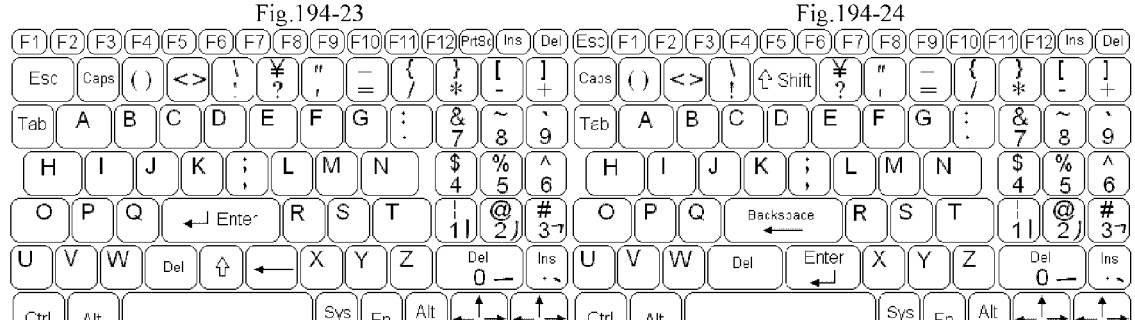
Figures 27, 194:
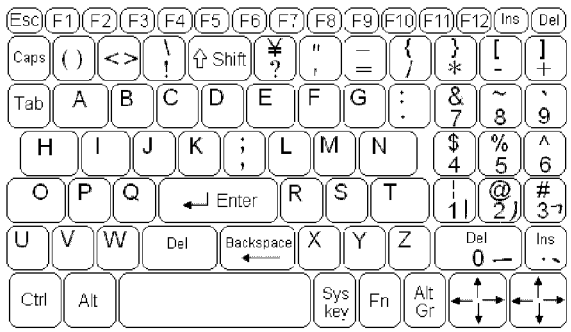
Figures 28, 194:
Figures 29, 194:
Figures 30, 194:
Figures 1, 2, 203:
Figures 3, 4, 203:
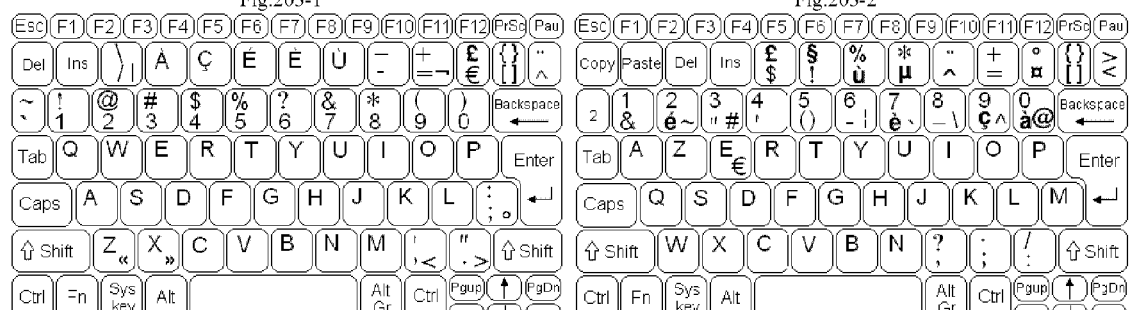
Figures 5, 203:
Figures 6, 203:
Figures 7, 203:
Figures 8, 203:
Figures 9, 203:
Figures 10, 203:
Figures 11, 203:
Figures 12, 203:
Figures 13, 14, 203:
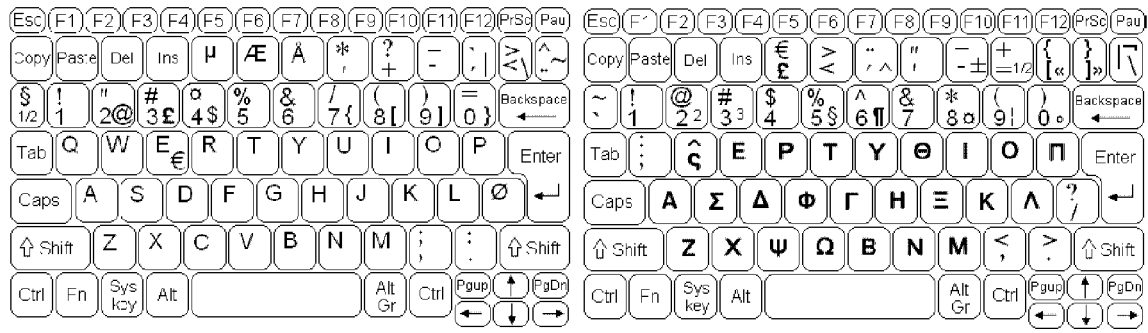
Figures 15, 16, 203:
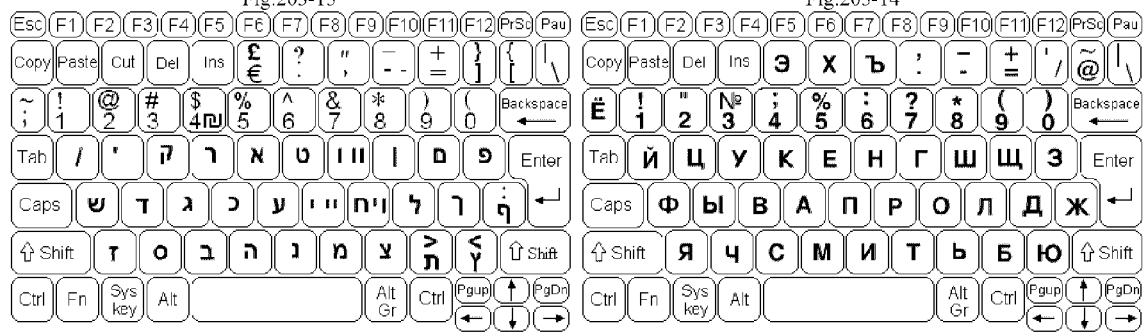
Figures 17, 18, 203:
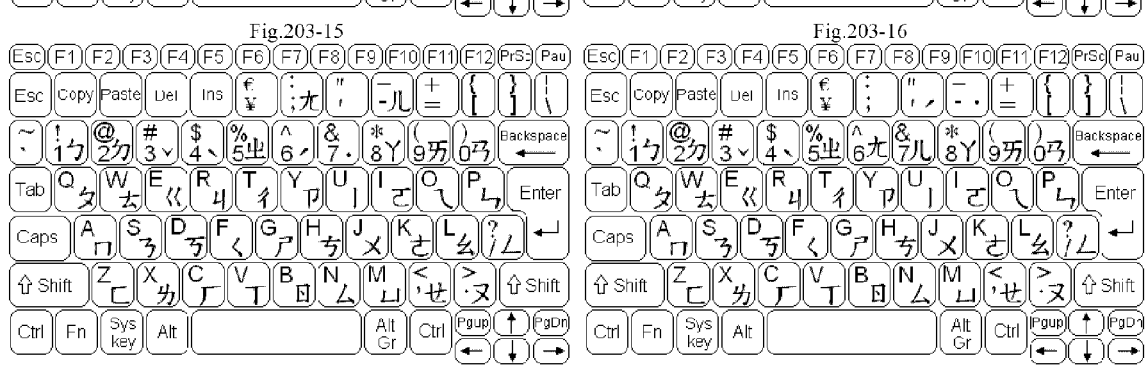
Figures 19, 20, 203:
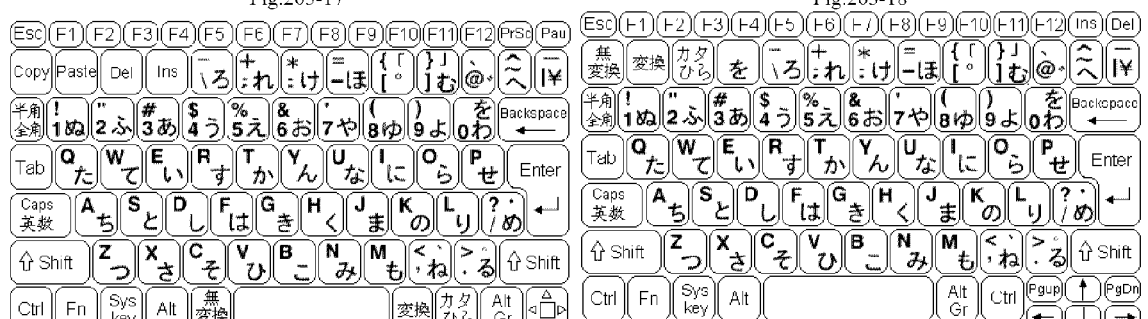
Figures 21, 22, 203:
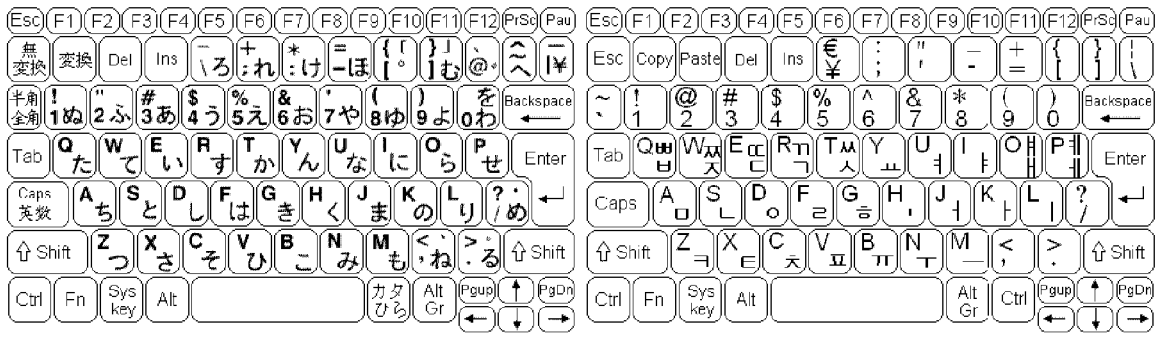
FIG. 22 to FIG. 25 are design templates when area 106 is as high as one key according to the present invention.
Figures 23, 203:
Figures 24, 203:
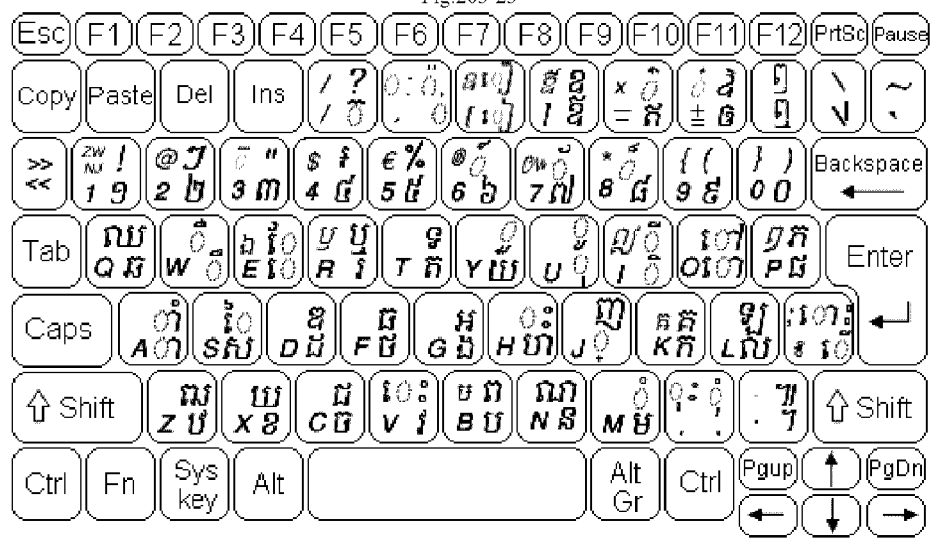
Figures 25, 203:
Figures 26, 203:
Figures 1, 2, 204:
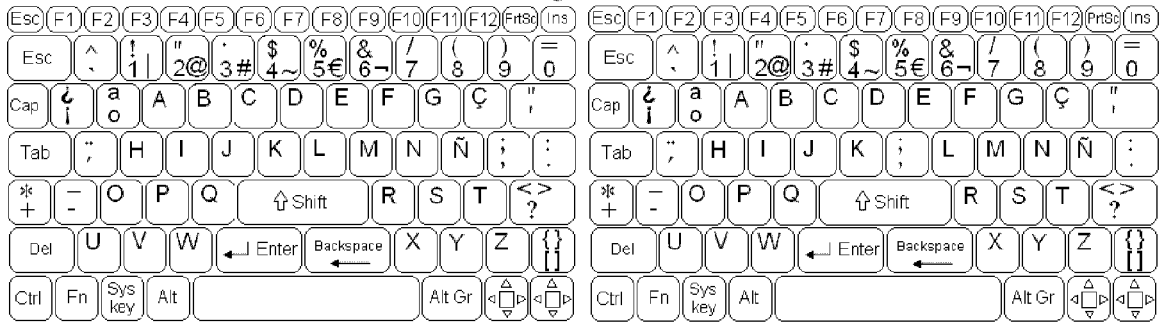
Figures 3, 204:
Figures 4, 204:
Figures 5, 204:
Figures 6, 204:
Figures 7, 204:
Figures 8, 204:
Figures 9, 204:
Figures 10, 204:
Figures 1, 205:
Figures 2, 205:
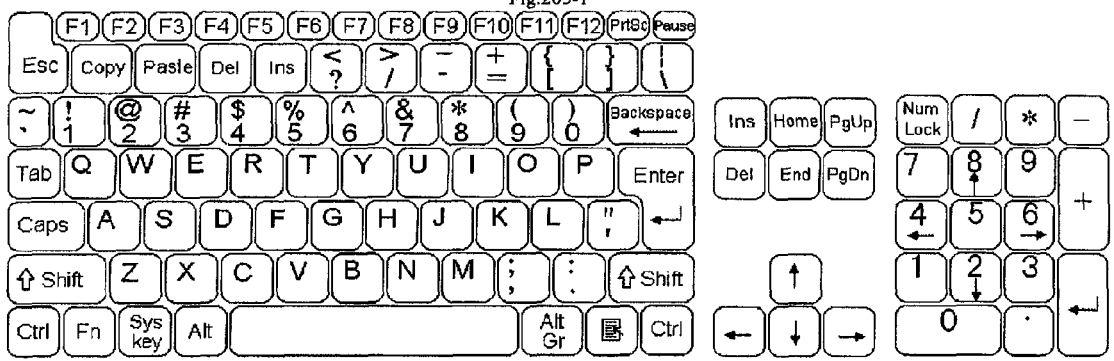
Figures 3, 205:
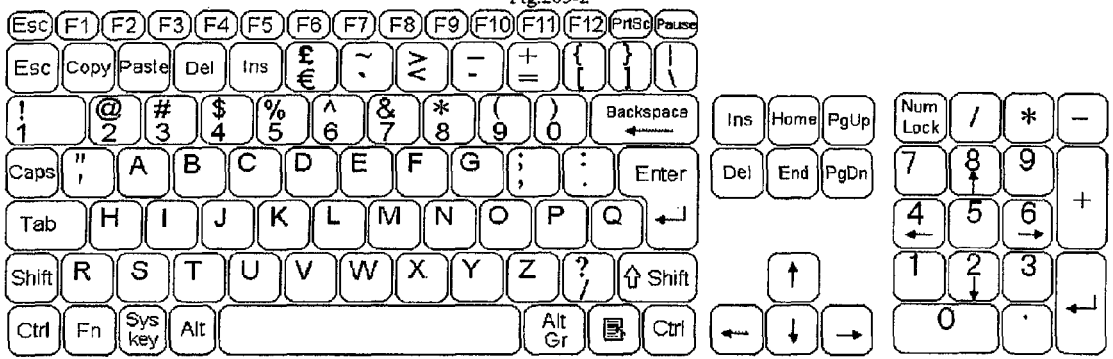
Figures 1, 206:
Figures 2, 206:
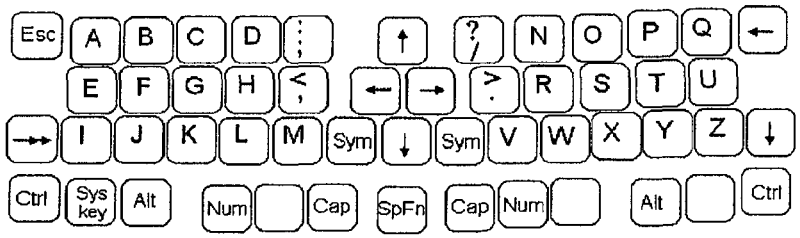
Figure 207:
Figures 1, 208:
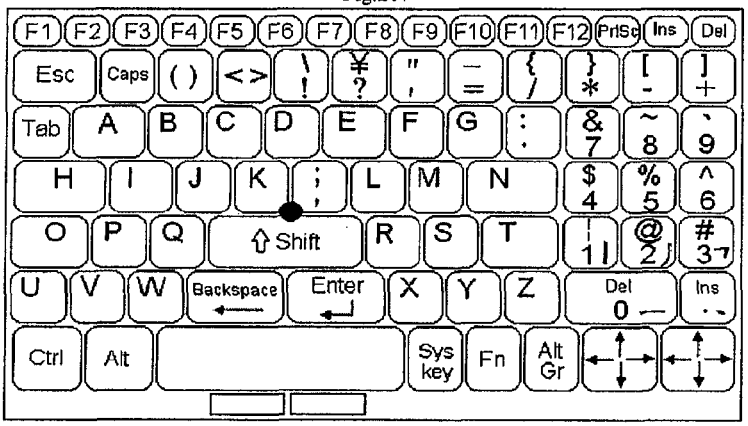
Figures 2, 208:
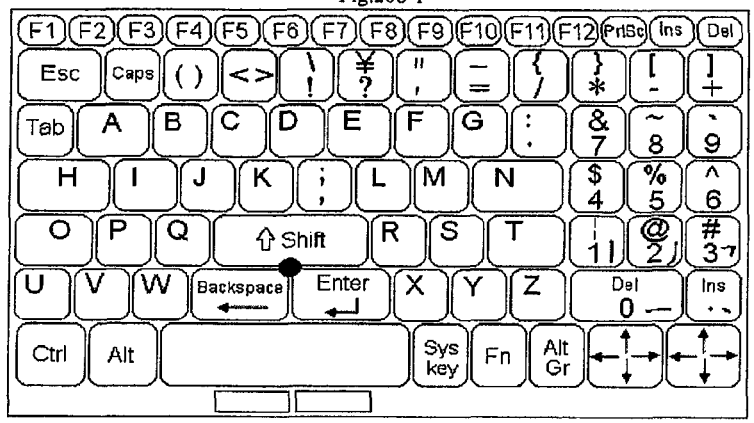
Figure 209:
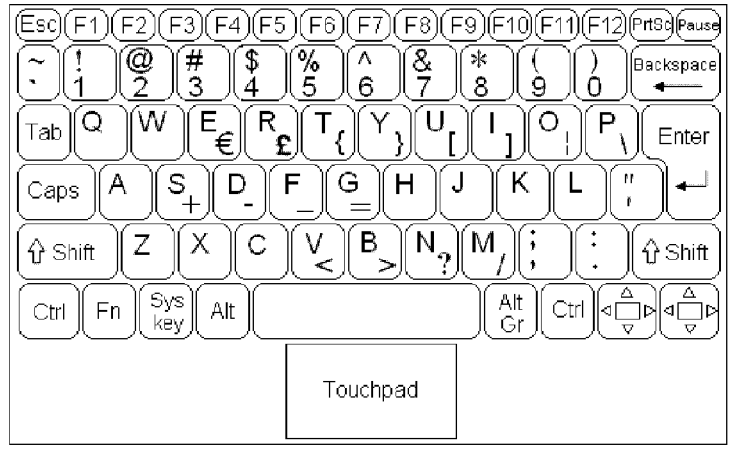
Figures 1, 210:
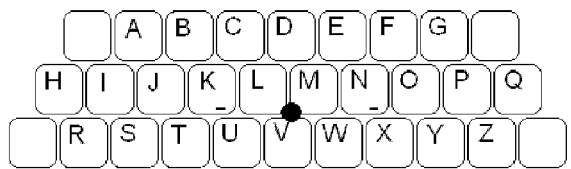
Figures 2, 210:
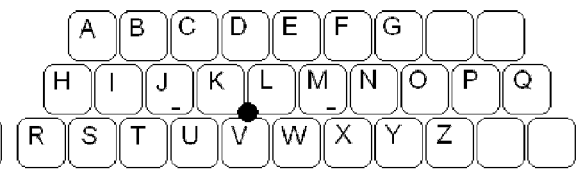
Figures 3, 210:
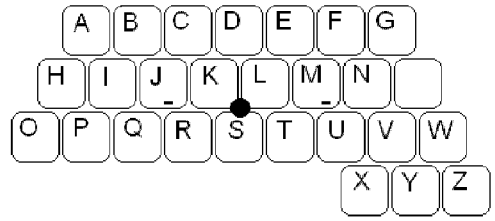
Figures 4, 210:
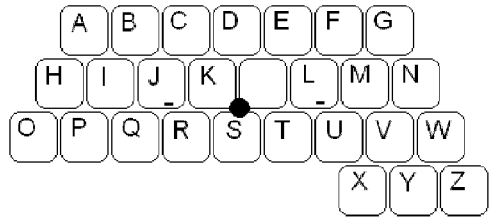
Figures 5, 210:
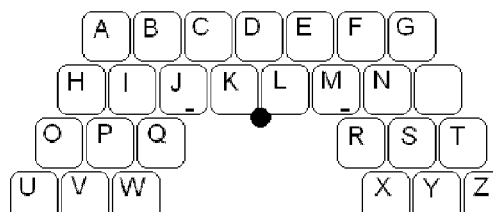
Figures 6, 210:
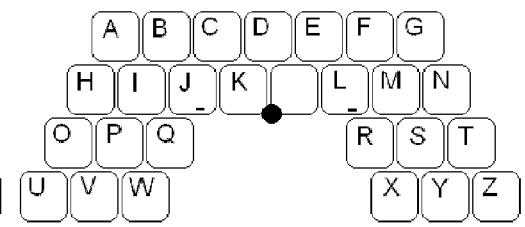
Figures 7, 210:
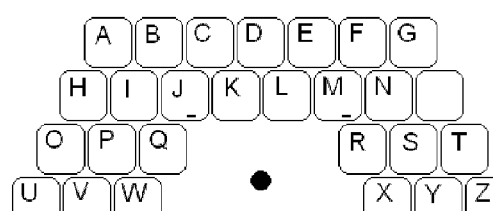
Figures 8, 210:
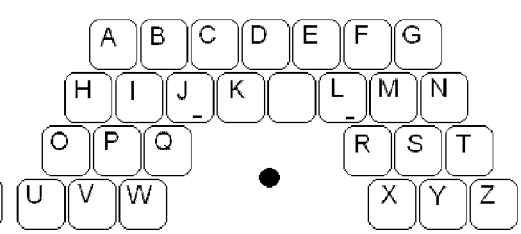

FIG. 203-1 to FIG. 203-26 are design examples of a 10-inch multi-language small QWERTY keyboard according to the present invention;

FIG. 204-1 to FIG. 204-6 are design examples of a 10-inch Spanish new-type ABCD keyboard according to the present invention;

FIG. 204-7 to FIG. 204-10 are design examples of a 10-inch Japanese new-type ABCD keyboard according to the present invention;

FIG. 205-1 to FIG. 205-3 are design examples of an external keyboard with a numeric keypad according to the present invention;

FIG. 206-1 shows a conventional ABCD keyboard;

FIG. 206-2 shows a NSK 535 keyboard;

FIG. 207 is a design example of a small QWERTY keyboard with a track pointi according to the present invention;

FIG. 208 is a design example of a new-type ABCD keyboard with a track point according to the present invention;

FIG. 209 is a design example of a QWERTY keyboard with a touchpad according to the present invention;

FIG. 210-1 to FIG. 210-8 are examples indicating the position of a track point of new-type ABCD keyboard according to the present invention.

DESCRIPTION ON THE REFERENCE SIGNS IN THE ACCOMPANYING DRAWINGS

100 The character area in an inverted trapezoidal shape in the middle of a conventional QWERTY keyboard;

101 The area with rearranged keys at the top of a new keyboard layout;

102 The area with rearranged keys on the two sides and at the bottom of a new keyboard layout;

103 The area with rearranged keys on the left of a new keyboard layout;

104 The area with rearranged keys on the right of a new keyboard layout;

105 The area with rearranged keys at the bottom of a new keyboard layout;

106 The area with rearranged keys at the bottom left corner of a new keyboard layout;

107 The area with rearranged keys at the bottom right corner of a new keyboard layout;

108 The area with rearranged keys in the bottom middle of a new keyboard layout;

200 The character area in a regular trapezoidal shape in the middle of a new-type ABCD keyboard according to the present invention;

C1 to C39 are the positions of character keys in the middle of a keyboard. C stands for Character and may be a letter, a punctuation mark or any other character.

N1 to N10 are the positions of numeric keys. N stands for Number. They refer to the positions of ten numeric keys from 0 to 9.

P1 to P10 are the positions of punctuation mark keys. P stands for Punctuation.

A1 to A15 are the added key positions. A stands for Add and may be any character key.

F1 to F18 are the positions of small function keys. F stands for Function.

BF1 to BF18 are the positions of big function keys. BF stands for Big Function. They usually refer to Backspace, Enter, Ctrl and other big function keys.

Cu1 to Cu8 are the positions of cursor keys. Cu stands for Cursor.

DETAILED DESCRIPTION OF THE EMBODIMENTS

The preferred embodiments of the present invention will be described below with reference to the accompanying drawings. It should be understood that the preferred embodiments described here are intended to illustrate and not to limit the present invention.

FIG. 1 is a schematic view of an existing small size electronic device keyboard with reduced height and length. As shown in FIG. 1, currently all manufacturers reduce the height and length of conventional standard keyboards to form small size keyboards based on different screen sizes.

FIG. 2 is a schematic view of a small size electronic device keyboard with reduced length and increased height according to the present invention. As shown in FIG. 2, the present invention reduces the length of a conventional standard keyboard and increases its height to form a full size keyboard based on different screen size.

FIG. 3 is a schematic view of a small size electronic device keyboard with reduced length and unchanged height according to the present invention. As shown in FIG. 3, the present invention reduces the length of a conventional standard keyboard and keeps its height unchanged to form a full size keyboard based on different screen sizes.

Figures 1, 4:
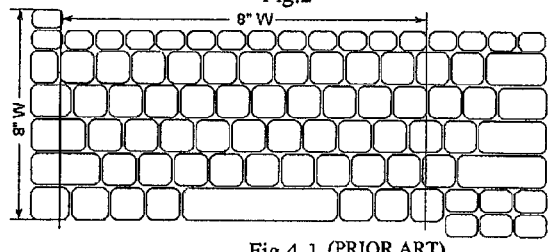
FIG. 4 is a schematic view of the area of a conventional keyboard corresponding to the screen of different size.
Figures 2, 4:
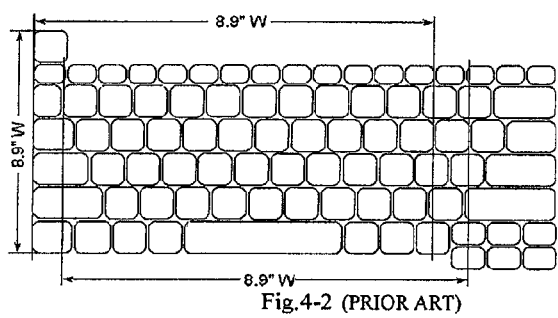
Figures 3, 4:
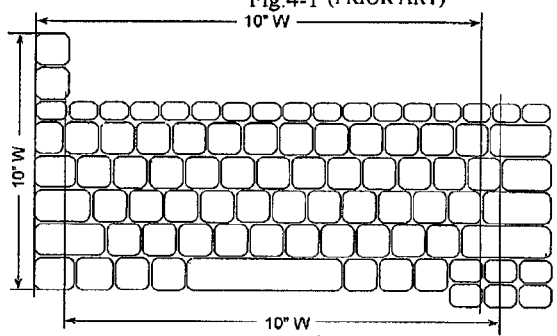
Figure 4:
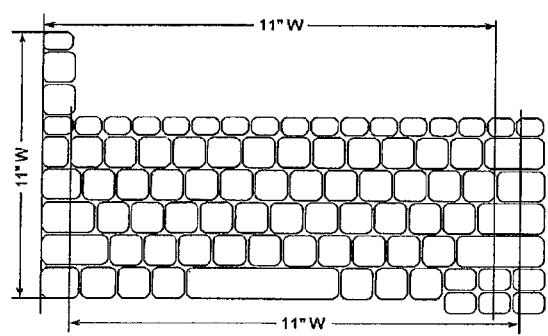
Figures 4, 5:
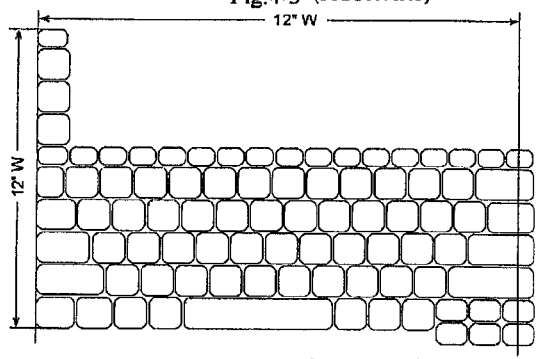
Figures 1, 5:
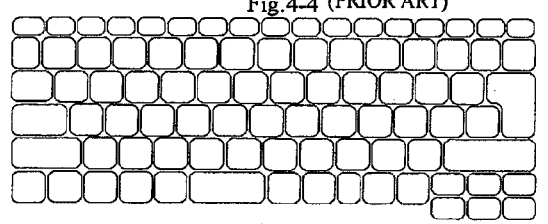
Figures 2, 5:
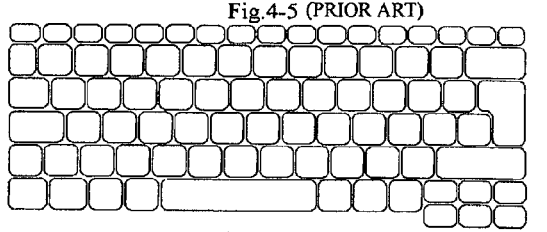

For a portable device with a screen of less than 12 inches, its internal space is not enough to accommodate a standard full size keyboard. FIG. 103 shows a conventional layout of a portable electronic device. The keyboard is above the input interface. The touchpad is below the input interface. This layout may provide full size keys when the size of the device is greater than or equal to 12 inches. As shown in FIG. 4-5, a 12-inch widescreen device can merely accommodate a keyboard with full size keys. When the size of the device is smaller than 12 inches, the key layout of a conventional keyboard can only accommodate a part of the keys, as shown in FIG. 4-1, FIG. 4-2, FIG. 4-3 and FIG. 4-4.

FIG. 4 shows the size of the area of a standard full size keyboard corresponding to different screen size. FIG. 4-1 shows the corresponding keyboard of an 8-inch device. The length is equivalent to 10 to 10.5 times of the standard key width and the height is equivalent to the height of a standard keyboard plus the height of a small function key. FIG. 4-2 shows the corresponding keyboard of a 9-inch device. The length is equivalent to about 11.5 times of the standard key width and the height is equivalent to the height of a standard keyboard plus the height of a standard key. FIG. 4-3 shows the corresponding keyboard of a 10-inch device. The length is equivalent to about 12.5 times of the standard key width and the height is equivalent to the height of a standard keyboard plus the height of two standard keys. FIG. 4-4 shows the corresponding keyboard of an 11-inch device. The length is equivalent to about 13.5 times of the standard key width and the height is equivalent to the height of a standard keyboard plus the height of 2.5 standard keys. FIG. 4-5 shows the corresponding keyboard of a 12-inch device. The length is a half standard key width shorter than the length of a standard keyboard and the height is equivalent to the height of a standard keyboard plus the height of 3.5 standard keys. FIG. 4 is an example of a standard 84-key English keyboard. FIG. 5-1 is an example of an 89-key Japanese keyboard. FIG. 5-2 is an example of an 85-key European keyboard and its length and width are same as those of the English keyboard shown in FIG. 4.

With regard to the small portable electronic devices which are not big enough to accommodate a full size keyboard, all companies in the world adopt a solution shown in FIG. 1 at present, i.e.: keeping the layout and relative positions of all keys unchanged, changing the size of all keys, reducing the length and height of the keyboard at the same time, downsizing the keys with higher use frequency less greatly and downsizing the keys with lower use frequency more greatly. In this design solution, the keyboard keys were only about 80% the size of full size keyboard keys in the beginning and later on the companies increased the length of devices through increasing the width of the frames on the two sides of the screens. At present, the keyboard keys are about 92% the size of the standard full size keys. However, 92% of the size is still not convenient for user's input. Except the small size keys, this design solution also has two defects. Firstly, the frame on the two sides of the screen is too wide, does not look nice and gives users a visual feeling of a smaller screen. Secondly, in order to enlarge the keyboard, the length of device is increased through widening screen frame, but the portability suffers.

A solution of the present invention is shown in FIG. 2: keeping the size of the keys unchanged, changing the layout and positions of keys, reducing the horizontal length of the keyboard and increasing the vertical height; transferring the keys surplus in the horizontal direction to one row or a plurality of rows added in the vertical direction.

Another solution of the present invention is shown in FIG. 3: reducing the horizontal length of the keyboard, keeping the vertical height unchanged, and merging or reducing the keys surplus in the horizontal direction or transferring them to other keys.

The solutions of the present invention as shown in FIG. 2 and FIG. 3 not only provide the 100% size of standard keyboard keys but also decrease the size of the portable device, making it more portable; the frame on the two sides of the screen is of normal width. As a result, the screen looks bigger and the product looks more beautiful.

Figure 9:
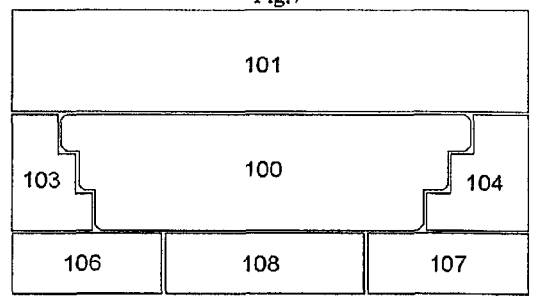
FIG. 9 is a schematic view for zoning of a small QWERTY keyboard according to the present invention.

FIG. 6 to FIG. 9 show a specific design method for a small QWERTY keyboard of the present invention and are also the detailed descriptions on the design principles of FIG. 2 and FIG. 3. As shown in FIG. 6 to FIG. 9: all keys except the letter keys in the center area of a conventional keyboard are rearranged. FIG. 6 shows the size, positions and layout of the keys in area 100 in an inverted trapezoidal shape within the black frame of the conventional keyboard are not changed, while all keys outside area 100 are rearranged to area 101 and area 102 in FIG. 7. As shown in FIG. 8, area 102 consists of area 103, area 104 and area 105, area 103 is on the left of area 100, area 104 is on the right of area 100, and area 105 is below area 100. As shown in FIG. 9, area 105 may be further divided into area 106 on the left, area 108 in the middle and area 107 on the right. Area 100 in an inverted trapezoidal shape in the middle remains unchanged all the time, the size, shape and area of area 101 to area 108 vary with the size of the device, and the specific key distribution in area 101 to area 108 may be freely designed according to the size of the device, the layout of keys, languages and other needs.

Figure 11:
FIG. 11 is a schematic view of the letter area reserved in the middle of a conventional English keyboard.
Figures 1, 12:
Figures 2, 12:

FIG. 10 shows the composition of area 100, which is in an inverted trapezoidal shape and keeps the size and positions of the keys in the center of a conventional keyboard unchanged. This area in an inverted trapezoidal shape comprises 27 keys, including 10 keys on the first row, 9 keys on the second row and 8 keys on the third rows. Its left edge tilts towards bottom right and its right edge tilts towards bottom left to form an inverted trapezoidal shape. The mark numbers from C1 to C27 stand for character keys. C stands for Character and may be a letter key, a punctuation key, a function key or any other character key; 1 to 27 refer to the serial numbers of the keys. The size and positions of the keys in area 100 remain unchanged, the length and width of the keys are not changed (typically 18 mm*18 mm and 19 mm*19 mm), and the distance of the keys is not changed (typically 19 mm to 19.5 mm). FIG. 11 is an example of an English keyboard of FIG. 10. The first row contains 10 keys: "QWERTYUIOP", the second row contains 9 keys: "ASDFGHJKL" and the third row contains 7 keys: "ZXCVBNM" plus a character key. In the conventional QWERTY keyboard layout, FIG. 11 shows the letter layout adopted by most keyboards. FIG. 12-1 and FIG. 12-2 are another two examples of FIG. 10. In FIG. 12, the first row contains 11 keys, the second row contains 10 keys, the third row contains 9 keys, and there are 30 keys in total. FIG. 12-1 is an area in an inverted trapezoidal shape where letters are arranged in an alphabetic order, wherein, the first row contains "ABCDEFG", the second row contains "HIGKLMNOPQ" and the third row contains "RSTUVWXYZ". FIG. 12-2 is an example of a French keyboard. In the French keyboard, the first row of area 100 contains 10 keys: "AZERTYUIOP", the second row contains "QSDFGHJKLM" and the third row contains "WXCVBN". Area 100 may also be an inverted trapezoidal shape containing more keys, for example: 12 keys on the first row, 11 keys on the second row and 10 keys on the third row, 33 keys in total.

Figure 13:
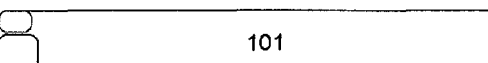
FIG. 13 is a schematic view of area 101 as high as one and a half keys according to the present invention.
Figure 14:
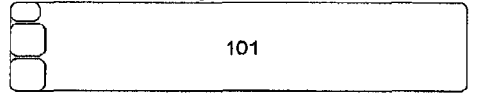
FIG. 14 is a schematic view of area 101 as high as two and a half keys according to the present invention.
Figures 1, 15:
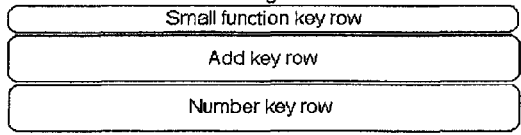
Figures 2, 15:
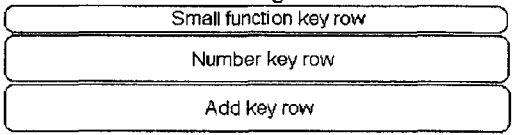

Area 101 may be at any height. FIG. 13 and FIG. 14 are two examples of area 101 in FIG. 7. The height of FIG. 13 is equal to the height of a standard key plus the height of a small function key; in FIG. 14, one row is added, and its height is equal to the height of two standard keys plus the height of a small function key. In fact, except the example of unchanged height in FIG. 13 and the example of addition of one row in FIG. 14, two or more rows of keys may be added in area 101 if necessary. One guideline of the present invention is that one row or more than one row may be added on the keyboard to accommodate more basic language symbols. In the world, in addition to English and European languages, many languages have a lot of basic language symbols. For example, Japanese has 50 kavas, Korean has about 40 symbols, Russian has about 30 symbols, and Arabic, Indian and Chinese contain more basic symbols. Moreover, these languages are all spoken by many people. One row or more rows may be added to the conventional keyboard to accommodate more language symbols. This approach may avoid repeated switchover needed by a conventional keyboard during input of many basic language symbols. More rows may be added according to the size of the device and language types. The positions of the added rows may be changed and it is not necessary to add the rows above the numeric row. FIG. 15 shows two examples of FIG. 14. FIG. 15-1 shows the added row of keys is above the numeric keys. FIG. 15-2 shows the added row of keys is below the numeric keys.

Figure 16:
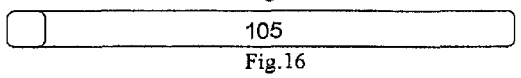
FIG. 16 is a schematic view of area 105 as high as one key according to the present invention.
Figure 17:
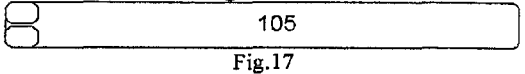
FIG. 17 is a schematic view of area 105 as high as two small cursor keys according to the present invention.
Figure 18:
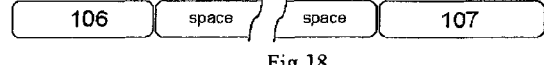
FIG. 18 is a schematic view of areas 106 and 107 as high as one key according to the present invention.
Figure 19:
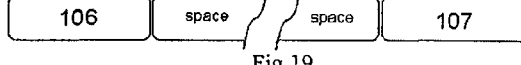
FIG. 19 is a schematic view of areas 106 and 107 as high as two small cursor keys according to the present invention.
Figure 20:
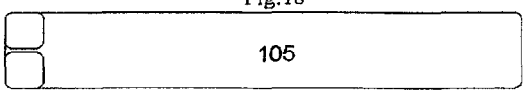
FIG. 20 is a schematic view of area 105 as high as two keys according to the present invention.
Figure 21:
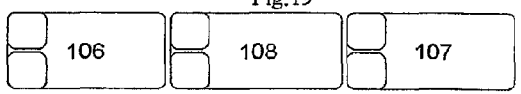
FIG. 21 is a schematic view of areas 106, 107 and 108 as high as two keys according to the present invention.

Area 105 may be at any height. FIG. 16, FIG. 17 and FIG. 20 are three examples of area 105: FIG. 16 shows the height of a standard key; FIG. 17 shows the height of two small cursor keys; and FIG. 20 shows the height of two standard keys. FIG. 18 is an example of FIG. 16 and comprises area 106 with a height of one key on the left, a Space key in the middle, and area 107 with a height of one key on the right. FIG. 19 is an example of FIG. 17 and comprises area 106 with a height of two small cursor keys on the left, a Space key in the middle and area 107 with a height of two small cursor keys on the right. FIG. 21 is an example of FIG. 20 and comprises areas 106, 107 and 108, all of which have a height of two standard keys.

Figures 27, 162:
Figures 28, 162:
Figures 29, 162:
Figures 30, 162:
Figures 31, 162:
Figures 32, 162:
Figures 33, 162:
Figures 34, 162:
Figures 35, 162:
Figures 36, 162:
Figures 37, 162:
Figures 38, 162:
Figures 39, 162:
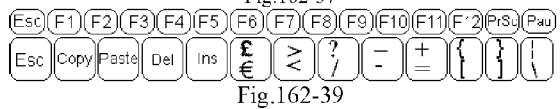
Figures 40, 162:
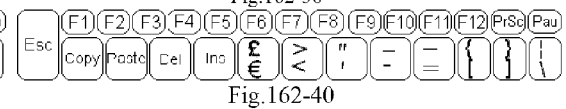
Figures 41, 162:
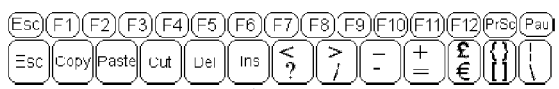
Figures 42, 162:
Figures 43, 162:
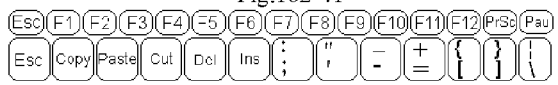
Figures 44, 162:
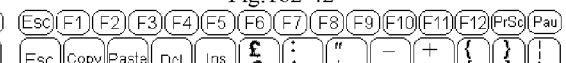
Figures 45, 162:
Figures 46, 162:
Figures 47, 162:
Figures 48, 162:
Figures 49, 162:
Figures 50, 162:

FIG. 22 to FIG. 53 are detailed descriptions on FIG. 16 and FIG. 18, wherein, BF stands for Big Function and refers to large function keys, typically Ctrl key, Alt key, Systems key, Fn key and Alt Green key. BF1 to BF15 stand for serial numbers. Cu stands for Cursor, typically the four cursor keys: Up, Down, Left and Right, and page turning keys. Cu1 to Cu8 stand for serial numbers. FIG. 22 to FIG. 25 are design templates of area 106 with a height of a standard key. FIG. 22 is a design template of area 106 with four function keys on the left of Space key. FIG. 23 is a design template of area 106 with three function keys on the left of Space key. FIG. 24 is a design template of area 106 with two function keys on the left of Space key. FIG. 25 is a design template of area 106 with one function key on the left of Space key. FIG. 26 and FIG. 27 are two examples of FIG. 22. In FIG. 26, Ctrl key is on the leftmost. In FIG. 27, Fn key is on the leftmost. FIG. 28 is an example of FIG. 23. FIG. 29 and FIG. 30 are two examples of Systems keys. Systems keys refer to the keys of the operation system. FIG. 29 is an example of the Systems keys of Microsoft. FIG. 30 is an example of the Systems keys of Apple. If the keyboard is for other operating system, the Systems keys may be the style of other default Systems keys. FIG. 31 to FIG. 38 are design templates of area 107 with a height of a standard key. FIG. 31 is a design template with three function keys and six small cursor keys on the right of Space key. FIG. 32 is a design template with two function keys and six small cursor keys on the right of Space key. FIG. 33 is a design template with one function key and six small cursor keys on the right of Space key. FIG. 34 is a design template with only six small cursor keys on the right of Space key. FIG. 35 is a design template with five function keys on the right of Space key. FIG. 36 is a design template with four function keys on the right of Space key. FIG. 37 is a design template with three function keys on the right of Space key. FIG. 38 is a design template with two function keys on the right of Space key. FIG. 39 and FIG. 40 are two examples of FIG. 31. FIG. 41 is a design example of FIG. 32. FIG. 42 is a design example of FIG. 33. FIG. 43 is a design example of FIG. 34. FIG. 44 and FIG. 45 are design examples of FIG. 35. FIG. 46 and FIG. 47 are design examples of FIG. 36. FIG. 48 and FIG. 49 are design examples of FIG. 37. FIG. 51, FIG. 52 and FIG. 53 are design examples of FIG. 38. The accompanying drawings do not show the template of area 107 with only one function key on the right. FIG. 50 is an example with only one function key. Among these design examples, the advantage of FIG. 41 is that it has Alt Green key, Ctrl key and six cursor keys on the right of Space key, and is closest to the conventional layout. The advantage of FIG. 42 is that Right Ctrl key which is not frequently used is removed to make Space key even longer. The advantage of FIG. 46 is that it has Alt Green key, Ctrl key, and two direction keys under the condition of a longer Space key. The advantage of FIG. 48 is that it has Alt Green key, Ctrl key, and a direction key under the condition of a longer Space key. The advantage of FIG. 49 is that it has two direction keys under the condition of a longer Space key. The advantage of FIG. 51 is that it is applicable to the design of a device in a very small size.

FIG. 54 to FIG. 80 are detailed descriptions on FIG. 17 and FIG. 19. They are same to the detailed descriptions of FIG. 22 to FIG. 53 for FIG. 16 and FIG. 18 as shown above. The difference is that the height is the height of two small cursor keys. The design drawings are almost the same. Only the height is changed from the height of one standard key to the height of two small cursor keys. The advantage of this design is that Space key becomes higher and the striking with thumb is more comfortable. The height of the direction key is also increased, making the striking more comfortable. One more advantage is that the lower edge of the keyboard is aligned and looks nicer.

FIG. 81 to FIG. 102 are detailed descriptions on FIG. 20 and FIG. 21. "A" stands for Add and refers to an added key, which may be any character key. A1 to A15 stand for serial numbers. FIG. 81 and FIG. 82 are the design templates of area 106 with a height of two standard keys. FIG. 81 is a design template of area 106 with six keys. FIG. 82 is a design template of area 106 with eight keys. FIG. 83 is a design example of FIG. 81. FIG. 84 is a design example of FIG. 82. FIG. 85 to FIG. 90 are design templates of area 107 with a height of two standard keys. FIG. 85 to FIG. 87 are design templates of area 107 with the size of six keys. The six keys in FIG. 85 include three added keys on the upper row and three function keys on the lower row. The six keys in FIG. 86 are six large cursor keys. FIG. 87 shows a touchpad with the size of six keys. FIG. 91 is a design example of FIG. 85. FIG. 92 is a design example of FIG. 86. FIG. 88 to FIG. 90 are design templates of area 107 with the size of eight keys. The eight keys in FIG. 88 include four added keys on the upper row and four function keys on the lower row. The eight keys in FIG. 89 include two keys and six large cursor keys. FIG. 90 shows two keys and a touchpad with the size of six keys. FIG. 93 is a design example of FIG. 88. FIG. 94 is a design example of FIG. 89. FIG. 95 is a design example of FIG. 90.

FIG. 96 to FIG. 98 are design templates of area 108 with a height of two standard keys. FIG. 96 is a design template with three large function keys on the upper row and a Space key on the lower row. FIG. 97 is a design template with four large function keys on the upper row and a Space key on the lower row. FIG. 98 is a design template with a triangular Shift key in the middle, two symmetric parallelogram and centrally tilted Space keys on the two sides of Shift key, and Backspace key and Enter key in an inverted triangular or inverted trapezoidal shape on the outmost sides. FIG. 99 and FIG. 100 are design examples of FIG. 96. According to different user habits, Backspace key is arranged on the left or right of Shift key. FIG. 101 and FIG. 102 are design examples of FIG. 97. According to different user habits, Backspace key is arranged on the left or right of Shift key. Same as FIG. 99, FIG. 98 may swap the positions of Backspace key and Enter key. In FIG. 98 to FIG. 102, Shift key is arranged in the middle of the keyboard, thus the two "SHIFT" keys on the left and right sides of a conventional keyboard are merged into one "SHIFT" key in the middle. This approach saves space and hand over "SHIFT" key from two little fingers to thumbs or index fingers, making the operation become healthier to fingers. Originally, when the two little fingers strike "SHIFT" keys, they have to move longer. As a result, the distortion angle of the wrists is large, which is not healthy to hands. After "SHIFT" key is handed over to thumbs or index fingers, the striking becomes more powerful, hands needn't move and wrists are not distorted, so the operation is healthier and faster. Likewise, if Enter key and Backspace key are arranged in the middle and are strikers with two thumbs or index fingers other than as the right little finger, the moving distance will be reduced and wrist distortion will be avoided. FIG. 98 shows a design under which Space key, Backspace key, Shift key and Enter key are longitudinally lengthened. Its advantage is that the directions and size of Space key, Backspace key, Shift key and Enter key make it more convenient and efficient and healthier to strike with thumbs. Particularly, the angles of the two Space keys are just the resting angles of the two thumbs, so the design is consistent with the principles of ergonomics.

The length of BF1 key to BF15 key in the design templates and examples of FIG. 22 to FIG. 102 are not fixed. It may be changed according to keyboard layout, user habit and language type.

Figures 76, 77:
Figures 78, 79, 80:
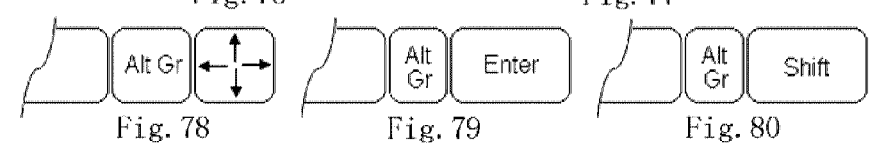
Figure 110:
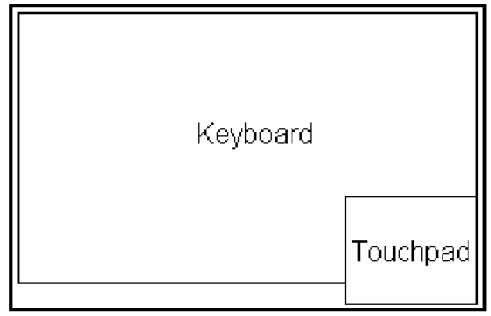
FIG. 110 is a schematic view of a keyboard with a touchpad is at its bottom right corner and the lower edge of the touchpad exceeding the lower edge of the keyboard according to the present invention.
Figure 111:
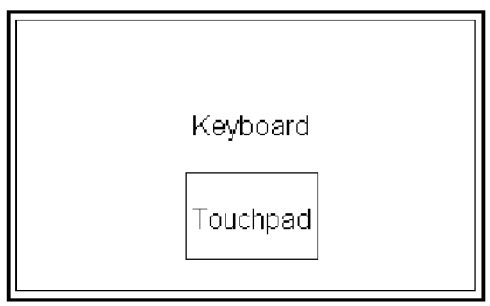
FIG. 111 is a schematic view of a keyboard with a touchpad in its interior middle and mouse keys below the touchpad according to the present invention.
Figure 112:
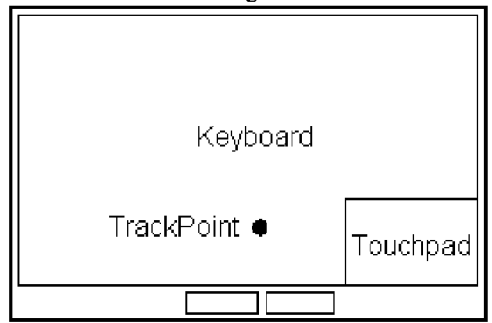
FIG. 112 is schematic view of a keyboard with touchpad at its interior bottom right corner and with track point according to the present invention.
Figure 113:
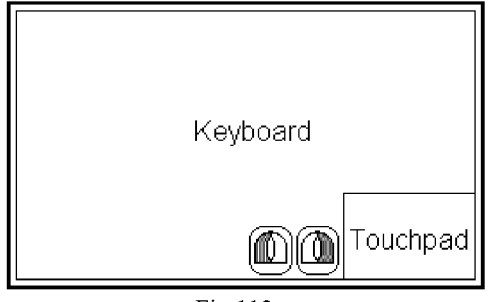
FIG. 113 is a schematic view of a keyboard with a touchpad and mouse keys both at its interior bottom right corner according to the present invention.
Figure 114:
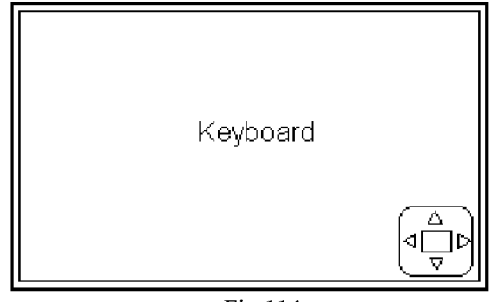
FIG. 114 is a schematic view of a keyboard with a direction key at its bottom right corner according to the present invention.

FIG. 103 to FIG. 114 are schematics views for the plane layouts of the keyboards on portable devices. FIG. 103 shows a conventional layout. Below the long keyboard is a touchpad, and below the touchpad are the left key and right key of the mouse. This keyboard layout may realize a keyboard of full size keys only when the screen is greater than 12 inches. FIG. 104 shows a layout without a touchpad but with a track point. FIG. 104 is an example of the keyboard of the present invention. In the layout shown in FIG. 104, the length of the keyboard is reduced and the height of the keyboard is increased in order to accommodate full size keyboard keys. In the layout shown in FIG. 105, the length of the keyboard is reduced, its height remains unchanged, a touchpad is disposed below the keyboard, and the left and right buttons of the mouse are integrated with the touchpad. In the layout shown in FIG. 106, the touchpad is in the interior middle of the keyboard, and the left and right buttons of the mouse are below the keyboard. In the layout shown in FIG. 107, the touchpad is in the interior middle of the keyboard, and the left and right buttons of the mouse are integrated with the touchpad. In the layout shown in FIG. 108, the touchpad and the left and right buttons of the mouse are all in the interior middle of the keyboard. In the layout shown in FIG. 109, the touchpad is at the interior bottom right corner of the keyboard. The layout shown in FIG. 110 is same as that shown in FIG. 109 except that the edge of touchpad exceeds the edge of the keyboard. In FIG. 111, the touchpad is in the interior middle of the keyboard, there are keys on all around the touchpad, and the left and right buttons of the mouse are integrated with the touchpad. In FIG. 112, a track point is added on the basis of FIG. 109. In FIG. 113, the left and right buttons of the mouse are added inside the keyboard and on the left of the touchpad on the basis of FIG. 109. In FIG. 114, a four-direction key is added at the bottom right corner inside the keyboard, which has been mentioned in the introduction of area 107. The direction key is similar to the one on a mobile phone. When the upper part of the key is pressed, the cursor will move upward; when the lower part is pressed, the cursor will move downward; when the left part is pressed, the cursor will move leftward; when the right part is pressed, the cursor will move rightward. When Shift key (or Fn key) and the upper part of the direction key are pressed at the same time, it serves as a Page Up key; when Shift key (or Fn key) and the lower part of the direction key are pressed at the same time, it serves as a Page Down key; when Shift key (or Fn key) and the left part of the direction key are pressed at the same time, it serves as a Home key; when Shift key (or Fn key) and the right part of the direction key are pressed at the same time, it serves as an End key. The definitions of Page Up key, Page Down key, Home key and End key may be swapped. Up and down stand for Home key and End key; and Left and Right stand for Page Up key and Page Down key. As one direction key may realize the functions of eight keys on a conventional keyboard, the key positions and space are saved significantly. Alternatively, two direction keys may be arranged in area 107. One of the 4-direction keys is intended to realize the up, down, left and right movements of the cursor, and the other 4-direction key is intended to serve as page turning keys. In this way, when Page Up key, Page Down key, Home key and End key are pressed, there is not need to press Shift key (or Fn key). The two direction keys in FIG. 77 are very large. One advantage of this design is that the user may adjust the cursor more conveniently. The other advantage is that the large four-direction keys are very useful to game players.

Figure 115:
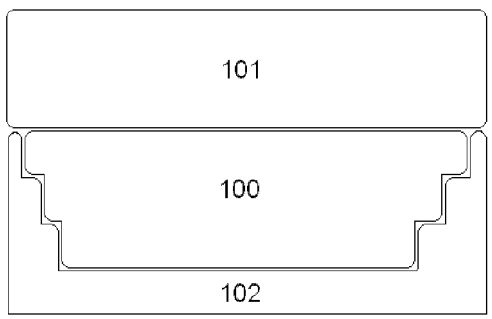
FIG. 115 is a schematic view of an 8-inch keyboard according to the present invention.
Figure 116:
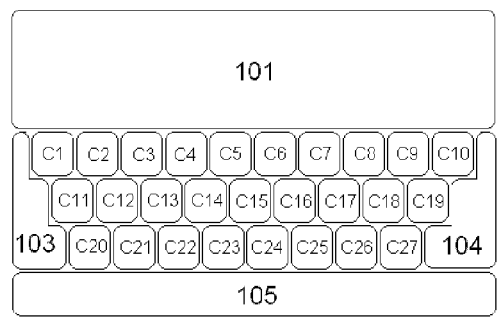
FIG. 116 is a schematic view for zoning of an 8-inch keyboard according to the present invention.
Figure 117:
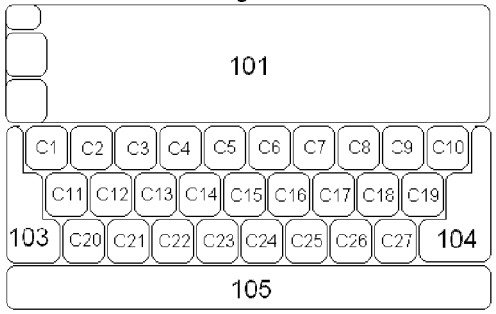
FIG. 117 is a schematic view for zoning of an 8-inch keyboard according to the present invention.
Figures 118, 119, 120:
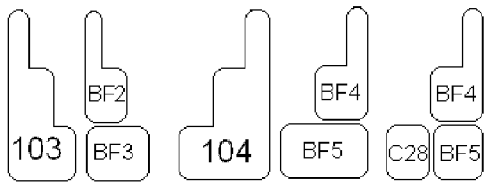
FIG. 118 is a design template of area 103 of an 8-inch keyboard according to the present invention.
FIG. 119 to FIG. 120 are design templates of area 104 of an 8-inch keyboard according to the present invention.
Figures 1, 121:
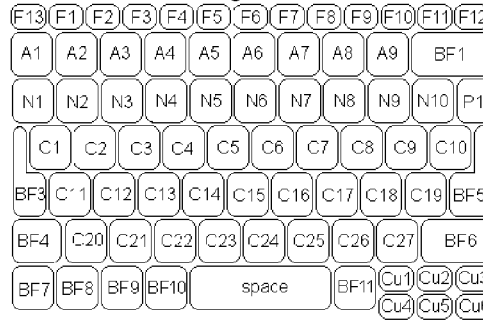
Figures 2, 121:
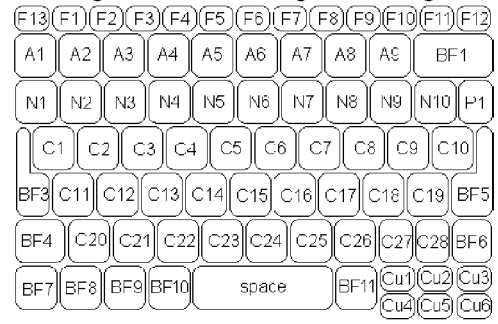
Figures 3, 121:
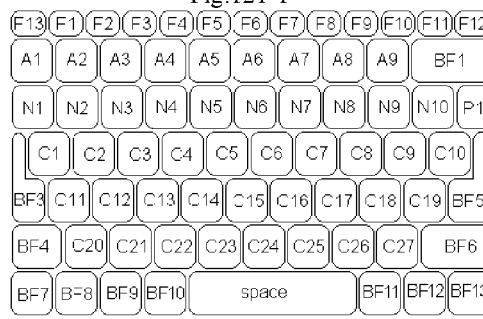
Figures 4, 121:
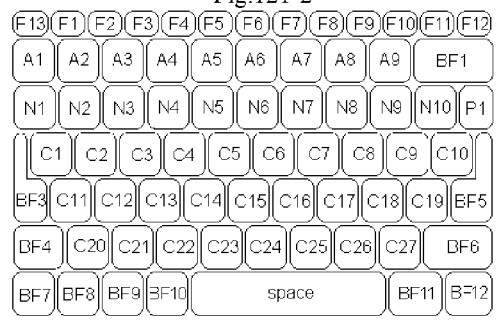
Figures 1, 122:
Figures 2, 122:
Figures 3, 122:
Figures 4, 122:
Figures 5, 122:
Figures 6, 122:

FIG. 115 is an example when FIG. 7 is used in a device with an 8-inch screen. The left boundary starts from the left of "1" key on the numeric row of a conventional keyboard. The right boundary ends at the key on the right of "L" key on the row of "ASDF" on a conventional keyboard, typically of the key of ";" key. FIG. 116 is a schematic view for zoning of FIG. 115, wherein area 100 contains 27 reserved keys, which form an inverted trapezoidal shape, and area 102 consists of area 103, area 104 and area 105. FIG. 117 is an example of FIG. 116, and a schematic view of area 101 with one row added. In FIG. 117, area 101 may be either FIG. 15-1 or FIG. 15-2. FIG. 174 is another example of FIG. 116. It is a schematic view of area 101 where the height is not changed, and also a design example of FIG. 3 where height is not changed. FIG. 118 is a design template of area 103 in FIG. 116. FIG. 119 and FIG. 120 are design templates of area 104 in FIG. 116. In FIG. 116, area 105 may be any of FIG. 16 to FIG. 102. All combinations of all possible designs of areas 101, 103, 104 and 105 in FIG. 116 are within the protection scope of the present invention. FIG. 121 is an example of the design template for a few combinations in FIG. 117. In FIG. 121, letter "F" stands for Function and typically stands for a row of small function keys above the numeric keys. F1 to F18 refer to serial numbers. Letter "A" stands for Add. It stands for added keys and may be any character key. A1 to A15 refer to serial numbers. Letter "N" stands for Number and typically stands for ten numeric keys from 0 to 9. N1 to N10 refer to serial numbers. Letter "C" stands for Character and may be letter keys, punctuation keys, function keys and other character keys; C1 to C39 refer to the serial numbers of the keys. Letter "BF" stands for Big Function, i.e. large function keys. Typically it stands for Backspace key, Enter key, Shift key, Ctrl key, Alt key, Systems key, Fn key and Alt Green key. BF1 to BF15 refer to serial numbers. Letter "Cu" stands for Cursor and typically stands for four cursor keys: Up, Down, Left and Right, and page turning keys. Cu1 to Cu8 refer to serial numbers. Letter "P" stands for Punctuation and typically stands for punctuation keys. P1 to P10 refer to serial numbers. In FIG. 121, a row of keys are added above the numeric keys. In the example given in FIG. 121, nine keys are added, and the rightmost is a large function key, intended to accommodate a Backspace key. A punctuation key is added at the rightmost of the row of numeric keys. Area 104 in FIG. 121-1, FIG. 121-3 and FIG. 121-4 is an example of FIG. 119. Area 104 in FIG. 121-2 is an example of FIG. 120. Area 107 in FIG. 121-1 and FIG. 121-2 is an example of FIG. 33. Area 107 in FIG. 121-3 is an example of FIG. 37. Area 107 in FIG. 121-4 is an example of FIG. 38. FIG. 122 shows the design examples of the design templates shown in FIG. 121, wherein FIG. 122-1 is a design example of FIG. 121-1, FIG. 122-2 is a design example of FIG. 121-2, FIG. 122-3 to FIG. 122-5 are design examples of FIG. 121-3, and FIG. 122-6 is a design example of FIG. 121-4.

In the example given in FIG. 122-4, "<" key and ">" key are merged; "{" key and "}" key are merged; "[" key and "]" key are merged; "(" key and ")" key are merged; when a merger key is strikers during input, it is equivalent to simultaneous input of three keys, namely simultaneous input of pair keys plus a left cursor key which will automatically bring the cursor to the middle of the pair keys. As users usually use these keys in pair, so the merger of these keys may reduce input times and save a key position to arrange other keys. After pair keys are input, the system will automatically move the cursor to the middle of the pair keys so that the user may directly input new content. Further, double quotation mark keys, single quotation mark keys and other keys used in pair may also adopt this key merger method. The system may be set to automatically input a pair of double quotation marks " " and a left cursor key and place the cursor in the middle when a double quotation mark key is pressed. In this way, the user may input one less time and avoid the problem of asymmetric input of quotation marks by the system. For example, when the user wants to input a right double quotation mark, a left double quotation mark is actually input; when the user wants to input a left double quotation mark, a right double quotation mark is actually input. When the user wants to input one of the pair symbols, the user may directly press the pair key in cooperation with Backspace key and Delete key, or may press Alt Green key, Shift key plus Alt Green key and the merger key at the same time.

In FIG. 122-1 and FIG. 122-3 to FIG. 122-6, comma and full stop are merged into one key. When the key is pressed, comma will be input and when this key and Shift key are pressed simultaneously, full stop will be input. Alternatively, full stop may be input through a single press and comma may be input through simultaneous press of the key and Shift key.

Figure 123:
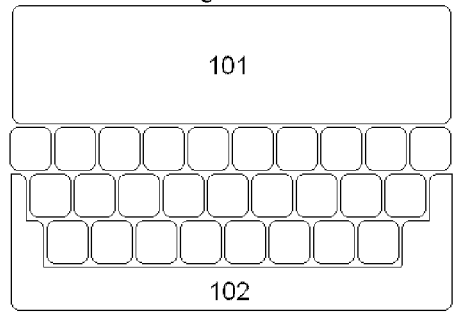
FIG. 123 is a schematic view of an 8-inch keyboard according to the present invention.
Figure 124:
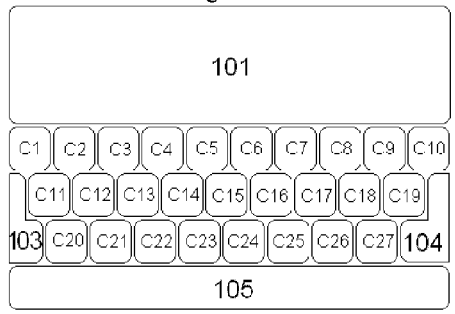
FIG. 124 is a schematic view for zoning of an 8-inch keyboard according to the present invention.
Figure 125:
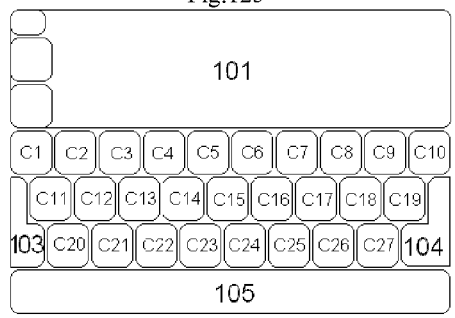
FIG. 125 is a schematic view for zoning of an 8-inch keyboard according to the present invention.
Figures 126, 127, 128:
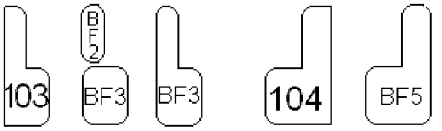
FIG. 126 to FIG. 127 are design templates of area 103 of an 8-inch keyboard according to the present invention.
FIG. 128 is a design template of area 104 of an 8-inch keyboard according to the present invention.
Figures 1, 129:
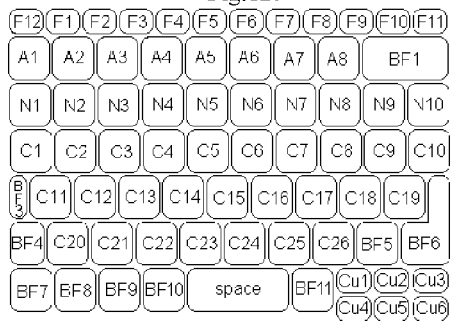
Figures 2, 129:
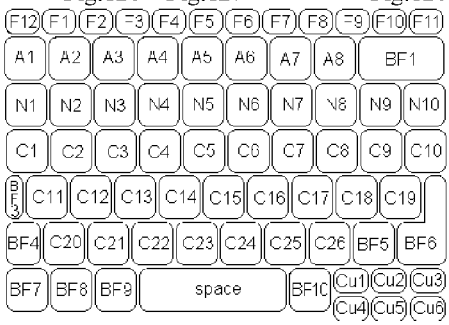
Figures 3, 129:
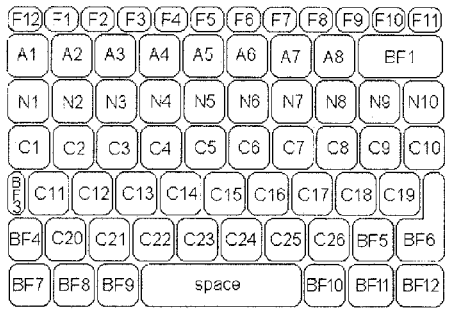
Figures 4, 129:
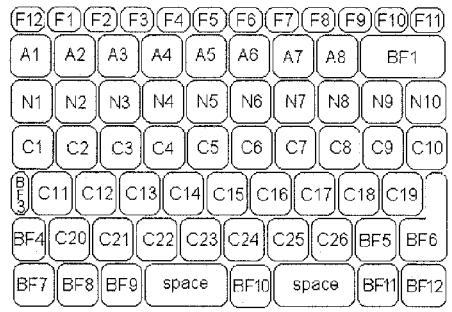
Figures 1, 130:
Figures 2, 130:
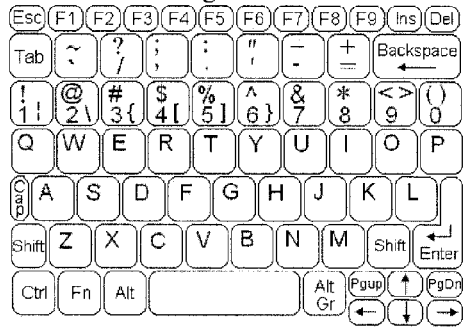
Figures 3, 130:
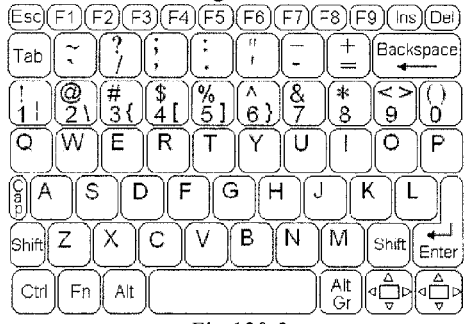
Figures 4, 130:

FIG. 123 is another example when FIG. 7 is used on a device with an 8-inch screen. The left boundary starts from the left of "Q" key on "QWERTY" row of a conventional keyboard. The right boundary ends at the right of "P" key on "QWERTY" row of a conventional keyboard. FIG. 124 is a schematic view for zoning of FIG. 123. FIG. 125 is an example of FIG. 124 when one row of keys is added in area 101. FIG. 126 and FIG. 127 are design templates of area 103 in FIG. 124. FIG. 128 is a design template of area 104 in FIG. 124. FIG. 129 shows the examples of a few design templates shown in FIG. 125. In FIG. 129, one row of keys is added in area 101 and 8 keys are added, wherein area 106 in FIG. 129-1 contains 4 function keys, and area 106 in FIG. 129-2 to FIG. 129-3 contains 3 function keys. In the design template shown in FIG. 129-4, a function key is added in the middle of the Space key. FIG. 130-1 is a design example of FIG. 129-1. FIG. 130-2 is a design example of FIG. 129-2. FIG. 130-3 is a design example of FIG. 129-3. FIG. 130-4 is a design example of FIG. 129-4. In FIG. 130-1 to FIG. 130-3, the key position on the right of M key is reserved for Shift key. In FIG. 130-4, Shift key is placed in the middle of Space key, while the original positions of Shift keys on the two sides are used to accommodate other keys. FIG. 123 to FIG. 130 are designs with the shortest length, which may accommodate the keys of a conventional QWERTY full size keyboard.

In the example of an 8-inch layout, due to the limitation of length, the uppermost row of small function keys can not accommodate 12 keys. The left small function keys, such as "F11" and "F12" may be merged to other small keys and realized by means of combined use with "Fn" key.

Figure 131:
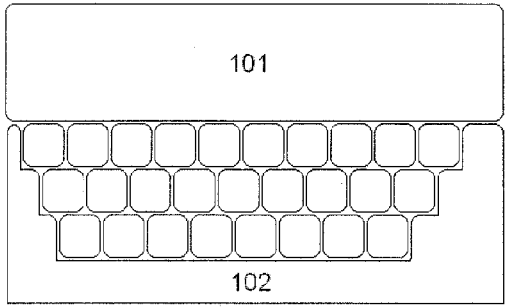
FIG. 131 is a schematic view of a 9-inch keyboard according to the present invention.
Figure 132:
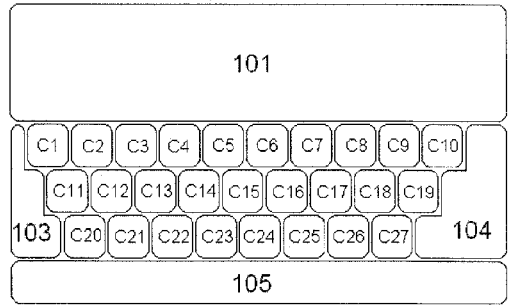
FIG. 132 is a schematic view for zoning of a 9-inch keyboard according to the present invention.
Figure 133:
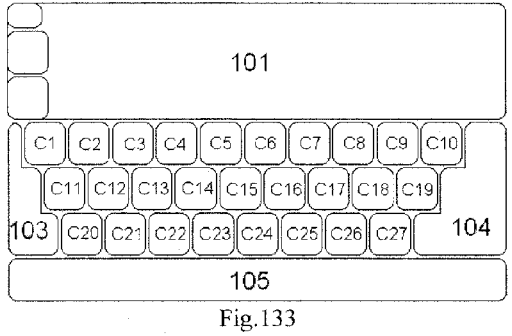
FIG. 133 is a schematic view for zoning of a 9-inch keyboard according to the present invention.
Figures 134, 135, 136, 137:
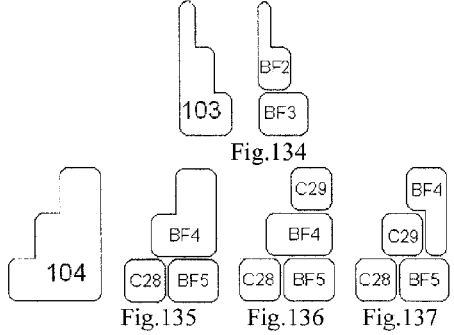
FIG. 134 is a design template of area 103 of a 9-inch keyboard according to the present invention.
FIG. 135 to FIG. 137 are design templates of area 104 of a 9-inch keyboard according to the present invention.
Figures 1, 138:
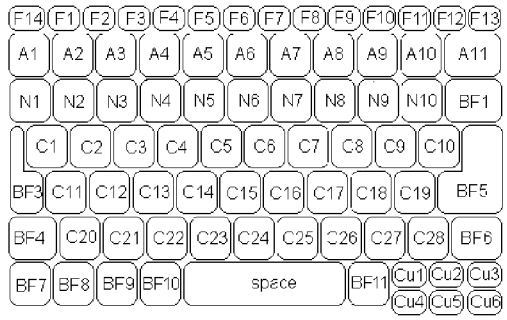
Figures 2, 138:
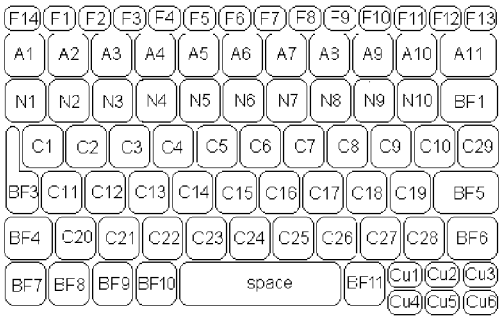
Figures 1, 139:
Figures 2, 139:
Figure 177:
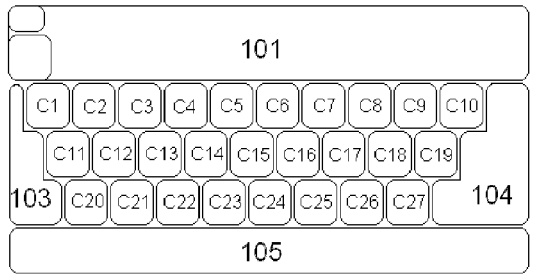
FIG. 177 is a schematic for zoning of a 9-inch keyboard with unchanged height according to the present invention.

FIG. 131 is an example when FIG. 7 is used on a device with a 9-inch screen. The left boundary starts from the left of "1" key on the numeric row of a conventional keyboard. The right boundary ends at the key on the right of "P" key on the row of "QWERTY" on a conventional keyboard, typically on the right of "{" key. FIG. 132 is a schematic view for zoning of FIG. 131. FIG. 133 is an example of area 101 in FIG. 132 with one row added. FIG. 177 is an example of area 101 in FIG. 132 where the height is not changed. FIG. 134 is a design template of area 103 in FIG. 132. FIG. 135, FIG. 136 and FIG. 137 are design templates of area 104 in FIG. 132. FIG. 138 shows the examples of a few design templates shown in FIG. 133. Area 104 in FIG. 138-1 adopts the design template shown in FIG. 135. Area 104 in FIG. 138-2 adopts the design template shown in FIG. 136. FIG. 139-1 is a design example of FIG. 138-1. FIG. 139-2 is a design example of FIG. 138-2.

Figure 140:
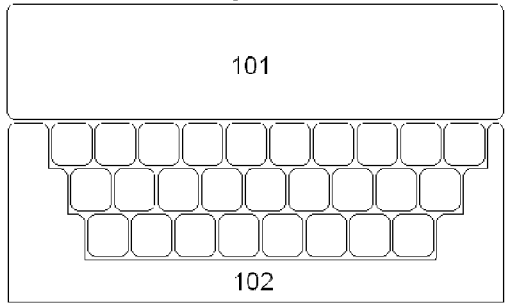
FIG. 140 shows a 9-inch keyboard according to the present invention.
Figure 141:
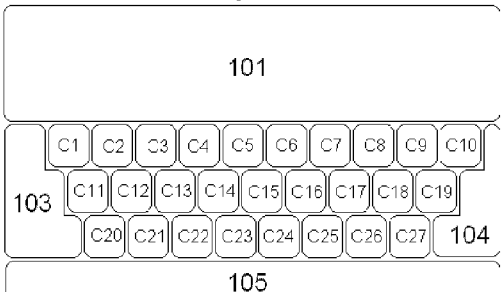
FIG. 141 is a schematic view for zoning of a 9-inch keyboard according to the present invention.
Figure 142:
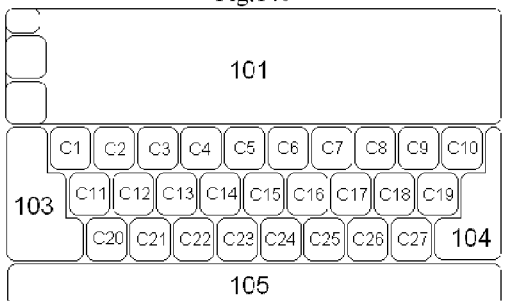
FIG. 142 is a schematic view for zoning of a 9-inch keyboard according to the present invention.
Figures 143, 144, 145, 146:
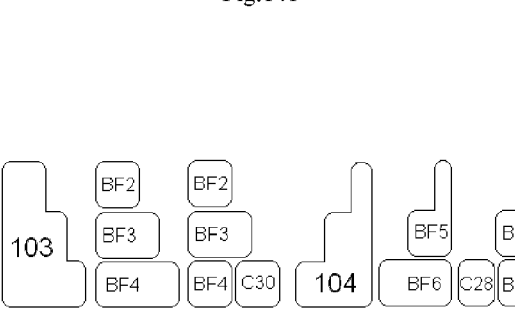
FIG. 143 to FIG. 144 are design templates of area 103 of a 9, 10 and 11-inch keyboard according to the present invention.
FIG. 145 to FIG. 146 are design template of area 104 of a 9-inch keyboard according to the present invention.
Figures 1, 147:
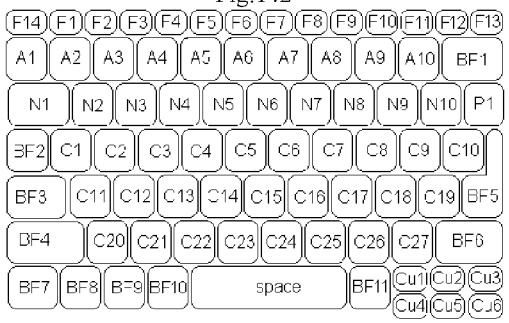
Figures 2, 147:
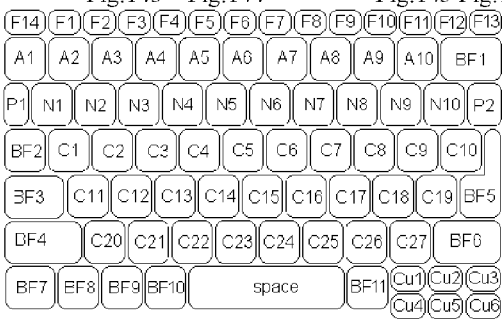

FIG. 140 is another example when FIG. 7 is used on a device with a 9-inch screen. The left boundary starts from the left of TAB key. The right boundary ends at the key on the right of "L" key on the row of "ASDF" on a conventional keyboard, typically on the right of ";" key. FIG. 141 is a schematic view for zoning of FIG. 140. FIG. 142 is an example of area 101 in FIG. 141 with one row added. FIG. 143 and FIG. 144 are design templates of area 103 in FIG. 141. FIG. 145 and FIG. 146 are design templates of area 104 in FIG. 141. FIG. 147-1 and FIG. 147-2 are examples of the design templates of FIG. 142. FIG. 148-1 is a design example of FIG. 147-1. FIG. 148-2 is a design example of FIG. 147-2.

Figures 3, 161:
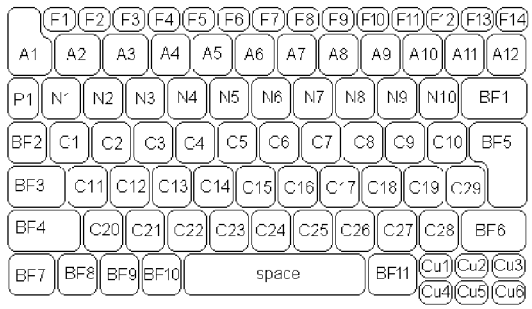
Figures 4, 161:
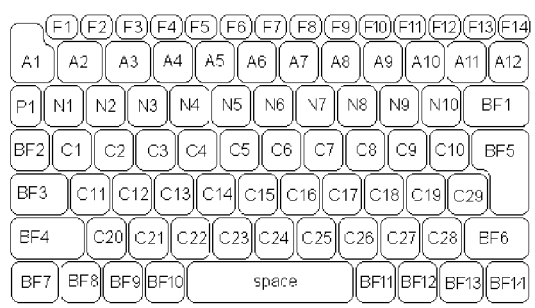
Figures 5, 161:
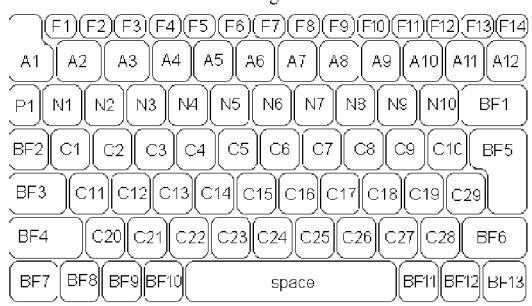
Figures 6, 161:
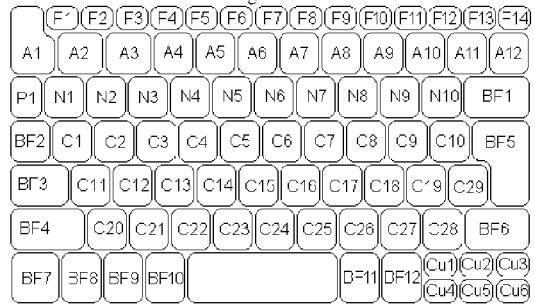
Figures 7, 161:
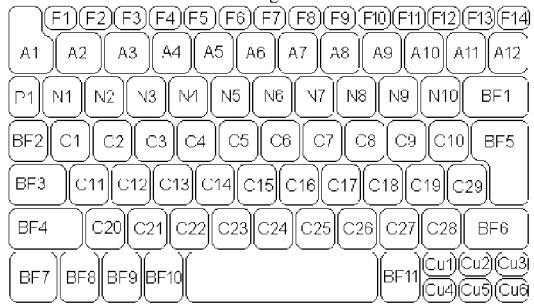
Figures 8, 161:
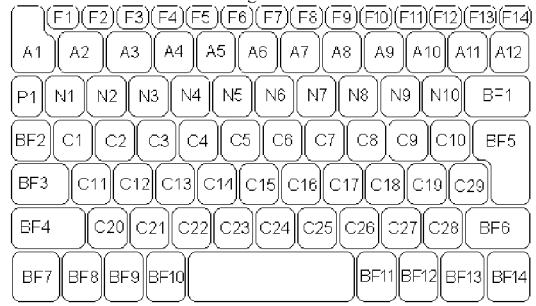
Figures 9, 161:
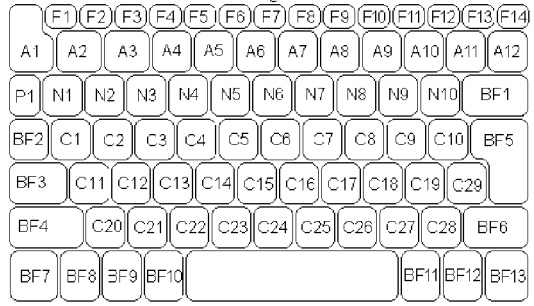
Figures 10, 161:
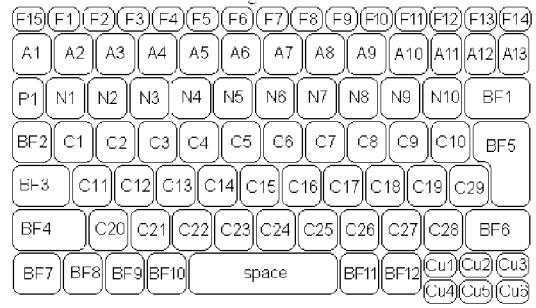
Figures 11, 161:
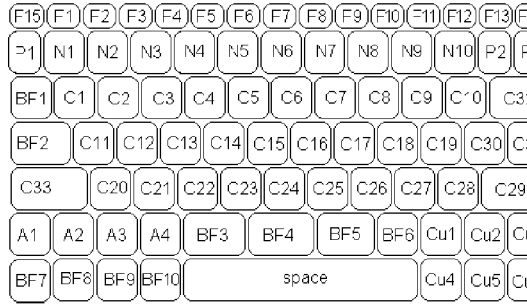
Figures 12, 161:
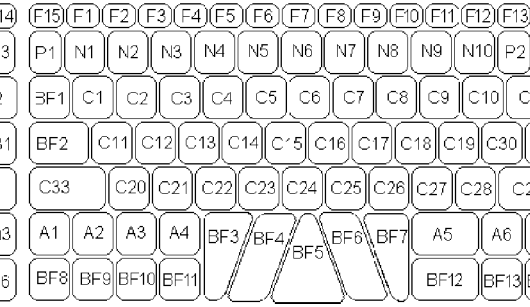
Figure 180:
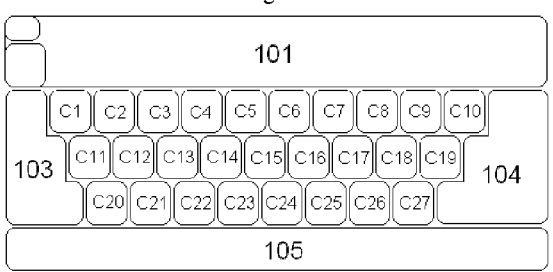
FIG. 180 is a schematic for zoning of a 10-inch keyboard with unchanged height according to the present invention.

FIG. 149 is an example when FIG. 7 is used on a device with a 10-inch screen. The left boundary starts from the left of TAB key. The right boundary ends at the second key on the right of "L" key on the row of "ASDF", typically on the right of the quotation mark key. FIG. 150 is a schematic view for zoning of FIG. 149. FIG. 151 is an example of area 101 in FIG. 150 with one row added. FIG. 180 is an example of area 101 in FIG. 150 where the height of area 101 is not changed. FIG. 143 and FIG. 144 are examples of the design templates of area 103 in FIG. 150. FIG. 152 to FIG. 158 are examples of the design templates of area 104 in FIG. 150. FIG. 159 is a design template of the row added to area 101 in FIG. 151. Twelve keys are designed on the added row in FIG. 159-1 and FIG. 159-2. In FIG. 159-1, the keys on the added row are separated from small function keys. In FIG. 159-2, the first key on the added row is merged with the first key of the small function keys. Thirteen key positions are designed on the added row in FIG. 159-3 and FIG. 159-4. In FIG. 159-3, the keys on the added row are separated from small function keys. In FIG. 159-4, the first key on the added row is merged with the first key of the small function keys. The advantage of FIG. 159-1 and FIG. 159-2 is that every added key is greater than or equal to the size of a standard key. The advantage of FIG. 159-3 and FIG. 159-4 is that thirteen keys are arranged thus there is one more key. This arrangement is rather helpful to many non-English languages. The three small key positions on the rightmost of the added row usually are for the punctuation marks with low use frequency. The design advantage of FIG. 159-2 and FIG. 159-4 is that it has a very large merger key to accommodate ESC key. In this way, the users may use the high-frequency ESC key in a more comfortable manner. FIG. 160 shows the examples of two design templates of the numeric row. In FIG. 160-1, there is a punctuation key in front of the ten numeric keys. In FIG. 160-2, there are only ten numeric keys and a large function key, and number "1" key is lengthened. In FIG. 150, area 101 may be any of FIG. 13 to FIG. 15. In FIG. 150, area 105 may be any of FIG. 16 to FIG. 102. In FIG. 150, area 103 may be any of FIG. 143 and FIG. 144. In FIG. 150, area 104 may be any of FIG. 152 to FIG. 158. All combinations of all possible designs of areas 101, 103, 104 and 105 are within the protection scope of the present invention. FIG. 161 is an example of the design template for a few common combinations.

The added row in FIG. 161-1 is a template of FIG. 159-1, the numeric row is a template of FIG. 160-1, area 103 is a template of FIG. 143, and area 104 is a template of FIG. 152. The rest part of FIG. 161-2 is same as that of FIG. 161-1, and the added row is a template of FIG. 159-2. The rest part of FIG. 161-3 is same as that of FIG. 161-2, and area 107 is a template of FIG. 33. FIG. 161-4 is substantially same as FIG. 161-2 except that the height of A1 key is slightly lower, and area 107 is a template of FIG. 36. The rest part of FIG. 161-5 is same as that of FIG. 161-2, and area 107 is a template of FIG. 37. Area 107 in FIG. 161-6 is a template of FIG. 63. Area 107 in FIG. 161-7 is a template of FIG. 64. Area 107 in FIG. 161-8 is a template of FIG. 67. Area 107 in FIG. 161-9 is a template of FIG. 68. The rest part of FIG. 161-10 is same as that of FIG. 161-1, the added row in area 101 has thirteen key positions, and the added rows in area 101 in each template of FIG. 161-1 to FIG. 161-9 may also adopt the design of thirteen key positions. In FIG. 161-11, area 105 is a template of FIG. 20, area 106 is a template of FIG. 82, area 108 is a template of FIG. 97 and area 107 is a template of FIG. 86. The rest part of FIG. 161-12 is same as that of FIG. 161-11 except that area 108 is a template of FIG. 98 and area 107 is a template of FIG. 85.

FIG. 162-1 is a design example of FIG. 161-2. FIG. 162-2 is a design example of FIG. 161-1. In FIG. 162-1 and FIG. 162-2, most letter keys, numeric keys and function keys have the same size and relative positions as those of a conventional QWERTY keyboard. Backspace key is 39 mm closer to the right hand, compared to a conventional keyboard. When the right hand is outstretched, the Backspace key, which is used at very high frequency, may be strikers directly with the ring finger without painfully distorting the wrist. Enter key is 19 mm closer to the right hand. Likewise, there is no need to distort the right hand. When the little finger is outstretched, it may directly strike Enter key. The Right Shift key is 19 mm closer to the right hand. When the right little finger moves down, the user may strike Shift key directly with the right little finger without distorting the wrist. At C29, single quotation marks and double quotation marks are one key closer and also 19 mm closer to the right hand, the little finger may directly strike them without moving rightward. C27 and C28 are basically same as the key layout of most European languages. C27 stands for comma and semicolon, C28 stands for full stop and colon. In FIG. 162-2, a large ESC key is added to A1. The ESC key at A1 in FIG. 162-1 is a large ESC key merged with small function keys. The design of the large ESC key in FIG. 162-1 and FIG. 162-2 makes the use of this common key more comfortable. In FIG. 162-1 and FIG. 162-2, Copy key and Paste key are added to provide convenience for user's edition of documents. Compared with ordinary keyboards for portable devices, Del key and Ins key are larger. FIG. 162-3 to FIG. 162-16 are examples of the design of area 101. The design features in these examples may be substituted to area 101 in other design templates and design examples. FIG. 162-3 merges these two pair keys of "{ }" and "[ ]" to save a key position for currency symbols. In FIG. 162-3, the currency symbols of Euro and Pound are taken for example. In the actual design, the symbols of the currencies used in the local market may be adopted according to the countries and regions where the keyboards are sold. Users in the world may easily input the currency symbols of their own countries or regions. For example, in FIG. 162-45, Renminbi symbol and Yen symbol are adopted. In FIG. 162-4, Del key and Ins key are arranged on the rightmost of the added row and above Backspace key. In FIG. 162-5, Ins key is arranged on the row of small function keys and one key position is saved for currency symbols. In FIG. 162-6, Copy key and Paste key, Del key and Ins key are all arranged to the rightmost of the added row. In FIG. 162-7, Ins key is placed on the row of small function keys on the basis of FIG. 162-6. In FIG. 162-8, "?" and "l" are separated into two keys, so "?" may be input through a direct strike, other than pressing Shift key at the same time as on a conventional keyboard. In FIG. 162-9, ESC key is a little shorter, and the order of the edit keys is Ins key, Del key, Copy key and Paste key. The advantage of this design is that Copy key and Paste key are closer to the left middle finger and the striking distance is shorter. In addition to the design in FIG. 162-3 and FIG. 162-9, these edit keys may also be arranged in other orders. In FIG. 162-9, one more design feature is that "Camera" function key replaces low-frequency "Pause" key, to switch on or off the camera in a more convenient manner. On the first row of small function keys in FIG. 162-10, there is not an ESC key, and instead, 12 function keys and a "Camera" function key as well as a "3G" function key and a "WiFi" function key are arranged in order to switch on or off the wireless network in a more convenient manner. FIG. 162-11 shows a design in which there is not a large ESC key and the position is saved for currency symbol key. FIG. 162-12 shows a design in which there is not a large ESC key and the position is saved for Cut key. In FIG. 162-13, "I" key is placed in the position of numeric key 7, and "?" key is placed in the position of numeric key 6. In FIG. 162-14 to FIG. 162-16, the punctuation keys abandon the old design of a conventional QWERTY keyboard and are redesigned according to the use frequency of punctuation marks. According to the new design, high-frequency punctuation marks are input by means of a direct strike of a key, while low-frequency punctuation marks are input by means of the corresponding key plus Shift key. In this way, users may strike keys less during input. For example, in FIG. 162-14, common punctuation marks "!", "?", "_", "(", ")" all may be input through a direct strike. In FIG. 162-16, the common parenthesis keys are merged into one key. When the key is striken one time, a pair of "( )" key and the left key of the cursor will be input and the cursor will be automatically placed in the middle of the parenthesis key. Further, when Shift key is pressed and the parenthesis key is stiken at the same time, ")" will be input; and when Alt Green key is pressed and the parenthesis key is striken at the same time, "(" will be input. The input of a single parenthesis by a combined key may be defined in other ways according to language, user habit and other definitions. The foregoing input by Shift key and Alt Green key is just an example. In addition to the parenthesis key, other pair keys may be set in the same way.

Area 101 in FIG. 162-17 and FIG. 162-18 is a design example of FIG. 15-2. The added row is below the numeric keys. In terms of use frequency, many punctuation marks are more frequently used than numbers. The advantage of the design in FIG. 162-17 and FIG. 162-18 is that users may input punctuation marks in a faster and more convenient manner.

FIG. 162-19 is a design maximally retaining the key positions of a standard QWERTY English keyboard, wherein the punctuation marks at C27, C28 and C29 are identical to a standard QWERTY English keyboard. Del key and Ins key are still above Backspace key. The advantage of this design is that the learning curve of the new keyboard layout is shortest for the user. FIG. 162-20 is identical to FIG. 162-19 except different positions of Del key and Ins key. FIG. 162-21 is identical to FIG. 162-20 except that punctuations "/" key and "?" key are at C29. FIG. 162-22a and FIG. 162-22b are another two design examples for C27, C28 and C29—three positions for punctuation keys.

Area 104 in FIG. 162-23 adopts the design template of FIG. 154. Area 104 in FIG. 162-24 adopts the design template of FIG. 155. Area 104 in FIG. 162-25 adopts the design template of FIG. 157. Area 104 in FIG. 162-26 adopts the design template of FIG. 156. Area 104 in FIG. 162-50 adopts the design template of FIG. 153. Area 104 in FIG. 162-51 adopts the design template of FIG. 158. FIG. 162-52 is an example of three downsized punctuation keys beside M key. Area 103 in FIG. 162-53 adopts the design template of FIG. 144.

Area 107 in FIG. 162-27 and FIG. 162-28 adopts the design template of FIG. 33 except that the width of Alt Green key is different. Area 107 in FIG. 162-29 adopts the design template of FIG. 36. Area 107 in FIG. 162-30 and FIG. 162-31 adopts the design template of FIG. 37. Area 107 in FIG. 162-32 adopts the design template of FIG. 38. Area 107 in FIG. 162-33 adopts the design template of FIG. 67. Area 107 in FIG. 162-34 adopts the design template of FIG. 68. Area 107 in FIG. 162-35 adopts the design template of FIG. 77. The punctuation keys in FIG. 162-35 are also optimized and "!", "?", "( )" and "_" may be directly input without pressing Shift key. Area 107 in FIG. 162-36 to FIG. 162-38 adopts the design template of FIG. 64.

FIG. 162-30 also gives a design example of letter keys attached with small numeric keys.

The advantage of the design in FIG. 162-27 to FIG. 162-38 is that Space key is long, exceeding half or entire M letter key. In this way, the right thumb has enough resting space and the wrist feels more comfortable. The advantage of the design in FIG. 162-33 to FIG. 162-38 is that the height of Space key is increased and the thumb strikes more comfortably.

FIG. 162-37 to FIG. 162-52 are design examples wherein the added row in area 101 has 13 key positions. In FIGS. 162-37, C27, C28 and C29 punctuation keys retain the layout of a European language keyboard. In FIGS. 162-38, C27, C28 and C29 punctuation keys retain the layout of an English keyboard. FIG. 162-39 to FIG. 162-44 are design examples of punctuation layouts wherein the added row has thirteen key positions. FIG. 162-40 shows the design of a large ESC key. In FIG. 162-41 to FIG. 162-43, a Cut key is added. In FIG. 162-45, the three punctuation keys retain the layout of an English keyboard, and Chinese and Japanese currency symbols are arranged in the currency symbol key position. FIG. 162-46 to FIG. 162-49 are design examples of a keyboard for application of Chinese characters. This design may be used in China, Japan, South Korea, Taiwan, Singapore and other markets where Chinese characters are used. In FIG. 162-46, five Chinese writing strokes: 一, 丨, 丿, 丶, and 一, are added. In FIG. 162-47, ten Chinese writing strokes are added, 一, 丨, 丿, 丶, and 一, are input through direct strike of the keys; " " is input when Shift key and "一" key are pressed at the same time; "丨" is input when Shift key and "丨" key are pressed at the same time; "丿" is input when Shift key and "丿" key are pressed at the same time; " " is input when Shift key and "一" key are pressed at the same time; "丨" is input when Shift key and "一" key are pressed at the same time. FIG. 162-47 is only an example. When Shift key and a stroke key are pressed at the same time, another stroke or radical may be input. For example, FIG. 162-48 shows five radicals of "金, 木, 水, 火, 土". FIG. 162-48 is an example where there are no ESC, COPY and PASTE keys, and numeric keys are not input in a combined manner. Other designs in FIG. 162-46 to FIG. 162-49 are examples where other punctuation marks are input in combination of numeric keys. FIG. 162-49 shows a design method of area 100, where letters are arranged in an alphabetic order, and it is an example of FIG. 12-1.

Figures 54, 62:
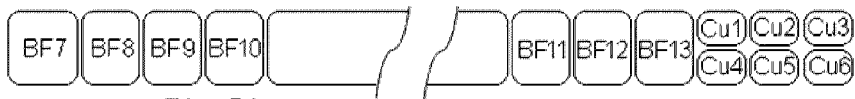
FIG. 54 to FIG. 57 are design templates when area 106 is as high as two small cursor keys according to the present invention.
FIG. 62 to FIG. 69 are design templates when area 107 is as high as two small cursor keys according to the present invention.
Figures 55, 63:
Figures 56, 64:
Figures 57, 65:
Figures 58, 66:
FIG. 58 to FIG. 61 are design examples when area 106 is as high as two small cursor keys according to the present invention.
Figures 59, 67:
Figures 60, 68:
Figures 61, 69:
Figures 70, 71:
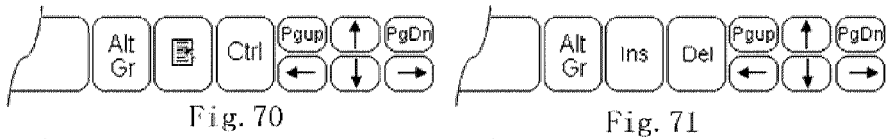
FIG. 70 to FIG. 80 are design examples when area 107 is as high as two small cursor keys according to the present invention.
Figures 72, 73:
Figures 74, 75:
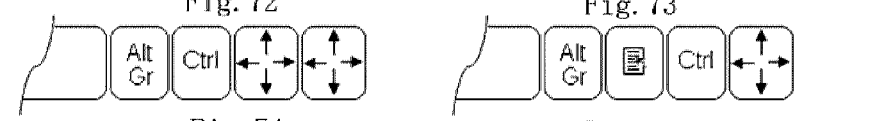

FIG. 162-54 to FIG. 162-55 are different design examples of area 108. FIG. 162-54 is a design example of the design template of FIG. 161-11. FIG. 162-55 is a design example of the design template of FIG. 161-12. The advantage of this design has been introduced during description of FIG. 96 to FIG. 102.

Figure 183:
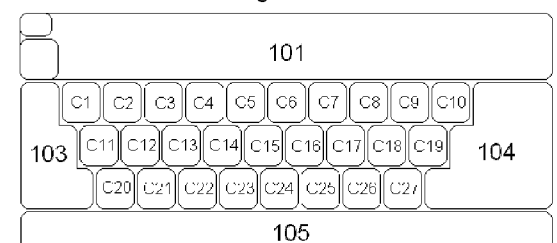
FIG. 183 is a schematic view for zoning of an 11-inch keyboard with unchanged height according to the present invention.

FIG. 163 is an example when FIG. 7 is used on a device with an 11-inch screen. The left boundary starts from the left of the TAB key of a conventional keyboard, and the right boundary ends at the right of second key at the right of "P" key on the row of "QWERTY" on a conventional keyboard, typically on the right of "}" key. FIG. 164 is schematic view for zoning of FIG. 163. FIG. 165 is an example of area 101 in FIG. 164 with one row added. FIG. 183 is an example wherein the height of the area is not changed in FIG. 164. FIG. 143 and FIG. 144 are design templates of area 103 in FIG. 164. FIG.

Figures 1, 171:
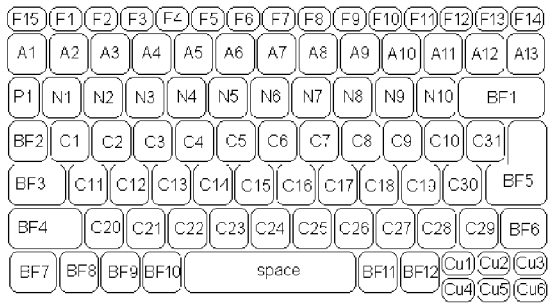
Figures 2, 171:
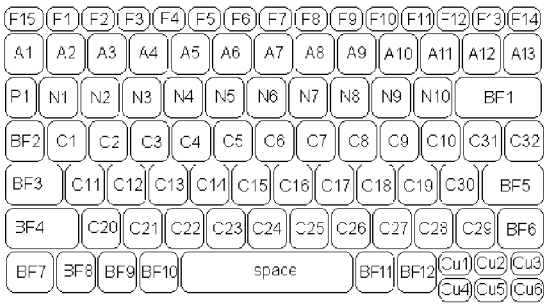
Figures 3, 171:
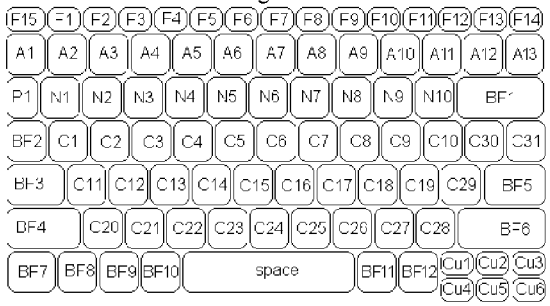
Figures 4, 171:
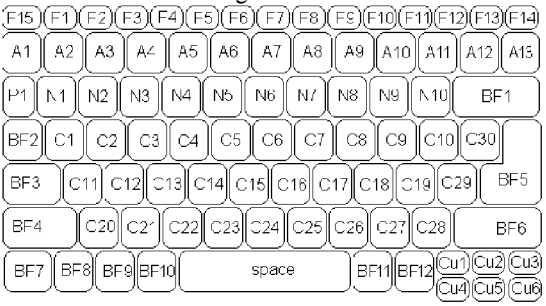
Figures 1, 172:
Figures 2, 172:
Figures 3, 172:
Figures 4, 172:
Figures 5, 172:
Figures 6, 172:

166 to FIG. 169 are design templates of area 104 in FIG. 164. FIG. 170-1 to FIG. 170-3 are design templates of area 101 and thirteen key positions are arranged on the added row. In FIG. 170-2, two punctuation keys are arranged on the row of numeric keys. In FIG. 170-3, the first small function key and the first key on the added row are merged into a large key A1. FIG. 171-1 to FIG. 171-4 are several design templates of FIG. 165. FIG. 172-1 to FIG. 172-6 are a few design examples of FIG. 171, wherein FIG. 172-1 to FIG. 172-3 are design examples of FIG. 171-1, FIG. 172-4 is a design example of design template FIG. 171-2, FIG. 172-5 is a design example of design template FIG. 171-3, and FIG. 172-6 is a design example of design template FIG. 171-4.

FIG. 173-1 is a present standard English keyboard. FIG. 173-2 is a design in which the width of some keys on the right, such as Backspace key, "| \" key, Enter key and Right Shift key is reduced to ensure the total length of the keyboard is within the dimensions of a 12-inch screen, as shown in FIG. 4-5. FIG. 173-3 is a design template in which one row is added to area 101 of a keyboard on a device of above 12 inches. FIG. 173-4 is a design example of FIG. 173-3, wherein many common edit keys are added to make the edition of documents and the operation of programs become more convenient for the user.

FIG. 174 is an 8-inch example of the design principle shown in FIG. 3, and an example of the keyboard in FIG. 16 with unchanged height. FIG. 175-1 and FIG. 175-2 are two examples of the design template of FIG. 174. FIG. 176-1 to FIG. 176-5 are design examples of FIG. 175. The design method in FIG. 176-1 is that the letter area is not changed and punctuation marks are all arranged on numeric keys. The design method of FIG. 176-2 is that some of the punctuation marks are arranged on letter keys and the rest punctuation marks are arranged on numeric keys. The design method of FIG. 176-3 is that the numeric key area is not changed, and all punctuation marks are arranged on letter keys. FIG. 176-4 and FIG. 176-5 are another two designs of area 105 and may be substituted to FIG. 176-1 to FIG. 176-3.

Figures 1, 178:
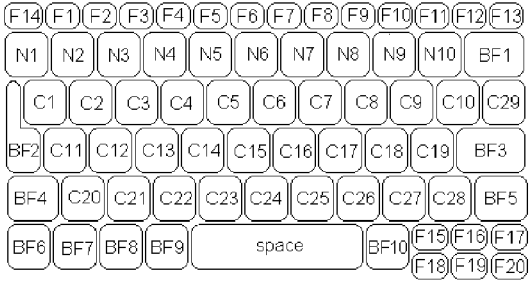
Figures 2, 178:
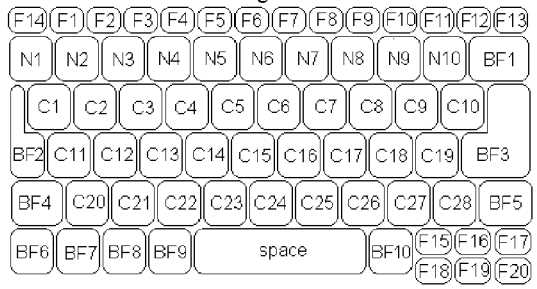
Figures 1, 179:
Figures 2, 179:
Figures 3, 179:

FIG. 177 is a 9-inch example of the design principle shown in FIG. 3, and an example when the height of the keyboard in FIG. 132 is not changed. FIG. 178-1 and FIG. 178-2 are two examples of the design template of FIG. 177. FIG. 179-1 to FIG. 179-3 are design examples of FIG. 178.

Figures 1, 181:
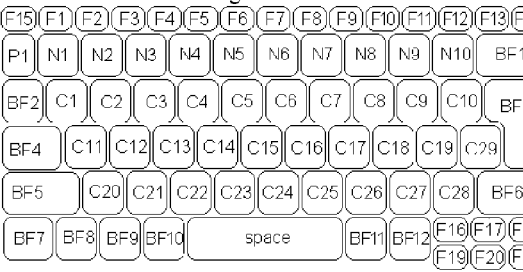
Figures 2, 181:
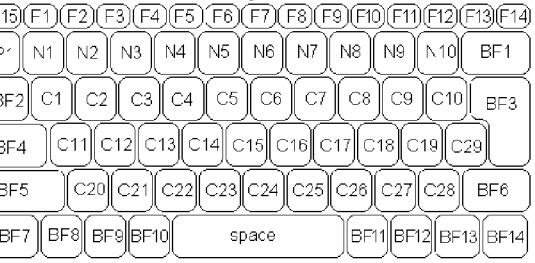
Figures 3, 181:
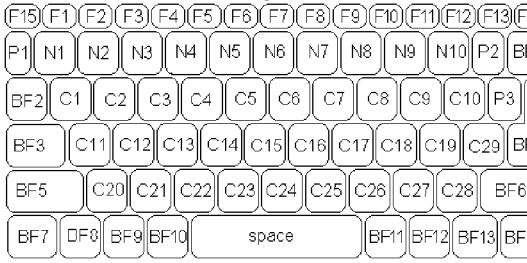
Figures 1, 182:
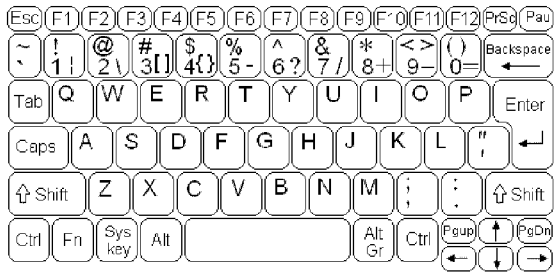
Figures 2, 182:
Figures 3, 182:
Figures 4, 182:
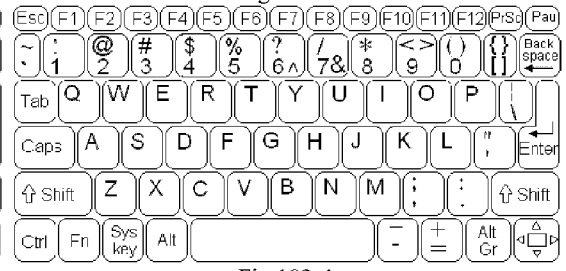

FIG. 180 is a 10-inch example of the design principle shown in FIG. 3, and an example of the keyboard in FIG. 150 with unchanged height. FIG. 181-1 to FIG. 181-3 are three examples of the design template of FIG. 180. FIG. 182-1 to FIG. 182-4 are design examples of FIG. 181. FIG. 182-1 and FIG. 182-2 are design examples of the design template of FIG. 181-1. FIG. 182-3 is a design example of the design template of FIG. 181-2. FIG. 182-4 is a design example of the design template of FIG. 181-3.

Figure 184:
FIG. 184 is a design template of an 11-inch keyboard with unchanged height according to the present invention.
Figure 185:
FIG. 185 is a design example of an 11-inch keyboard with unchanged height according to the present invention.

FIG. 183 is an 11-inch example of the design principle shown in FIG. 3, and an example when the height of the keyboard in FIG. 164 is not changed. FIG. 184 is an example of the design template of FIG. 183. FIG. 185 is a design example of FIG. 184.

Figure 186:
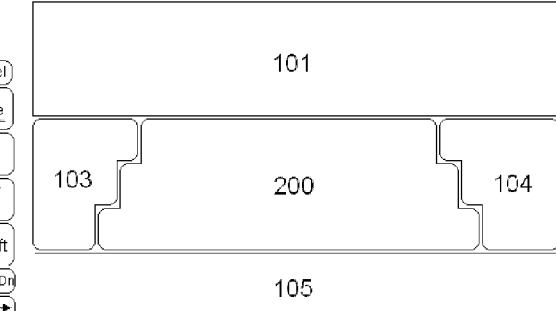
FIG. 186 is a schematic view for zoning of a new-type ABCD keyboard according to the present invention.

FIG. 186 is a schematic diagram for design of a new-type ABCD keyboard of the present invention, wherein the center key area 200 is in a regular trapezoidal shape. The advantage of this design is that the left key area tilts towards top right and the left wrist needn't to be distorted leftward when striking; the right key area tilts towards top left and the right wrist needn't to be distorted rightward when striking.

Figure 187:
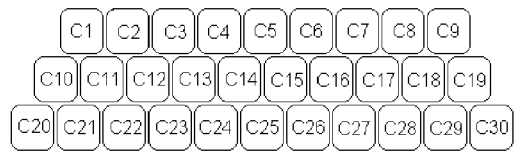
FIG. 187 shows a design template of three rows of keys in the regular trapezoidal area 200 of an ABCD keyboard according to the present invention.
Figures 1, 188:
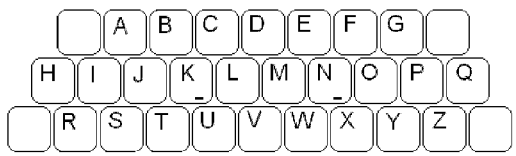
Figures 2, 188:
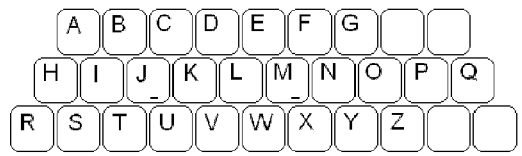
Figures 3, 188:
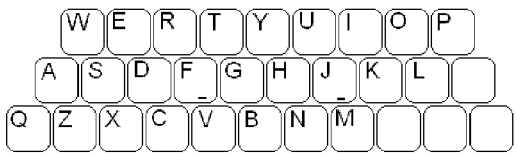

FIG. 187 is a design template of the area 200 with three rows in a regular trapezoidal shape. FIG. 188-1, FIG. 188-2 and FIG. 188-3 are three design examples of FIG. 187. In FIG. 188-1 and FIG. 188-2, letters are arranged in an alphabetic order. The first row contains letter A to letter G. The second row contains letter H to letter Q. The third row contains letter R to letter Z. FIG. 188-3 is an improvement of a conventional QWER keyboard, and letter Q is transferred from the first row to the left of letter Z on the third row.

In FIG. 188-1, the positioning keys are K and N. The left little finger is responsible for letter H, and two punctuation keys. The left ring finger is responsible for letter A, letter I and letter R. The left middle finger is responsible for letter B, letter J and letter S. The left index finger is responsible for letter C, letter K, letter T, letter D, letter L and letter U. The right index finger is responsible for letter E, letter N, letter X, letter M, letter W and letter V. The right middle finger is responsible for letter F, letter O and letter Y. The right ring finger is responsible for letter G, letter P and letter Z. The right little finger is responsible for letter Q, and two punctuation keys.

In FIG. 188-2, the positioning keys are J and M. The left little finger is not responsible for letters. The left ring finger is responsible for letter A, letter H and letter R. The left middle finger is responsible for letter B, letter I and letter S. The left index finger is responsible for letter C, letter J, letter T, letter D, letter K and letter U. The right index finger is responsible for letter E, letter M, letter X, letter L, letter W and letter V. The right middle finger is responsible for letter F, letter N and letter Y. The right ring finger is responsible for letter G, letter O and letter Z. The right little finger is responsible for letter P and letter Q.

In FIG. 188-3, the right hand is responsible for the letters same to those on a conventional QWERTY keyboard, and the direction of the left hand is improved into tilting towards top right. The left little finger is responsible for letter W, letter A and letter Q. The left ring finger is responsible for letter E, letter S and letter Z. The left middle finger is responsible for letter R, letter D and letter X. The left index finger is responsible for letter T, letter F, letter C, letter G, letter V and letter B.

Figure 189:
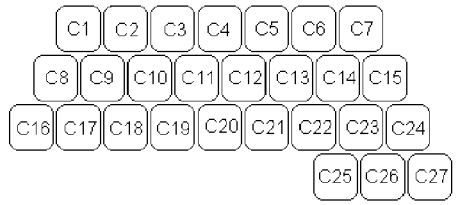
FIG. 189 is a design template of the three rows of keys on the left and four rows of keys on the right of the regular trapezoidal area 200 of an ABCD keyboard according to the present invention.
Figures 1, 190:
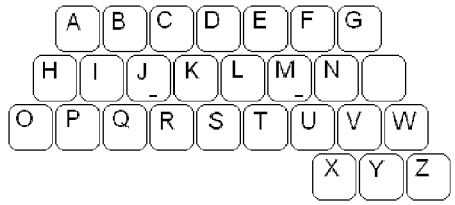
Figures 2, 190:

FIG. 189 is a design template of area 200 with four rows in a regular trapezoidal shape. On the fourth row, only the right side has letters. FIG. 190-1 and FIG. 190-2 are two design examples of FIG. 189. In FIG. 190-1 and FIG. 190-2, the letters in FIG. 189 are arranged in an alphabetic order, the first row contains letter A to letter G, the second row contains letter H to letter N, the third row contains letter O to letter W and the fourth row contains letter X to letter Z.

In FIG. 190-1, the positioning keys are J and M. The left little finger is not responsible for letters. The left ring finger is responsible for letter A, letter H and letter O. The left middle finger is responsible for letter B, letter I and letter P. The left index finger is responsible for letter C, letter J, letter Q, letter D, letter K and letter R. The right index finger is responsible for letter E, letter M, letter U, letter X, letter L, letter S and letter T. The right middle finger is responsible for letter F, letter N, letter V and letter Y. The right ring finger is responsible for letter G, letter W and letter Z. The right little finger is not responsible for letters.

In FIG. 190-2, the positioning keys are J and L. The letters for which the fingers of the left hand are responsible are same as those shown in FIG. 190-1. The right index finger is responsible for letter E, letter L, letter U, letter X, letter S and letter T. The right middle finger is responsible for letter F, letter M, letter V and letter Y. The right ring finger is responsible for letter G, letter N, letter W and letter Z. The right little finger is not responsible for letters.

Figure 191:
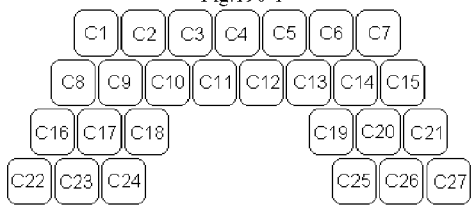
FIG. 191 is a design template of the four rows of keys on both left and right of the regular trapezoidal area 200 of an ABCD keyboard according to the present invention.
Figures 1, 192:
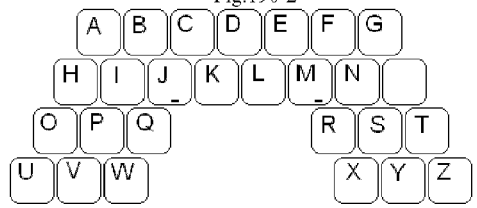
Figures 2, 192:
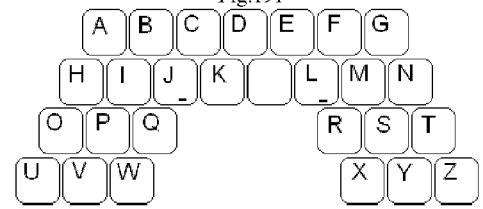

FIG. 191 is a design template of area 200 with four rows in a regular trapezoidal shape. On the fourth row, both the left side and the right side have letters. FIG. 192-1 and FIG. 192-2 are two design examples of FIG. 191. In FIG. 192-1 and FIG. 192-2, the letters in FIG. 191 are arranged in an alphabetic order. The first row contains letter A to letter G. The second row contains letter H to letter N. The third row contains letter O to letter T. The fourth row contains letter U to letter Z.

In FIG. 192-1, the positioning keys are J and M. The left little finger is not responsible for letters. The left ring finger is responsible for letter A, letter H, letter O and letter U. The left middle finger is responsible for letter B, letter I, letter P and letter V. The left index finger is responsible for letter C, letter J, letter Q, letter W, letter D and letter K. The right index finger is responsible for letter E, letter M, letter R, letter X and letter L. The right middle finger is responsible for letter F, letter N, letter S and letter Y. The right ring finger is responsible for letter G, letter T and letter Z. The right little finger is not responsible for letters.

In FIG. 192-2, the positioning keys are J and L. The letters for which the fingers of the left hand are responsible are same as those shown in FIG. 192-1. The right index finger is responsible for letter E, letter L, letter R and letter X. The right middle finger is responsible for letter F, letter M, letter S and letter Y. The right ring finger is responsible for letter G, letter N, letter T and letter Z. The right little finger is not responsible for letters. In the design of FIG. 192-2, letters can be most easily remembered. The left ring finger, middle finger and index finger are responsible for "ABCD" on the first row, "HIJK" on the second row, "OPQ" on the third row and "UVW" on the fourth row, respectively. The right index finger, middle finger, ring finger are responsible for "EFG" on the first row, "LMN" on the second row, "RST" on the third row and "XYZ" on the fourth row, respectively.

From FIG. 188, FIG. 190 and FIG. 192, it can be seen that the design philosophy of the present invention is that letters are arranged completely in an alphabetic order and the interruptions between rows and between areas are same as the interruptions in the alphabet, for example: the interruption between ABCDEFG and HIGKLMN, or the interruption between HIGKLMN and OPQRST, or the interruption between OPQRST and UVWXYZ, or the interruption between UVW and XYZ. They tally with the memory habit of letters. In another two designs for the arrangement of letters, one is as shown in FIG. 206-1, the first row and the second row are interrupted between letter J and letter K and the second row and the third row are interrupted between letter S and letter T. It does not tally with memory habit. Furthermore, its layout is based on a QWERTY keyboard, and the problem that the left wrist is distorted leftward still exists. Furthermore, in this keyboard layout, two high-frequency letters A and T are both operated by the left little finger and are not in the middle row. Moreover, when the left little finger strikes keys, the left wrist has to be distorted leftward. It is unhealthy, inefficient and slow. Compared to the layout of the present invention, its order of the letters is not easily remembered.

Another NSK 535 keyboard layout designed by John Parkinson is shown in FIG. 206-2. Although its letters are also arranged in an alphabetic order, it is designed to arrange the left area at first and then the right area. The second and third rows in the left area of the keyboard are interrupted between letter H and letter I. The left area and the right area are interrupted between letter M and letter N. The second and third rows in the right area are interrupted between letter U and letter V. None of them tallies with memory habit. Therefore, the learnability is greatly hampered. Its layout looks messy on each row if we don't consider the left and right areas. For example, the first row contains ABCDNOPQ, the second row contains EFGHRSTU and the third row contains IJKLMVWXYZ. It is not easy to remember. Further, this NSK 535 keyboard is more inefficient, because three high-frequency letters A, E and I are operated by the left little finger. Although the keys in the left area of the NSK 535 keyboard are designed to tilt towards top right, so the left wrist won't be too painful and the problem of health is solved, the problem of efficiency still exists.

From Table 1, it can be seen that in the layout of the present invention, letters not only are arranged in an alphabetic order in the horizontal direction but also correspond to the order in the alphabet in the vertical direction. They can be easily remembered. For users who just learn to use a keyboard, the learning curve is shortest and the layout is most unforgettable. The QWERTY keyboard of the present invention solves the problem of distortion of right wrist the users encounter when they use a conventional QWERTY keyboard. The ABCD keyboard of the present invention solves the problem of distortion of left wrist and right wrist.

TABLE 1

Comparison of learnability and health of left and right wrists among different keyboard layouts:

| Keyboard layout | Drawing | Tally with the alphabetic memory law in the horizontal direction? | Tally with the alphabetic memory law in the vertical direction? | Distortion of left wrist | Distortion of right wrist | High-frequency letters operated by little fingers |
|---|---|---|---|---|---|---|
| QWERTY keyboard | FIG. 173-1 | No | No | Yes | Yes | 1 |
| ABCD keyboard | FIG. 206-1 | Yes | No | Yes | Yes | 2 |
| NSK 535 keyboard | FIG. 206-2 | Yes in terms of area | No | No | No | 3 |
| DVORAK keyboard | | No | No | Yes | Yes | 2 |
| MALT keyboard | | No | No | Mild | Yes | 2 |
| QWERTY keyboard of the present invention | FIG. 7 | No | No | Yes | No | 1 |
| ABCD keyboard 1 of the present invention | FIG. 188-2 | Yes | Yes | No | No | 0 |
| ABCD keyboard 2 of the present invention | FIG. 190-2 | Yes | Yes | No | No | 0 |
| ABCD keyboard 3 of the present invention | FIG. 192-2 | Yes | Yes | No | No | 0 |

The keyboard layout of the present invention not only can be easily learned and remembered but also is very scientific and efficient in terms of finger arrangement. Table 2 lists the use ratios of left hand and right hand and the use frequency of each finger for each type of keyboard.

TABLE 2

| Keyboard layout | Left hand | Right hand | Little finger | Ring finger | Middle finger | Index finger |
| --- | --- | --- | --- | --- | --- | --- |
| QWERTY keyboard | 58.67% | 41.33% | 10.27% | 20.37% | 27.48% | 41.89% |
| ABCD keyboard | 66.16% | 33.84% | 18.15% | 21.57% | 18.25% | 42.04% |
| NSK 535 keyboard | 54.06% | 45.94% | 30.76% | 16.83% | 19.55% | 32.85% |
| DVORAK keyboard | 43.17% | 56.83% | 18.59% | 21.32% | 27.05% | 33.04% |
| MALT keyboard | 53.58% | 46.42% | 18.42% | 16.26% | 18.72% | 46.60% |
| KIND-TAO ABCD keyboard 1 | 54.81% | 45.19% | 2.02% | 29.84% | 25.74% | 42.40% |
| KIND-TAO ABCD keyboard 2 | 46.20% | 53.80% | 0.00% | 32.97% | 17.97% | 49.06% |
| KIND-TAO ABCD keyboard 3 | 46.31% | 53.69% | 0.00% | 42.42% | 24.30% | 33.28% |

From Table 2, it can be seen that on the KIND-TAO keyboards of the present invention, the left hand and right hands are used symmetrically and the little finger is almost not used to strike letters. On the QWERTY type ABCD keyboard, the use of left and right hands is most asymmetric and the use ratio of the left hand is 66%. On the NSK 535 keyboard, the use frequency of little fingers is as high as 30%. The use frequency of little fingers on the DVORAK keyboard and MALT keyboard is also twice as much as the frequency on a standard QWERTY keyboard.

Table 3 lists the use frequency of the letters on each row in each keyboard layout. From Table 3, it can be seen that the use frequency of each row on the keyboard of the present invention is even, all about 30%. On the standard QWERTY keyboard, the use frequency of the top row is much high, 50%. On the DVORAK keyboard or MALT keyboard, the use frequency of the middle row is very high, and there is the advantage of no need to move fingers among different rows.

TABLE 3

Frequency of the letters on each row in each keyboard layout

| Keyboard layout | Top row | Middle row | Third row | Fourth row |
| --- | --- | --- | --- | --- |
| QWERTY keyboard | 51.33% | 34.03% | 14.63% | |
| ABCD keyboard | 46.85% | 35.80% | 17.35% | |
| NSK 535 keyboard | 32.97% | 47.17% | 19.86% | |
| DVORAK keyboard | 20.94% | 70.58% | 8.48% | |
| MALT keyboard | 18.51% | 63.33% | 5.45% | 12.70% |
| KIND-TAO ABCD keyboard 1 | 33.64% | 36.70% | 29.66% | |
| KIND-TAO ABCD keyboard 2 | 33.64% | 27.17% | 37.00% | 2.20% |
| KIND-TAO ABCD keyboard 3 | 33.64% | 27.17% | 30.90% | 8.29% |

Table 4 summarizes the advantages and disadvantages of each keyboard layout based on Table 1 to Table 3:

| Keyboard layout | Learnability | Health | Speed | Cost |
| --- | --- | --- | --- | --- |
| QWERTY keyboard | Poor | Poor | Good | Low |
| ABCD keyboard | Good | Poor | Poor | Low |
| NSK 535 keyboard | Good | Good | Poor | Medium |
| DVORAK keyboard | Poor | Poor | Good | Low |
| MALT keyboard | Poor | Poor | Good | High |
| QWERTY keyboard of the present invention | Poor | Good | Good | Low |
| ABCD keyboard of the present invention | Excellent | Excellent | Excellent | Low |

From Table 4, it can be seen that only the ABCD keyboard of the present invention solves the problems of learnability, health, speed and cost at the same time.

In FIG. 186, area 200 may be any of FIG. 187 to FIG. 192, area 101 may be any of FIG. 13 to FIG. 15, area 105 may be any of FIG. 16 to FIG. 102, and area 103 and area 104 may be any combination of key positions in the corresponding layout. All the combinations of 101, 103, 104, 105 and 200 are within the protection scope of the present invention.

Figures 1, 193:
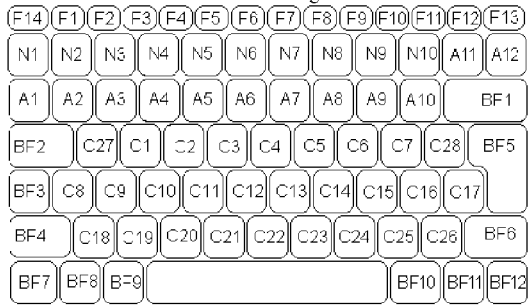
Figures 2, 193:
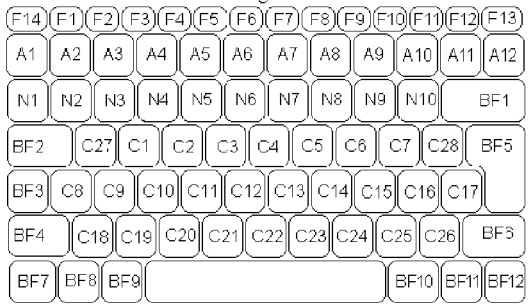
Figures 3, 193:
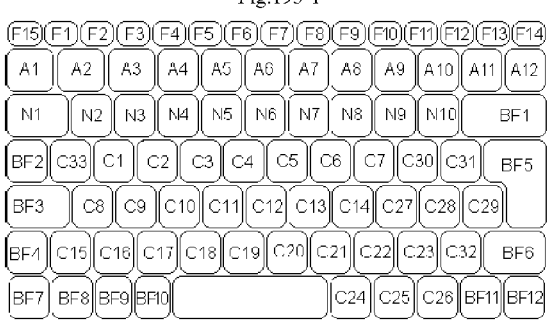
Figures 4, 193:
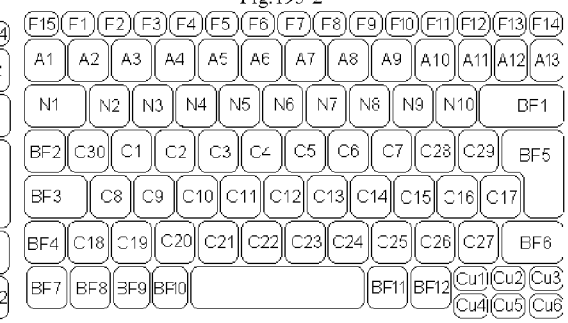
Figures 5, 193:
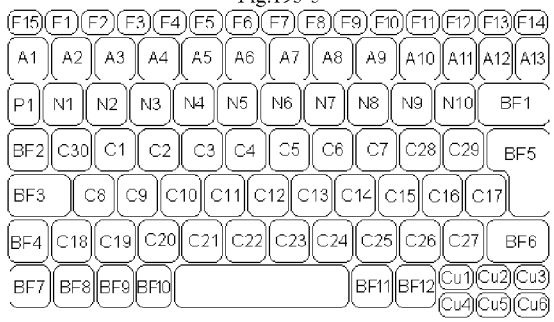
Figures 6, 193:
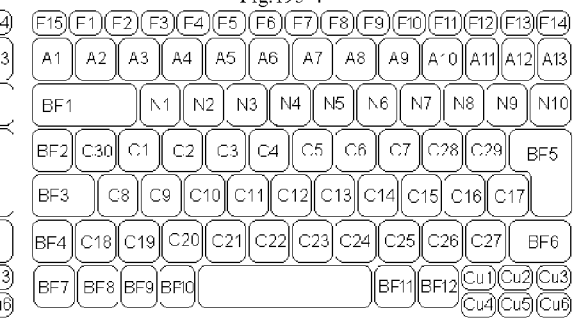
Figures 7, 193:
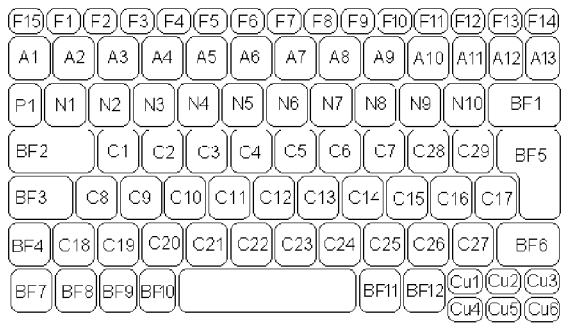
Figures 8, 193:
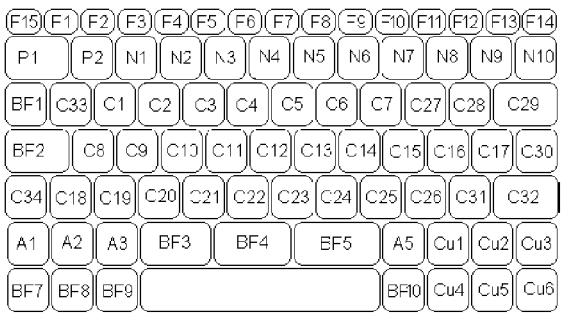
Figures 9, 193:
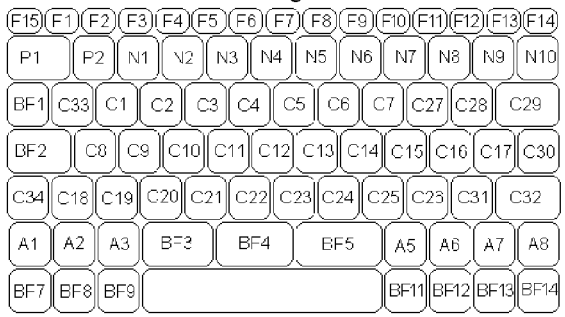
Figures 10, 193:
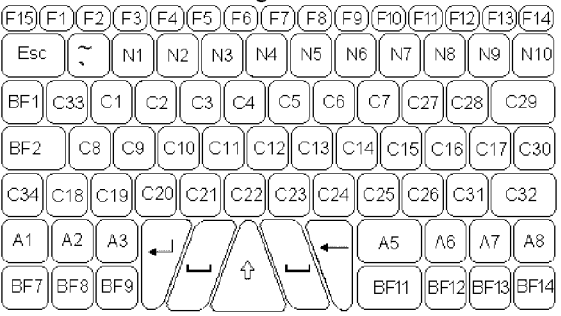
Figures 11, 193:
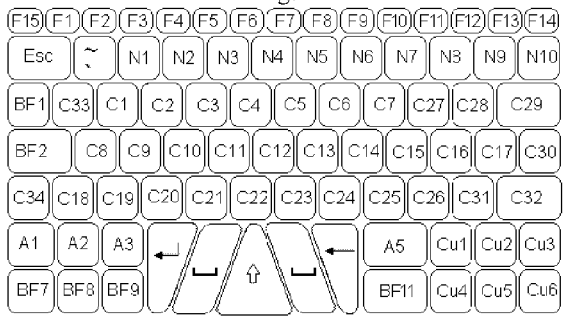
Figures 12, 193:
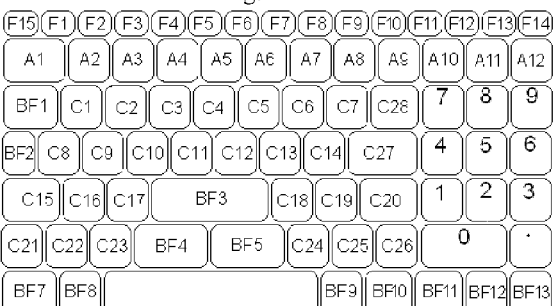
Figures 13, 193:
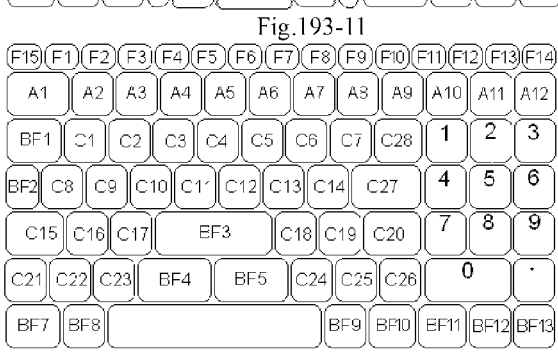
Figures 14, 193:
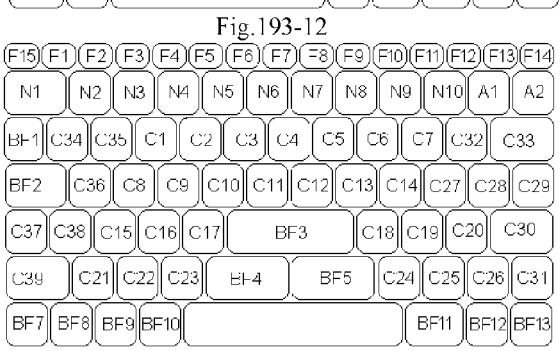

FIG. 193-1 to FIG. 193-14 are examples of common design template of FIG. 186. FIG. 194-1 to FIG. 194-30 are specific design examples of these design templates. In the design template of FIG. 193-1, area 200 adopts the design of FIG. 188-1, area 101 adopts the design of FIG. 15-2 in which the added row is below the numeric row, and FIG. 194-1 is a design example of FIG. 193-1. In the design template of FIG. 193-2, area 200 adopts the design of FIG. 188-1, area 101 adopts the design of FIG. 15-1 in which the added row is above the numeric row, FIG. 194-2 and FIG. 194-3 are design examples of FIG. 193-2, and the keys of Chinese writing strokes are added in FIG. 194-3. In the design template of FIG. 193-3, area 200 adopts the design of FIG. 189, FIG. 194-4 and FIG. 194-5 are design examples of FIG. 193-3, area 200 in FIG. 194-4 adopts the design of FIG. 190-1 and area 200 in FIG. 194-5 adopts the design of FIG. 190-2.

In the design templates of FIG. 193-4 to FIG. 193-11, area 200 adopts the design of FIG. 187. FIG. 193-4, FIG. 193-5 and FIG. 193-6 list a few different design templates about the arrangement of keys on the numeric row. FIG. 193-7 is a different design of area 103. FIG. 193-8 shows area 105 adopting the design template of FIG. 89 and FIG. 96. FIG. 193-9 shows area 105 adopts the design template of FIG. 88 and FIG. 96. FIG. 193-10 shows area 105 adopting the design template of FIG. 88 and FIG. 98. FIG. 193-11 shows area 105 adopting the design template of FIG. 89 and FIG. 98. FIG. 194-6, FIG. 194-7 and FIG. 194-8 are the design examples of FIG. 193-4, and the "1" key on the numeric row is lengthened. Area 200 in FIG. 194-6 and FIG. 194-7 adopts the design of FIG. 188-2. Area 200 in FIG. 194-8 adopts the design of FIG. 188-3. FIG. 194-9 is a design example of FIG. 193-5. FIG. 194-10 and FIG. 194-11 are design examples of FIG. 193-6, wherein Backspace key is arranged on the left of numbers and the arrangement of numbers corresponds to the letters for which the fingers are responsible. FIG. 194-12 and FIG. 194-13 are design examples of FIG. 193-7, and there is a larger TAB key. FIG. 194-14 is a design example of FIG. 193-8. FIG. 194-15 and FIG. 194-16 are design examples of FIG. 193-9. FIG. 194-17 is a design example of FIG. 193-10. FIG. 194-18 is a design example of FIG. 193-11. FIG. 194-7 shows an example of FIG. 188-2, in which letters are arranged in correspondence to small numeric keys.

Figures 1, 201:
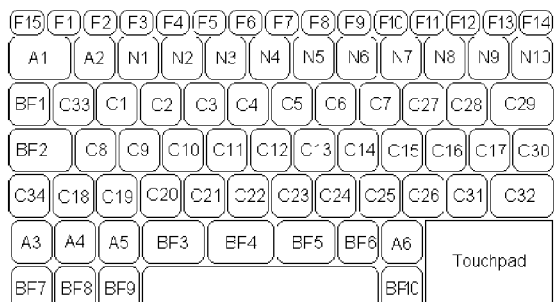
Figures 2, 201:
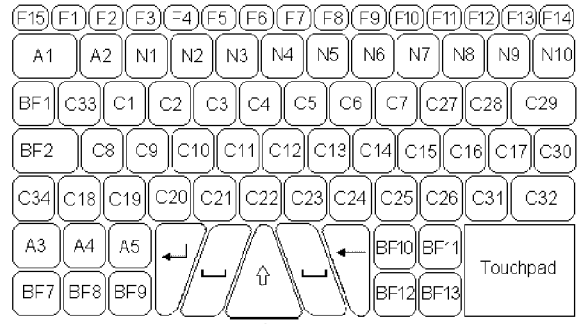
Figures 3, 201:
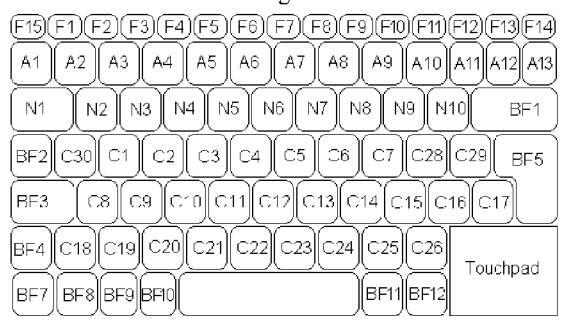
Figures 4, 201:
Figures 5, 201:
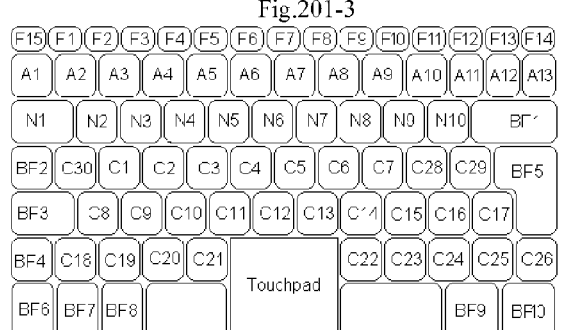
Figures 6, 201:
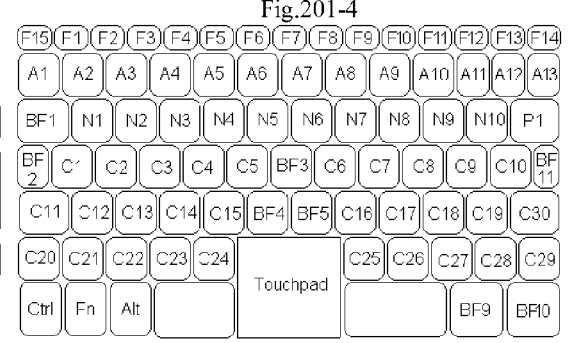
Figures 7, 201:
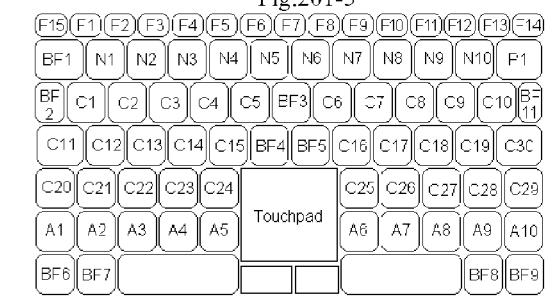
Figures 8, 201:
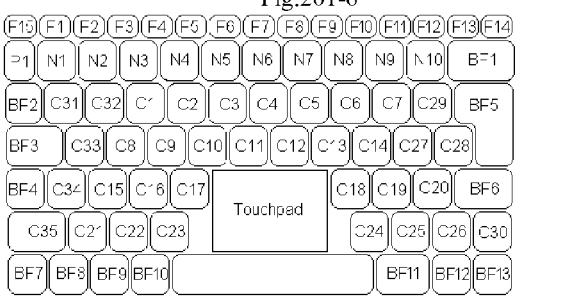
Figures 9, 201:
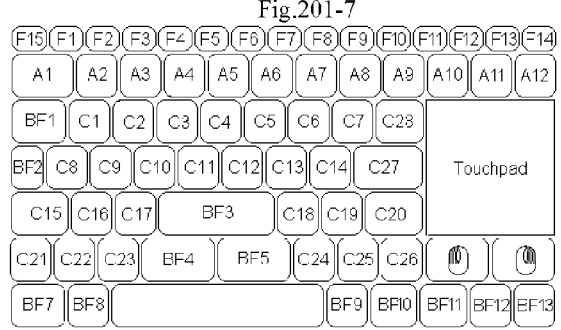
Figures 10, 201:
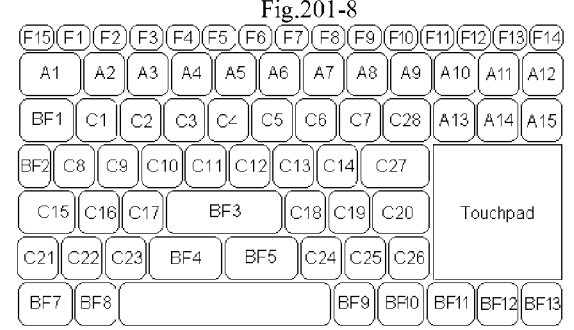

In the design template of FIG. 193-12 and FIG. 193-13, area 200 adopts the design of FIG. 191, and area 104 is intended to exclusively accommodate a numeric keypad. In FIG. 193-12, the numeric keypad area adopts the arrangement sequence of the numeric keypad on the right of an external keyboard of a computer. In FIG. 193-13, the numeric keypad area adopts the arrangement sequence similar to that adopted on the numeric keys of a mobile phone. The advantage of this design is that a letter arrangement sequence most easily learned and used is provided within a length of 235 mm, and a separate numeric keypad area is provided to make number input more convenient. In FIG. 193-12 and FIG. 193-13, the numeric keypad area may also be replaced with a touchpad of above 3 inches. FIG. 194-19 to FIG. 194-27 are a few design examples of design template FIG. 193-12. In FIG. 194-19, FIG. 194-20 and FIG. 194-21, area 200 adopts the design of FIG. 192-1. In FIG. 194-22 to FIG. 194-27, area 200 adopts the design of FIG. 192-2. In the numeric keypad area of FIG. 194-19, not only the numeric keys are same as the numeric keypad of a conventional keyboard, but also the cursor keys are same. In the numeric keypad area of FIG. 194-20 to FIG. 194-27, the numeric keys are same as the conventional numeric keypad, and the Shift toggle keys on numbers are punctuation marks. On the numeric keys in FIG. 194-23, there are also Chinese writing strokes. A big advantage of FIG. 194-19 to FIG. 194-27 is that the common punctuation marks may be directly typed in without pressing Shift key. Another advantage of FIG. 194-19 to FIG. 194-27 is that Shift key, Enter key and Backspace key are arranged in the middle of the keyboard and operated by index fingers or thumbs, so the operation is faster and healthier. In FIG. 194-24 to FIG. 194-27, the common high-frequency letter keys: "A", "E", "I", "N", "O" and "T" are designed to be bigger so that users may strike them in a more comfortable and faster manner while the key space among fingers is not affected. In FIG. 191, the space between letters may be designed in various ways. The design in FIG. 194-19 to FIG. 194-24 is just one of them. FIG. 194-25 to FIG. 194-27 list a few alternative design examples. In FIG. 201-8, a touchpad is arranged. In FIG. 194-19 to FIG. 194-24, the positions of Backspace key and Enter key may be swapped. In FIG. 194-25, large Enter key is on the first row, Shift key is in the middle of the second row, Del key is on the left and Backspace key is on the right. In FIG. 194-26 and FIG. 194-27, Shift key is above "D" key.

In the design template of FIG. 193-14, area 200 adopts the design of FIG. 191 and does not have a numeric keypad. FIG. 194-28 to FIG. 194-30 are design examples of FIG. 193-14. In FIG. 194-28, area 200 adopts the design of FIG. 192-1. In FIG. 194-29 and FIG. 194-30, area 200 adopts the design of FIG. 192-2. In FIG. 194-30, small numbers are arranged on letter keys. In FIG. 194-5, the small numbers on letters may also adopt the same correspondence between letters and small numbers. In FIG. 194-28 to FIG. 194-30, Shift key, Enter key and Backspace key are arranged in the middle of the keyboard and operated by index fingers or thumbs, so the operation is quicker and healthier. The positions of Enter key and Backspace key may be swapped.

FIG. 193 and FIG. 194 are both design examples of the new-type ABCD keyboard of the present invention, wherein the height is increased based on the design principle shown in FIG. 2. Alternatively, the height of the new-type ABCD keyboard of the present invention may remain unchanged as indicated in the design principle shown in FIG. 3. The method is same as the small QWERTY keyboard of the present invention as shown in FIG. 174 to FIG. 185.

Figures 1, 195:
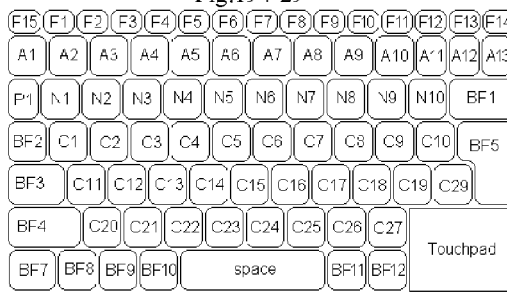
Figures 2, 195:
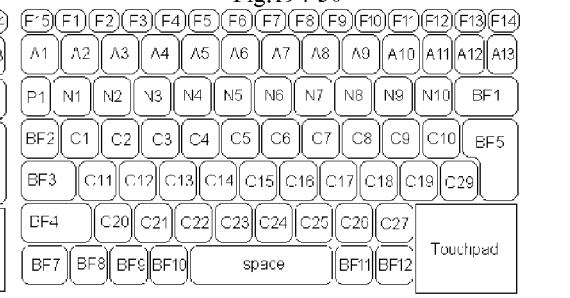
Figures 3, 195:
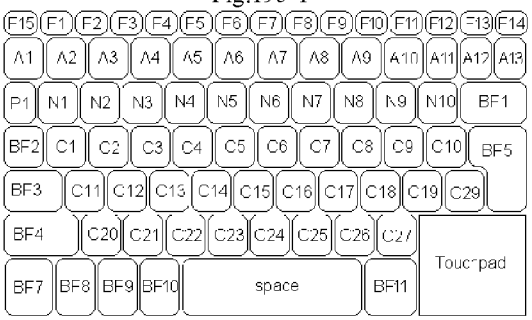
Figures 4, 195:
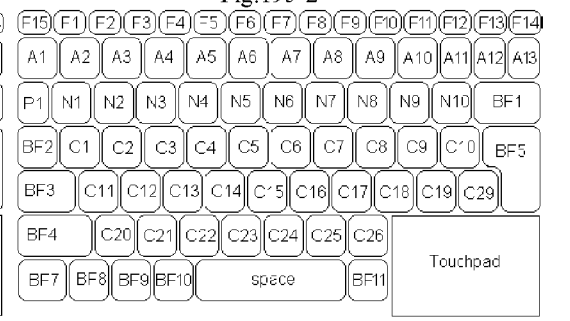
Figures 5, 195:
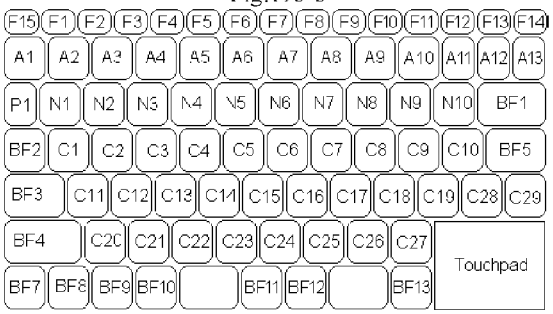
Figures 6, 195:
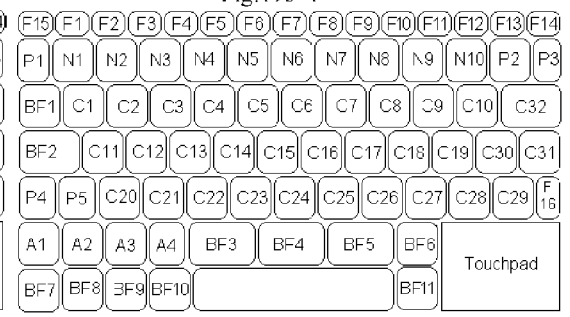
Figures 7, 195:
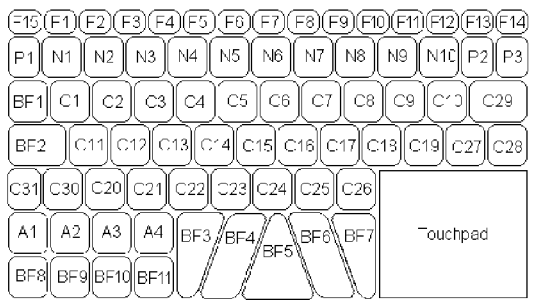
Figures 8, 195:
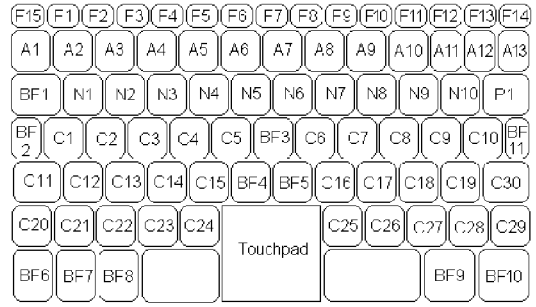
Figures 9, 195:
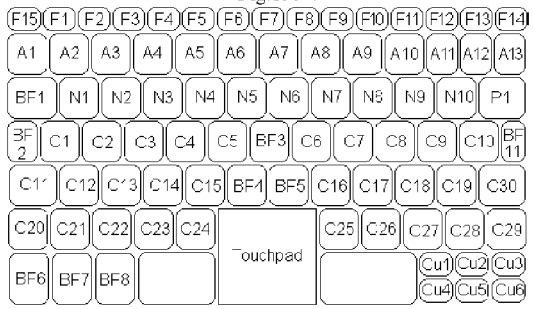
Figures 10, 195:
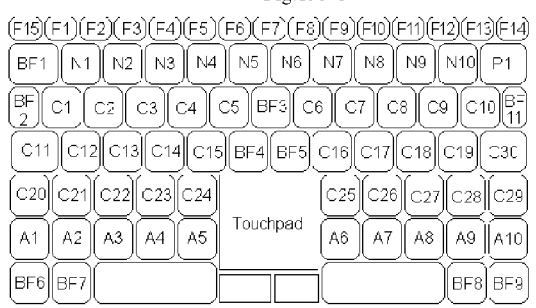

FIG. 195-1 to FIG. 195-10 are examples of the design templates for a conventional QWERTY keyboard with a built-in touchpad. FIG. 195-1, FIG. 195-3, FIG. 195-5, FIG. 195-6 and FIG. 195-7 are examples of the layout shown in FIG. 109. FIG. 195-2 and FIG. 195-4 are examples of the layout shown in FIG. 110. FIG. 195-8 and FIG. 195-9 are examples of FIG. 107. FIG. 195-10 is an example of FIG. 108.

Figures 1, 196:
Figures 2, 196:
Figures 3, 196:
Figures 4, 196:
Figures 5, 196:
Figures 6, 196:
Figures 7, 196:
Figures 8, 196:
Figures 9, 196:
Figures 10, 196:
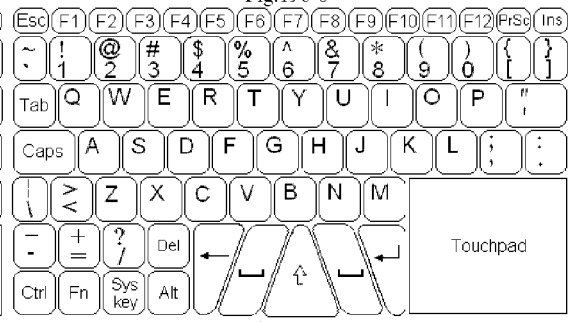
Figures 11, 196:
Figures 12, 196:
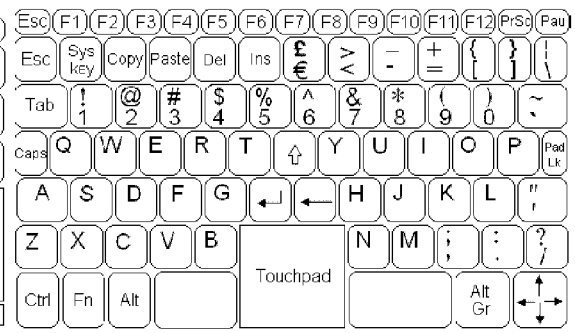
Figures 13, 196:
Figures 14, 196:

FIG. 196-1 to FIG. 196-14 are design examples of FIG. 195. FIG. 196-1 to FIG. 196-3 are design examples of FIG. 195-1. Right by the touchpad in FIG. 196-2, a right key of the mouse is arranged, too. Right by the touchpad in FIG. 196-3, a left key and a right key of the mouse are arranged, too. FIG. 196-3 is also an example of the layout shown in FIG. 113. FIG. 196-4 is a design example of FIG. 195-2, wherein the edge of the touchpad exceeds the edge of the keyboard, and the area of the touchpad is bigger. FIG. 196-5 is an example of FIG. 195-3, wherein area 105 adopts a higher Space key, and the area of the touchpad is bigger, too. FIG. 196-6 is an example of FIG. 195-4, wherein there are more key positions in the lengthwise direction of the touchpad, and the area of the touchpad is bigger. FIG. 196-7 and FIG. 196-8 are examples of FIG. 195-5, and key positions are arranged in the middle of Space key. FIG. 196-9 is an example of FIG. 195-6, and area 105 adopts the design of FIG. 96. FIG. 196-10 and FIG. 196-11 are examples of FIG. 195-7, wherein area 105 adopts the design of FIG. 98, and the touchpad is as high as three standard keys, occupies most key positions and has a biggest area, too. In FIG. 196-11, the left and right keys of the mouse are also arranged below the touchpad.

FIG. 196-12 to FIG. 196-14 are examples wherein a touchpad is arranged in the interior middle of a conventional QWERTY keyboard. This design separates the left-hand key area from the right-hand key area on a conventional QWERTY keyboard, changes the tilting direction of the left-hand key area from top left to top right, and is healthier to the left hand. Further, Shift key, Enter key and Backspace key are operated by two index fingers, making the operation faster. FIG. 196-12 is a design example of FIG. 195-8. FIG. 196-13 is a design example of FIG. 195-9. FIG. 196-14 is a design example of FIG. 195-10.

FIG. 197 to FIG. 200 are design templates of non-10-inch QWERTY keyboards with a touchpad. FIG. 197-1 is a design template of an 8-inch device with a touchpad. FIG. 197-2 is a design example of FIG. 197-1. FIG. 198-1 is a design template of a 9-inch device with a touchpad. FIG. 198-2 is a design example of FIG. 198-1. FIG. 199-1 is a design template of an 11-inch device with a touchpad. FIG. 199-2 is a design example of FIG. 199-1. FIG. 200-1 and FIG. 200-2 are design templates of a 12-inch device with a touchpad. FIG. 200-3 is a design example of FIG. 200-1. FIG. 200-4 is a design example of FIG. 200-2. In addition to the examples given in FIG. 197 to FIG. 200, the design solutions for 10-inch devices with a touchpad may also be used in the design of the devices of other size with a touchpad.

Figures 1, 202:
Figures 2, 202:
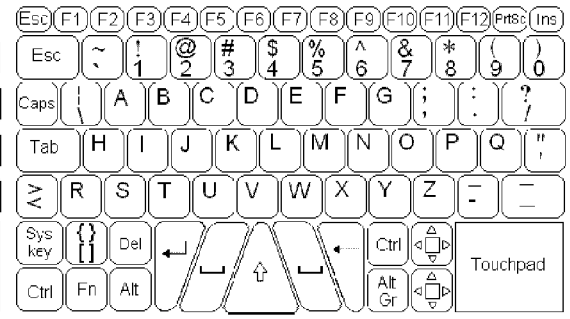
Figures 3, 202:
Figures 4, 202:
Figures 5, 202:
Figures 6, 202:
Figures 7, 202:
Figures 8, 202:
Figures 9, 202:
Figures 10, 202:
Figures 11, 12, 202:
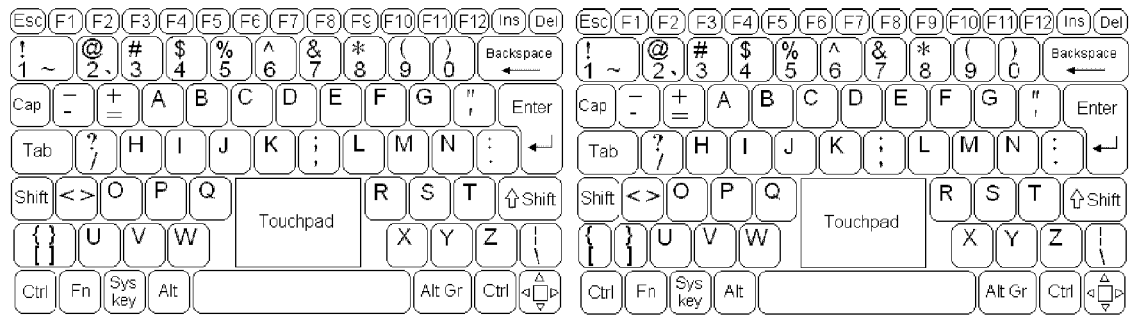
Figures 13, 14, 202:

FIG. 201-1 to FIG. 201-10 are examples of the design templates of a new-type ABCD keyboard with a touchpad according to the present invention. FIG. 201-1 to FIG. 201-4 are examples of the layout shown in FIG. 109. FIG. 201-5 and FIG. 201-6 are examples of the layout shown in FIG. 107. FIG. 201-7 is an example of the layout shown in FIG. 108. FIG. 201-8 is an example of the layout shown in FIG. 111. In the design templates of FIG. 201-1 to FIG. 201-3, area 200 adopts the design of FIG. 187. In FIG. 201-1, area 105 adopts the design of FIG. 97. In FIG. 201-2, area 105 adopts the design of FIG. 98. FIG. 202-1 is a design example of FIG. 201-1. FIG. 202-2 is a design example of FIG. 201-2. FIG. 202-3 is a design example of FIG. 201-3. In the design template of FIG. 201-4, area 200 adopts the design of FIG. 189. FIG. 202-4 is a design example of FIG. 201-4. In the design templates of FIG. 201-5 and FIG. 201-6, area 200 adopts the design of FIG. 188-2, but the letters on the third row are pulled to the two sides, and a touchpad is inserted between them. In FIG. 201-6, the letters on the first row and the second row are pulled to the two sides, and Shift key, Backspace key and Enter key are inserted between them. FIG. 202-5 is a design example of FIG. 201-5. FIG. 202-6 is a design example of FIG. 201-6. In the design template of FIG. 201-7, area 200 adopts the design of FIG. 189, but the letters on the third row are pulled to the two sides, and a touchpad is inserted between them. FIG. 202-7 is a design example of FIG. 201-7. In the design template of FIG. 201-8, area 200 adopts the design of FIG. 191. FIG. 202-8 to FIG. 202-12 are a few design examples of FIG. 201-8. In FIG. 202-8 and FIG. 202-9, area 200 adopts the design of FIG. 192-1. In FIG. 202-10 to FIG. 202-12, area 200 adopts the design of FIG. 192-2. The design of FIG. 202-10 to FIG. 202-12 not only has the letter arrangement that is most easily remembered, but also adopts a touchpad in the middle of the keyboard. FIG. 201-9 and FIG. 201-10 are designs in which the numeric keypad area in FIG. 193-12 and FIG. 193-13 is changed into a touchpad. In FIG. 201-9, the left key and right key of the mouse are separately disposed below the touchpad. FIG. 201-10 is a design in which the left key and right key of the mouse are integrated in the touchpad. FIG. 202-13 is a design example of the design template of FIG. 201-9. FIG. 202-14 is a design example of the design template of FIG. 201-10. The advantage of the design in FIG. 201-9 and FIG. 201-10 is that a 3-inch large touchpad is integrated inside the keyboard.

All design templates for the QWERTY keyboard layout of the present invention may be used to design non-English keyboards with reference to the English keyboard in the accompanying drawings of the Description. All design templates for the ABCD keyboard layout of the present invention may also be used to design non-English keyboards with reference to the English keyboard in the accompanying drawing of the Description.

FIG. 203-1 to FIG. 203-26 are non-English design examples of the QWERTY keyboard on a 10-inch device and are also the design examples of FIG. 151. The table below lists the languages of these keyboards.

| FIG. 203-1 | British English | FIG. 203-2 | Italian | FIG. 203-3 | Canadian |
|---|---|---|---|---|---|
| FIG. 203-4 | French | FIG. 203-5 | Swedish | FIG. 203-6 | Dutch |
| FIG. 203-7 | German | FIG. 203-8 | German | FIG. 203-9 | Belgian |
| FIG. 203-10 | Portuguese | FIG. 203-11 | Spanish | FIG. 203-12 | Norwegian |
| FIG. 203-13 | Danish | FIG. 203-14 | Greek | FIG. 203-15 | Hebrew |
| FIG. 203-16 | Russian | FIG. 203-17 | Chinese | FIG. 203-18 | Chinese Phonetic Notation |
| FIG. 203-19 | Japanese | FIG. 203-20 | Japanese | FIG. 203-21 | Japanese |
| FIG. 203-22 | Korean | FIG. 203-23 | Arabic | FIG. 203-24 | Khmer |
| FIG. 203-25 | Sanskrit | FIG. 203-26 | Urdu | | |

From FIG. 203, it may be seen that as a row of keys is added above the numeric keys, the total number of key positions is eighty-seven, two more than a conventional European-language 85-key keyboard. It is very helpful to the languages with more than 26 letters, and the languages with more punctuation marks. Further, the present invention adopts the method of merging pair keys. Two to five more key positions may be saved to accommodate letters and punctuation marks. The striking times of compound keys are reduced and the user's input is quickened.

The Korean keyboard as shown in FIG. 203-22 may also have three key layouts as the Japanese keyboard shown in FIG. 203-19 to FIG. 203-21.

FIG. 204-1 to FIG. 204-6 are a few design examples of a Spanish keyboard in the ABCD keyboard layout as shown in FIG. 186. FIG. 204-7 to FIG. 204-10 are a few design examples of a Japanese keyboard in the ABCD keyboard layout as shown in FIG. 186. In addition to the design of English, Japanese and Spanish ABCD keyboards recited in the present invention, other languages ABCD keyboard may also be designed with reference to the design philosophy and design methods of the present invention, and the design templates of the present invention. Due to limited length of the article, they are not illustrated here, but they are all within the protection scope of the present invention.

The size of a device mentioned in the description of the present invention refers to the overall dimension of the device, other than the screen size adopted by the device. According to the method of the present invention, a design layout of the present invention may be arranged on a screen device of a corresponding size under the condition that there is not any frame on the two sides of the screen. As the screen almost has no frame, the product looks very nice and the screen looks bigger. Further, the keyboard layout of the present invention may be arranged on a bigger device. For example, a 10-inch keyboard is disposed on a device of above 10 inches, to enhance the generality of the keyboard and reduce the cost of mass production. Further, the keyboards of the present invention may also be made into external keyboards.

The keyboards of the present invention may be disposed inside portable electronic devices or used as external keyboards. They may directly adopt the design with a numeric keypad as shown in FIG. 193-12 and FIG. 193-13. Alternatively, a numeric keypad may be added to the right of the keyboard of the present invention to form an external keyboard, as shown in FIG. 205. FIG. 205-1 is a design example in which a numeric keypad is added to the right of a QWERTY keyboard layout of the present invention. FIG. 205-2 is a design example in which direction keys and a numeric keypad are added to the right of a QWERTY keyboard layout of the present invention. FIG. 205-3 is a design example in which direction keys and a numeric keypad are added to the right of an ABCD keyboard layout of the present invention.

Figure 105:
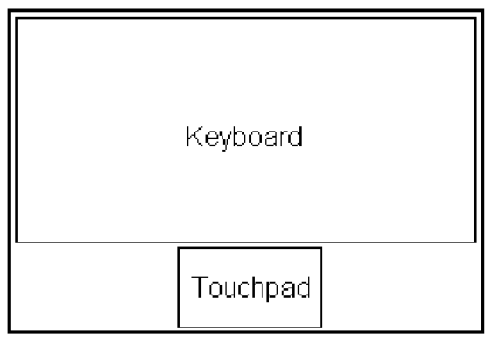
FIG. 105 is a schematic view for the layout of a keyboard with mouse keys below a touchpad according to the present invention.
Figure 106:
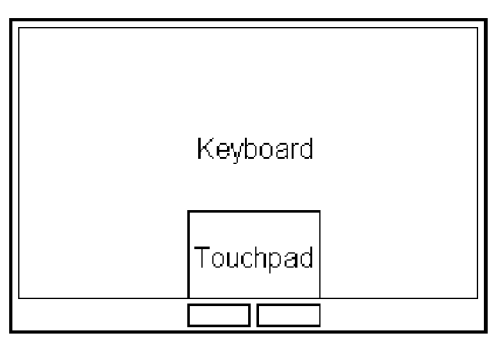
FIG. 106 is a schematic view of a keyboard with a touchpad in its interior middle according to the present invention.
Figure 107:
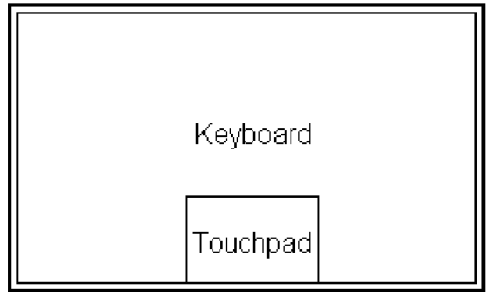
FIG. 107 is a schematic view of a keyboard with a touchpad in its interior middle and mouse keys below the touchpad according to the present invention.
Figure 108:
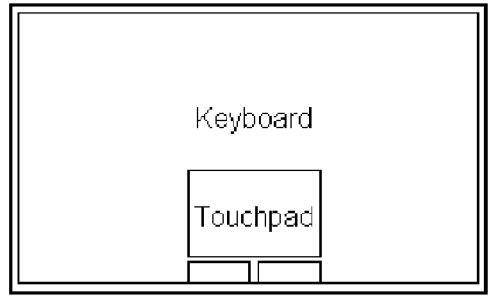
FIG. 108 is a schematic view of a keyboard with a touchpad and mouse keys in its interior middle according to the present invention.
Figure 109:
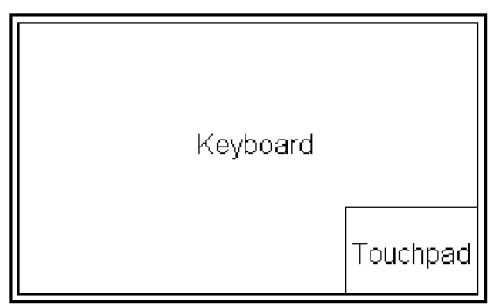
FIG. 109 is a schematic view of a keyboard with a touchpad at its bottom right corner and mouse keys below the touchpad according to the present invention.

The QWERTY keyboard as shown in FIG. 7 or the ABCD keyboard as shown in FIG. 186 in the present invention may be used according to the actual condition and in light of any of the keyboard layouts as shown in FIG. 103 to FIG. 114. FIG. 207 is a design example of a QWERTY keyboard with one more row and with a track point as shown in FIG. 104. FIG. 208 is a design example of an ABCD keyboard with one more row and with a track point as shown in FIG. 104. FIG. 209 is a design example of a QWERTY keyboard with unchanged height and with a touchpad below the keyboard as shown in FIG. 105. The design of other QWERTY keyboards with an internal touchpad is shown in FIG. 195 to FIG. 200. The design of other ABCD keyboards with an internal touchpad is shown in FIG. 201 to FIG. 202. The design solution for disposition of a track point may adopt the conventional design for a QWERTY keyboard. For example, the track point may be disposed between letter "G" and letter "H" as shown in FIG. 207, or in other positions. FIG. 210 is a design example for the disposition of a track point on an ABCD keyboard. In FIG. 188-1, the track point is disposed between letter "L" and letter "M", as shown in FIG. 210-1. In FIG. 188-2, the track point is disposed between letter "K" and letter "L", as shown in FIG. 210-2. In FIG. 190-1, the track point is disposed between letter "K" and letter "L", as shown in FIG. 210-3. In FIG. 190-2, the track point is disposed between letter "J" and letter "L", as shown in FIG. 210-4.

In FIG. 192-1, the track point is disposed between letter "K" and letter "L", as shown in FIG. 210-5; or between letter "Q" and letter "R", as shown in FIG. 210-7. In FIG. 192-2, the track point is disposed between letter "J" and letter "L", as shown in FIG. 210-6; or between letter "Q" and letter "R", as shown in FIG. 210-8. FIG. 208-1 is an example of FIG. 210-6. FIG. 208-2 is an example of FIG. 210-8. Of course, in addition to the example in FIG. 210, the track point may also be disposed in other appropriate positions on an ABCD keyboard of the present invention.

It should be understood by those of ordinary skill in the art that the foregoing descriptions are only preferred embodiments of the present invention and are not intended to limit the present invention. Although the present invention is described in details in accordance with the foregoing embodiments, those skilled in the art can still modify the technical solutions recorded in the foregoing embodiments, or make equivalent replacements to some technical features. All modifications, equivalent replacements and improvements made without departing from the spirit and principle of the present invention shall be within the protection scope of the present invention, for example, the change to the position, shape and size of a key.

What is claimed is:

1. A keyboard with reduced width and added rows, the keyboard comprising:
    a first key area comprising 27 keys, including 10 keys on a first row, 9 keys on a second row, and 8 keys on a third row, wherein a left edge of the first key area tilts towards a bottom right portion of the keyboard and a right edge of the first key area tilts towards a bottom left portion of the keyboard such that the first key area defines an inverted trapezoidal area, wherein the first row of the first key area is "QWERTYUIOP," the second row of the first key area is "ASDFGHJKL," and the third row of the first key area is "ZXCVBNM" plus a character key;
    a second key area above the first key area, the second key area comprising a row of numeric keys, an additional row of keys above the row of numeric keys, and a row of function keys above the additional row of keys, the additional row of keys comprising at least two character keys;
    a third key area to the left of the first key area, the third key area comprising a number of keys ranging from one to four keys;
    a fourth key area to the right of the first key area, the fourth key area comprising a number of keys ranging from one to five keys, wherein the fourth key area comprises either an Enter key, or an Enter key and a Shift key, or an Enter key, a Shift key, and a character key, or an Enter key, a Shift key, and a Backspace key, or an Enter key, a Shift key, a Backspace key and a character key, or an Enter key, a Shift key, and two character keys, or an Enter key, a Shift key, and three character keys, or an Enter key, a Shift key, a Backspace, and two character keys; and
    a fifth key area below the first key area, wherein the first key area, the second key area, the third key area, the fourth key area, and the fifth key area together constitute the complete whole keyboard.

2. The keyboard with reduced width and added rows according to claim 1, wherein a pitch of the keys in the first key area is from 19 mm to 19.5 mm.

3. The keyboard with reduced width and added rows according to claim 1, wherein the fifth key area further comprises a 4-direction key to control the up, down, left and right movements of a cursor or to function as Page Up, Page Down, Home and End keys.

4. The keyboard with reduced width and added rows according claim 1, wherein the second key area further comprises a Copy key, a Paste key and a currency symbol key.

5. The keyboard with width and added rows according to claim 1, wherein the fourth key area and the fifth key area further comprise a touchpad built-in to the keyboard.

6. The keyboard with reduced width and added rows according to claim 1, wherein a left boundary of the whole keyboard starts from the left of a TAB key, starts from the left of a "1" key on the row of numeric keys, or starts from the left of the "Q" key in the first row of the first key area, and a right boundary of the whole keyboard ends at the right of a second key to the right of the "L" key on the second row of the first key area, ends at the right of a first key to the right of the "L" key on the second row of the first key area, or ends at the right of the "P" key on the first row of the first key area.

7. The keyboard with reduced width and added rows according to claim 1, further comprising an ESC key having a height equal to a combined height of a key in the additional row of keys and a height of a function key in the row of function keys.

8. The keyboard with reduced width and added rows according to claim 1, wherein a number "1" key of the numeric keys is longer than each of the remainder of the numeric keys.

9. The keyboard with reduced width and added rows according to claim 1, wherein a height of the fifth key area is equal to a height of a key in the first key area, or a combined height of two small cursor keys, or a combined height of two keys in the first key area.

10. The keyboard with reduced width and added rows according to claim 1, wherein the fourth key area comprises four keys, and wherein the four keys are an Enter key, a Shift key, a ".>" key, and a ":;" key or an Enter key, a Shift key, a ".:" key, and a """ key.

11. The keyboard with reduced width and added rows according to claim 1, wherein the second key area further comprises a BackSpace key to the right of a number "0" key on the row of numeric keys or the fourth key area comprises a Backspace key to the right of the letter "P" key of the first key area.

* * * * *